US010713044B2

(12) United States Patent
Espasa et al.

(10) Patent No.: US 10,713,044 B2
(45) Date of Patent: Jul. 14, 2020

(54) BIT SHUFFLE PROCESSORS, METHODS, SYSTEMS, AND INSTRUCTIONS

(71) Applicant: Intel Corporation, Santa Clara, CA (US)

(72) Inventors: Roger Espasa, Barcelona (ES); Guillem Sole, Barcelona (ES); David Guillen Fandos, Tarragona (ES)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/508,284

(22) PCT Filed: Sep. 4, 2015

(86) PCT No.: PCT/US2015/048627
§ 371 (c)(1),
(2) Date: Mar. 2, 2017

(87) PCT Pub. No.: WO2016/048631
PCT Pub. Date: Mar. 31, 2016

(65) Prior Publication Data
US 2017/0286112 A1 Oct. 5, 2017

(30) Foreign Application Priority Data
Sep. 25, 2014 (EP) .................................... 14382361

(51) Int. Cl.
G06F 9/30 (2018.01)
G06F 9/38 (2018.01)
(52) U.S. Cl.
CPC ...... G06F 9/30036 (2013.01); G06F 9/30018 (2013.01); G06F 9/30032 (2013.01); G06F 9/30043 (2013.01); G06F 9/3853 (2013.01)

(58) Field of Classification Search
None
See application file for complete search history.

(56) References Cited

U.S. PATENT DOCUMENTS 6,041,404 A 3/2000 Roussel et al.
7,155,601 B2 12/2006 Chennupaty et al.
(Continued)

FOREIGN PATENT DOCUMENTS

CN 102253824 A 11/2011
CN 104011671 A 8/2014
(Continued)

OTHER PUBLICATIONS

McGregor et al. (Architectural Enhancements for Fast Subword Permutations with Repetitions in Cryptographic Applications, Sep. 2001, pp. 453-461) (Year: 2001).*
(Continued)

Primary Examiner — George Giroux
(74) Attorney, Agent, or Firm — NDWE, LLP

(57) ABSTRACT

A processor includes packed data registers and a decode unit to decode an instruction. The instruction is to indicate a first source operand having at least one lane of bits, and a second source packed data operand having a number of sub-lane sized bit selection elements. An execution unit is coupled with the packed data registers and the decode unit. The execution unit, in response to the instruction, stores a result operand in a destination storage location. The result operand includes, a different corresponding bit for each of the number of sub-lane sized bit selection elements. A value of each bit of the result operand corresponding to a sub-lane sized bit selection element is that of a bit of a corresponding lane of bits, of the at least one lane of bits of the first source operand, which is indicated by the corresponding sub-lane sized bit selection element.

23 Claims, 25 Drawing Sheets

(56) References Cited

U.S. PATENT DOCUMENTS

| | | | |
|---|---|---|---|
| 8,078,836 B2 | 12/2011 | Sperber et al. | |
| 8,225,075 B2 | 7/2012 | Macy, Jr. et al. | |
| 8,688,959 B2 | 4/2014 | Macy, Jr. et al. | |
| 9,477,472 B2* | 10/2016 | Macy, Jr. | G06F 7/76 |
| 2002/0031220 A1* | 3/2002 | Lee | G06F 9/30032 |
| | | | 380/37 |
| 2002/0078011 A1 | 6/2002 | Lee et al. | |
| 2002/0108030 A1* | 8/2002 | Lee | G06F 7/762 |
| | | | 712/300 |
| 2003/0005365 A1* | 1/2003 | Wilson | G06F 9/30014 |
| | | | 714/38.13 |
| 2004/0054877 A1 | 3/2004 | Macy et al. | |
| 2005/0132165 A1* | 6/2005 | Ford | G06F 9/30025 |
| | | | 712/22 |
| 2006/0149953 A1 | 7/2006 | Wilson | |
| 2006/0168426 A1 | 7/2006 | Wilson | |
| 2009/0172358 A1* | 7/2009 | Sperber | G06F 9/30032 |
| | | | 712/208 |
| 2009/0187746 A1* | 7/2009 | Symes | G06F 9/30032 |
| | | | 712/222 |
| 2013/0061801 A1 | 3/2013 | Fujiwara et al. | |
| 2013/0212360 A1 | 8/2013 | Sperber et al. | |
| 2014/0115301 A1* | 4/2014 | Sanghai | G06F 9/30072 |
| | | | 712/220 |
| 2014/0201499 A1* | 7/2014 | Ould-Ahmed-Vall | |
| | | | G06F 9/30036 |
| | | | 712/4 |
| 2014/0281396 A1 | 9/2014 | Jha et al. | |

FOREIGN PATENT DOCUMENTS

| | | |
|---|---|---|
| JP | H08314717 A | 11/1996 |
| JP | H11203106 A | 7/1999 |
| JP | 2005218055 A | 8/2005 |
| JP | 2009009587 A | 1/2009 |
| JP | 2009282744 A | 12/2009 |
| JP | 2010282649 A | 12/2010 |
| JP | 2011134304 A | 7/2011 |
| JP | 2013057872 A | 3/2013 |
| KR | 10-2012-0026104 A | 3/2012 |
| TW | 201344567 A | 11/2013 |
| TW | 201416973 A | 5/2014 |
| WO | 0189098 A2 | 11/2001 |
| WO | 2013/095541 A1 | 6/2013 |
| WO | 2013095618 A1 | 6/2013 |
| WO | 2014/031129 A1 | 2/2014 |
| WO | 2014/150913 A2 | 9/2014 |
| WO | 2016/048631 A1 | 3/2016 |

OTHER PUBLICATIONS

Hilewitz et al. (Comparing Fast Implementations of Bit Permutation Instructions, Nov. 2004, pp. 1856-1863) (Year: 2004).*
Notice of Allowance and Search Report received for Taiwan Patent Application No. 104127010, dated Jul. 28, 2016, 4 pages of Taiwan Notice of Allowance including 1 page of English Translation of Search Report.
Extended European Search Report received for European Patent Application No. 14382361.5, dated Apr. 22, 2015, 8 pages.
Intel, "Intel 64 and IA-32 Architectures Software Developer's Manual", Oct. 2011, 526 pages.
Intel, "Intel Advanced Vector Extensions Programming Reference", Jun. 2011, 595 pages.
International Preliminary Report and on Patentability and Written Opinion received for PCT Patent Application No. PCT/US2015/048627, dated Apr. 6, 2017, 6 pages.
International Search Report and Written Opinion received for PCT Patent Application No. PCT/US2015/048627, dated Jan. 4, 2016, 9 pages.
Intel, "Intel 64 and IA-32 Architectures Software Developer's Manual", vol. 1: Basic Architecture, Order No. 253665-040US, Oct. 2011, 548 pages.
Intel, "Intel 64 and IA-32 Architectures Software Developer's Manual", vol. 2 (2A, 2B & 2C): Instruction Set Reference, A-Z, Order No. 325383-040US, Oct. 2011, 1721 pages.
Intel, "Intel 64 and IA-32 Architectures Software Developer's Manual", vol. 3 (3A, 3B & 3C): System Programming Guide, Order No. 325384-040US, Oct. 2011, 1916 pages.
Communication pursuant to Article 94(3) EPC for Application No. 14382361.5, dated Aug. 23, 2018, 11 pages.
Communication under rule 71(3) EPC for Application No. 14382361.5, dated Jun. 4, 2019, 09 pages.
Decision of Grant from foreign counterpart Japanese Patent Application No. 2017-509017, dated Apr. 2, 2019, 4 pages.
First Office Action and Search Report from foreign counterpart Chinese Patent Application No. 201580045412.X, dated Jun. 20, 2018, 22 pages.
Notification of Reasons for Refusal from foreign counterpart Japanese patent Application No. 2017-509017, dated Apr. 3, 2018, 7 pages.
Second Office Action and Search Report from foreign counterpart Chinese Patent Application No. 201580045412.X, dated Apr. 11, 2019, 22 pages.
Office Action, CN App No. 201580045412.X, dated Mar. 5, 2020, 6 pages (Original Document Only).

* cited by examiner

FIG. 9

BIT SHUFFLE INSTRUCTION 902

| OPCODE | FIRST SOURCE OPERAND SPECIFIER | SECOND SOURCE OPERAND SPECIFIER | DESTINATION SPECIFIER (OPTIONAL) | MASK SPECIFIER (OPTIONAL) | TYPE OF MASKING SPECIFIER (OPTIONAL) | DATA ELEMENT BROADCAST CONTROL (OPTIONAL) |
|---|---|---|---|---|---|---|
| 984 | 985 | 986 | 987 | 988 | 989 | 990 |

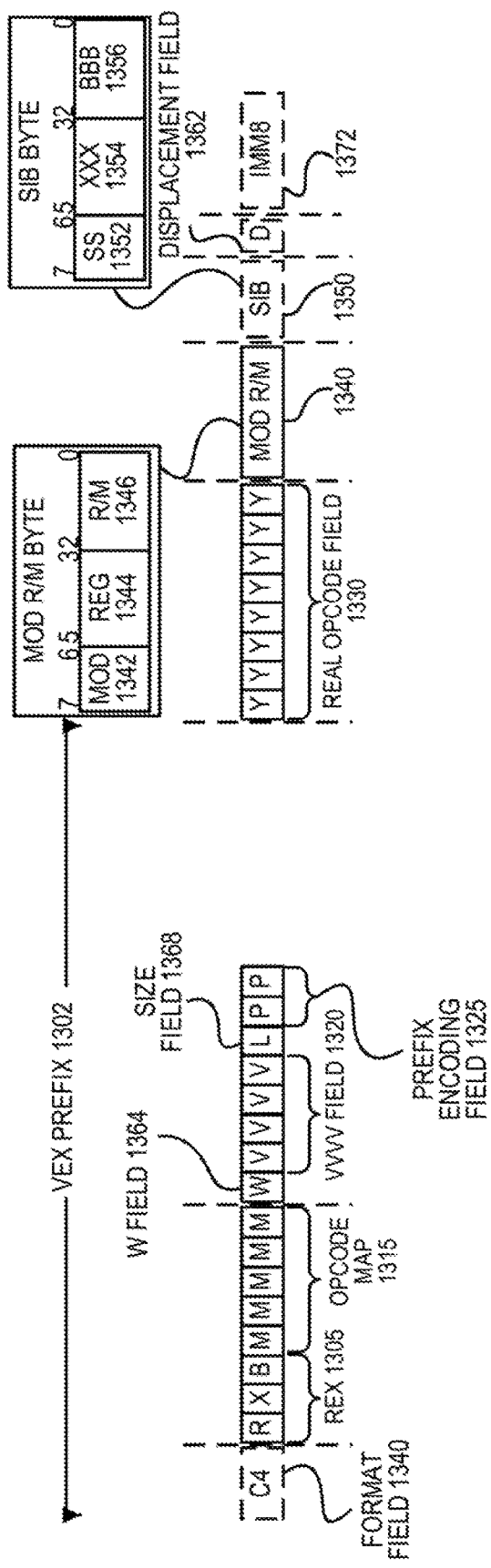
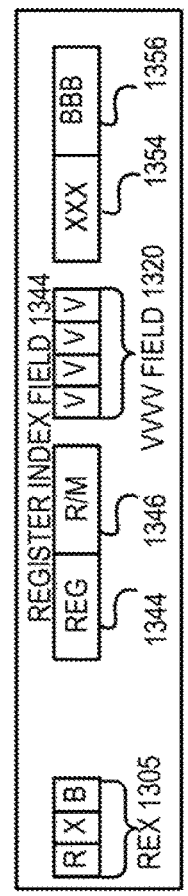
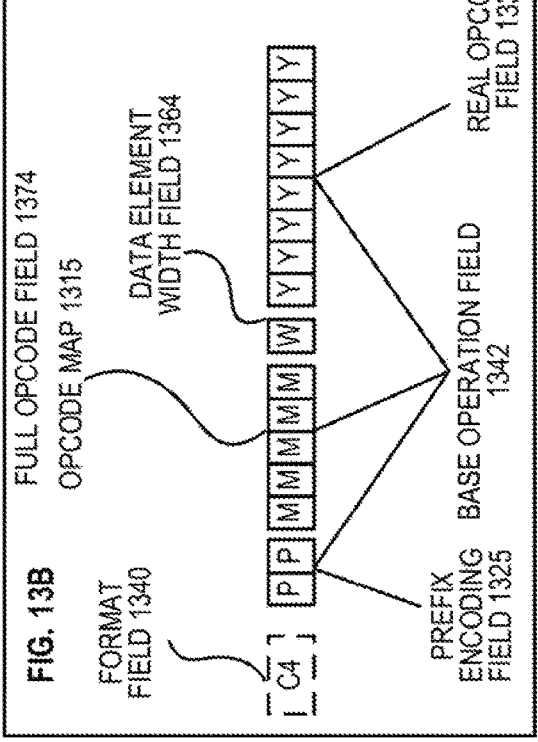
FIG. 13A
FIG. 13B
FIG. 13C

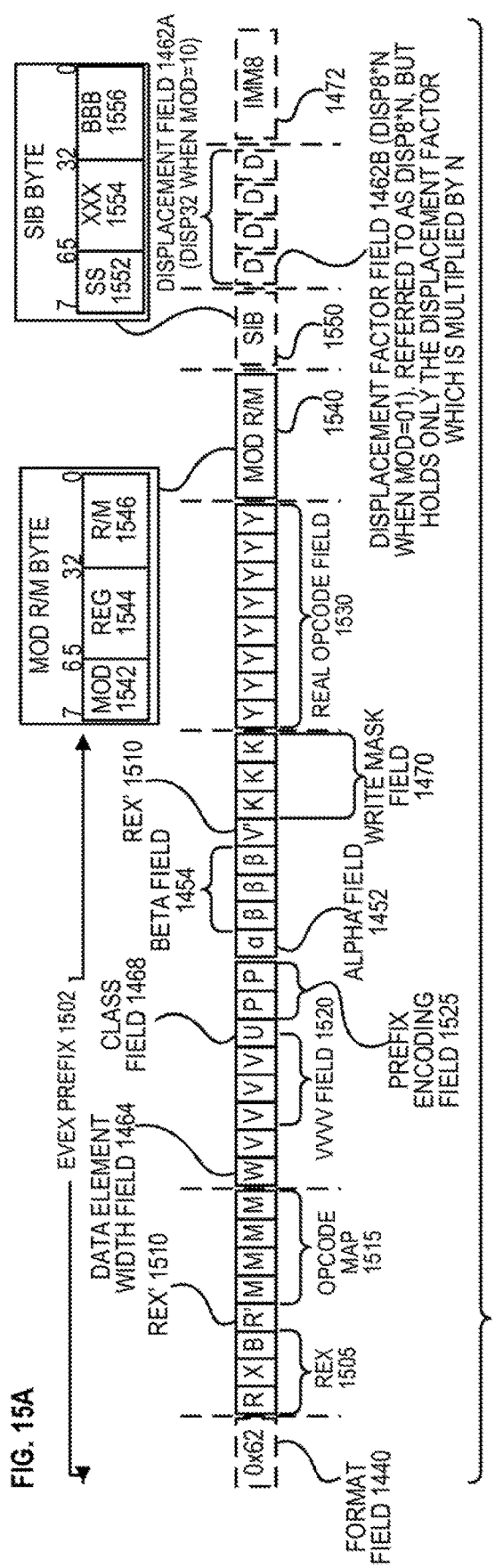

BIT SHUFFLE PROCESSORS, METHODS, SYSTEMS, AND INSTRUCTIONS

This patent application is a U.S. National Phase Application under 35 U.S.C. Section 371 of International Application No. PCT/US2015/048627, filed on Sep. 4, 2015, titled "BIT SHUFFLE PROCESSORS, METHODS, SYSTEMS, AND INSTRUCTIONS" which claims the benefit of EP Application No. 14382361.5, filed Sep. 25, 2014, which is hereby incorporated by reference

BACKGROUND

Technical Field

Embodiments described herein generally relate to processors. In particular, embodiments described herein generally relate to bit manipulation in processors.

Background Information

Processors execute various different types of instructions to operate on data elements. For example, an add instruction may be used to add a first 16-bit data element in a first register to a second 16-bit data element in a second register, and store a 16-bit result data element in a destination register. Each data element may represent a separate individual piece of data, such as, for example, a pixel color code, an integer value representing a number of items, etc.

In addition to operating on whole data elements 8-bit, 16-bit, 32-bit, or 64-bit data elements), it is sometimes also useful to manipulate the individual bits within a single data element. However, as compared operating on whole data elements, manipulating the individual bits within a single data element often tends to be relatively slow and/or inefficient in processors. As one example, an algorithm to obtain the values of individual bits in a single data element may include, for each individual bit, one instruction to rotate or shift all the bits of the data element (e.g., shift all 16-bits) to place the individual bit in a particular position, and another instruction to perform a bitwise logical operation (e.g., a logical AND, a logical OR, etc.) with the rotated/shifted bits and a mask data element configured to select the individual bit, to isolate or accumulate the individual bit.

This is just one example, but regardless of the particular approach used by the algorithm, generally one or more separate instructions may be needed for each individual bit value obtained. As a result, the total number of instructions needed generally tends to increase approximately proportionally with the total number of bit values to be obtained. For example, roughly twice as many instructions may be needed to obtain all the bit values of a 32-bit data element as would be needed to obtain all the bit values of a 16-bit data element. In addition, the algorithm manipulates all the bits of the data element for each individual bit value obtained (e.g., shifts all the bits, performs a logical operation on all the bits, etc.), which also tends to make the performance of the algorithm less than optimal.

BRIEF DESCRIPTION F THE DRAWINGS

The invention may best be understood by referring to the following description and accompanying drawings that are used to illustrate embodiments. In the drawings:

FIG. 9 is a block diagram of an embodiment of bit shuffle instruction.

FIGS. 13A-C are block diagrams illustrating a generic vector friendly instruction format and instruction templates thereof, according to embodiments of the invention.

Figure 14A:
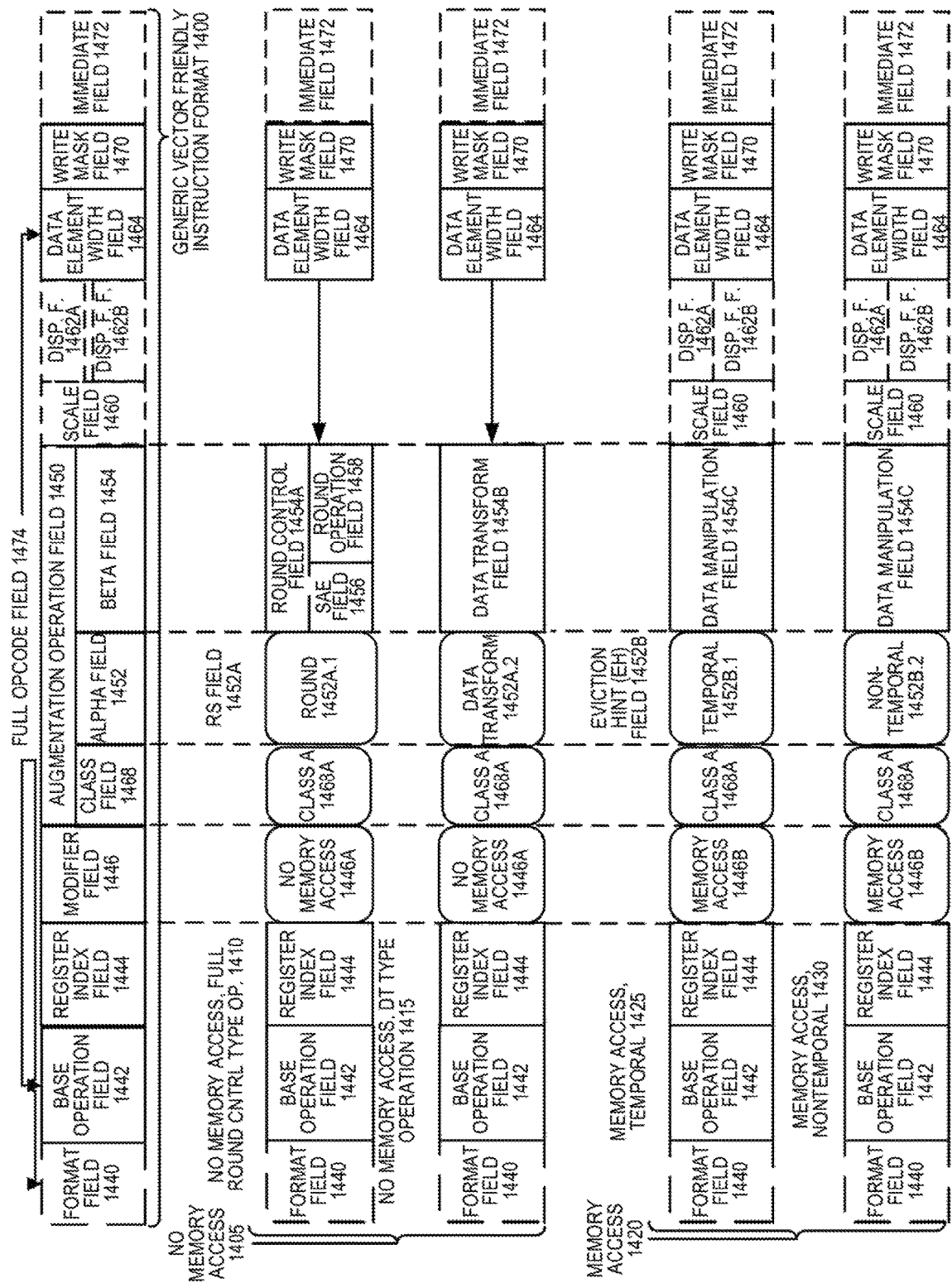
Figure 14B:
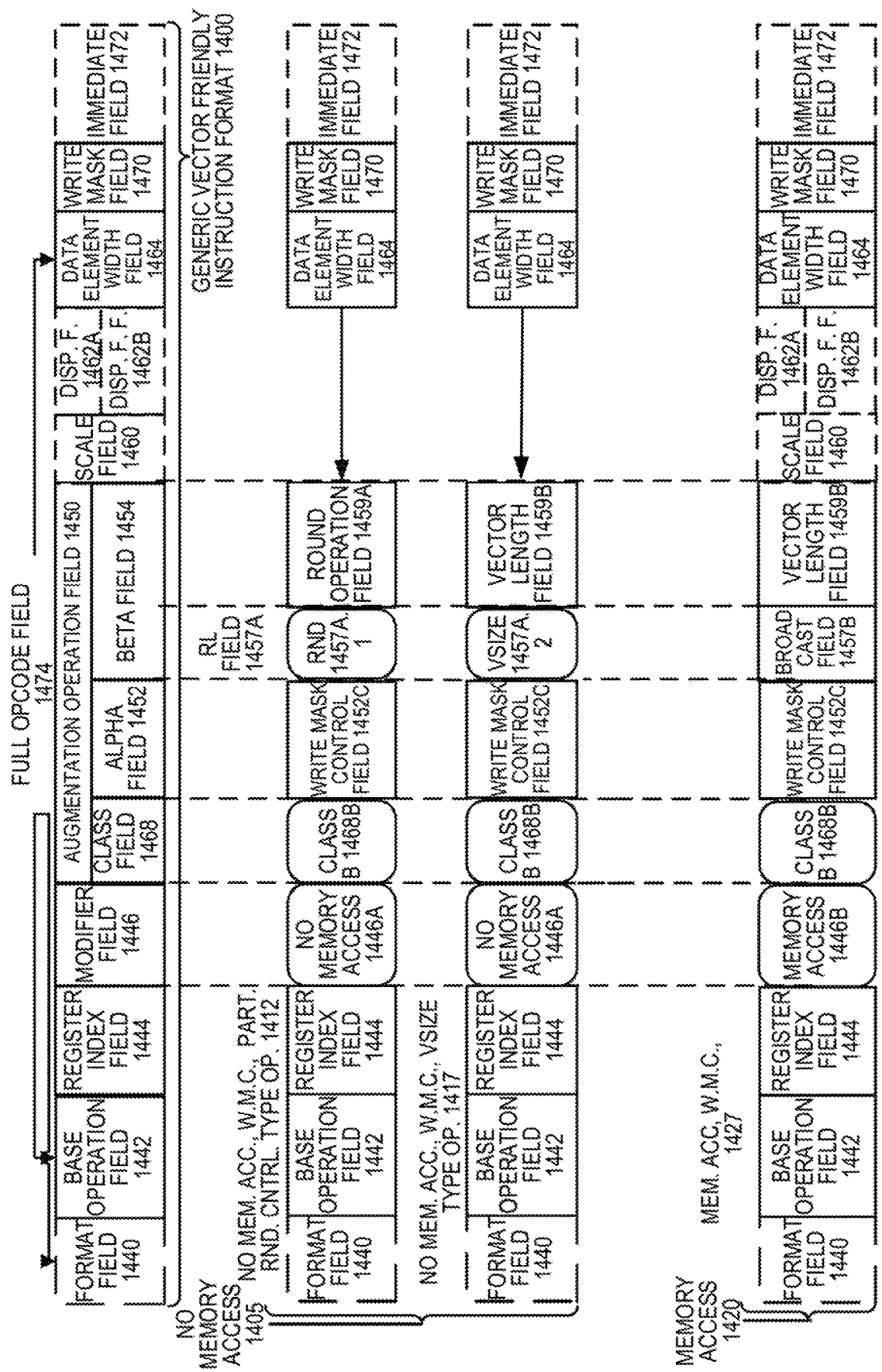

FIG. 14A-B is a block diagram illustrating an exemplary specific vector friendly instruction format and an opcode field, according to embodiments of the invention.

FIG. 15A-D is a block diagram illustrating arm exemplary specific vector friendly instruction format and fields thereof, according to embodiments of the invention.

Figure 16:
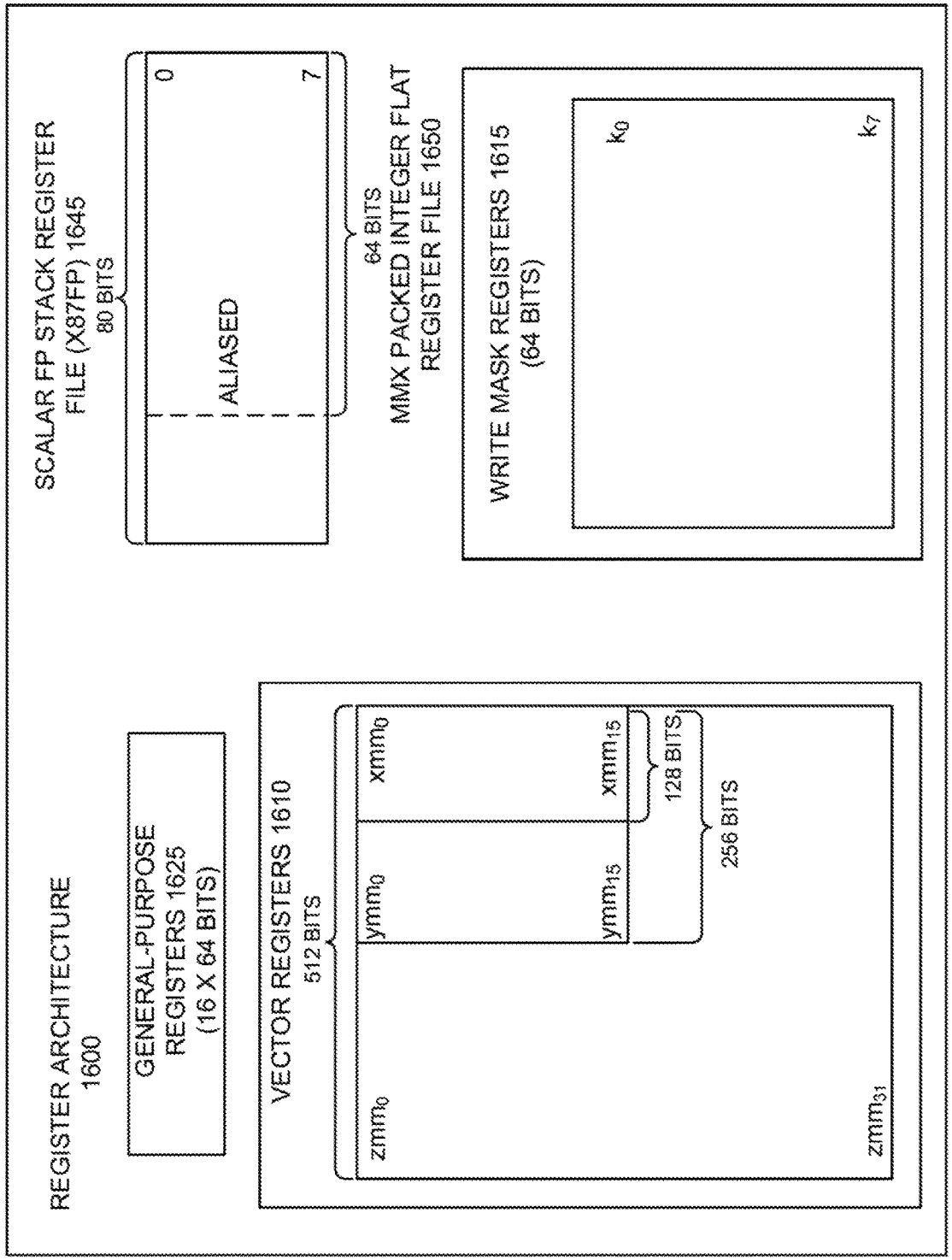

FIG. 16 is a block diagram of an embodiment of a register architecture.

Figures 17A, 17B:
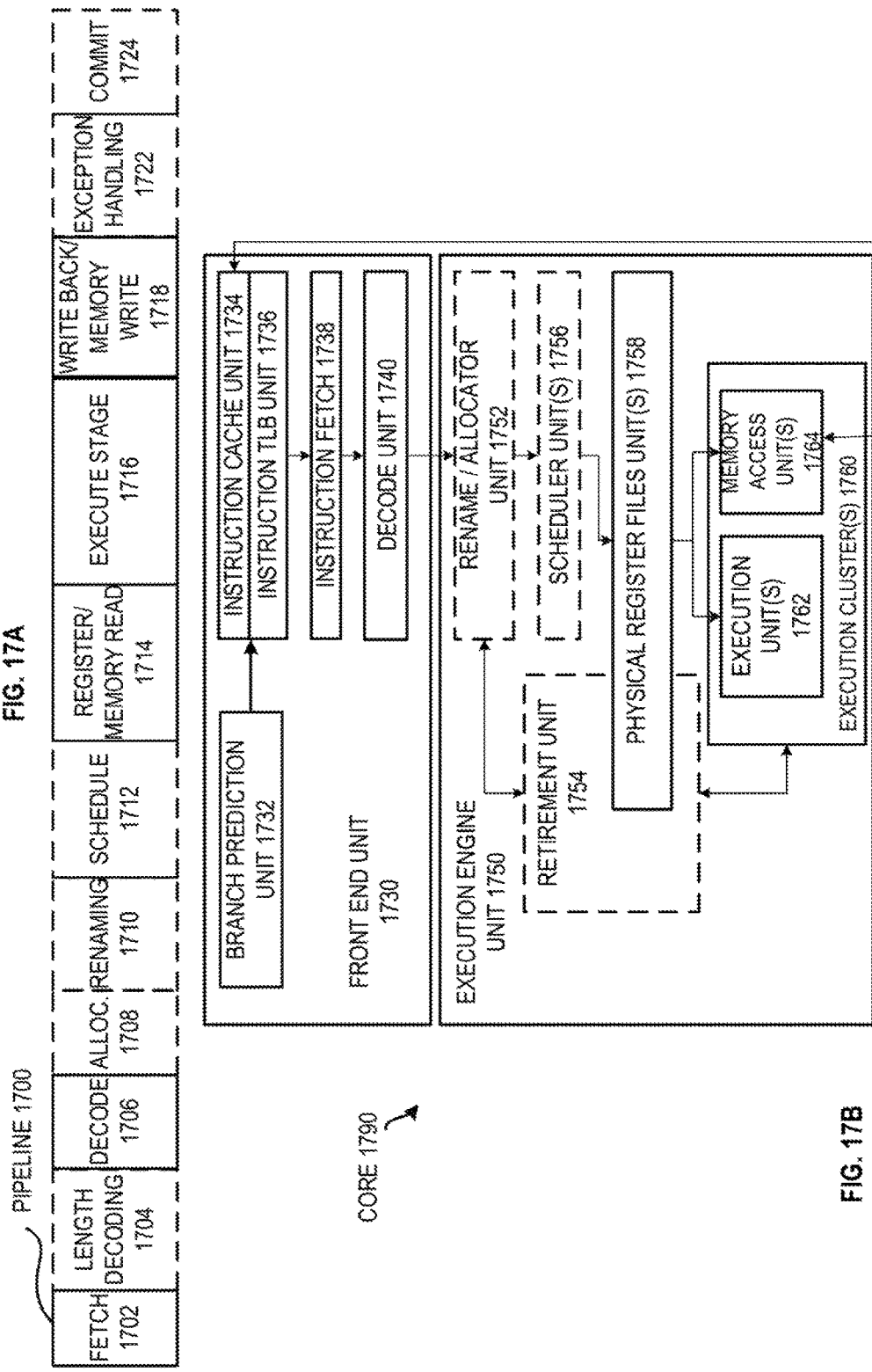

FIG. 17A is a block diagram illustrating an embodiment of an in-order pipeline and an embodiment of a register renaming out-of-order issue/execution pipeline.

FIG. 17B is a block diagram of an embodiment of processor core including a front end unit coupled to an execution engine unit and both coupled to a memory unit.

Figure 18B:
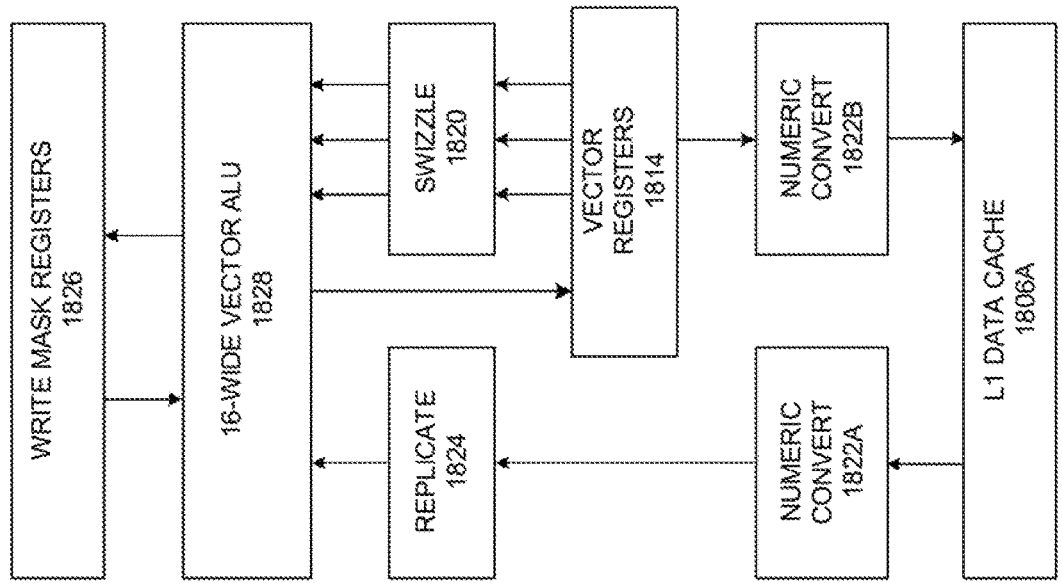
Figure 18A:
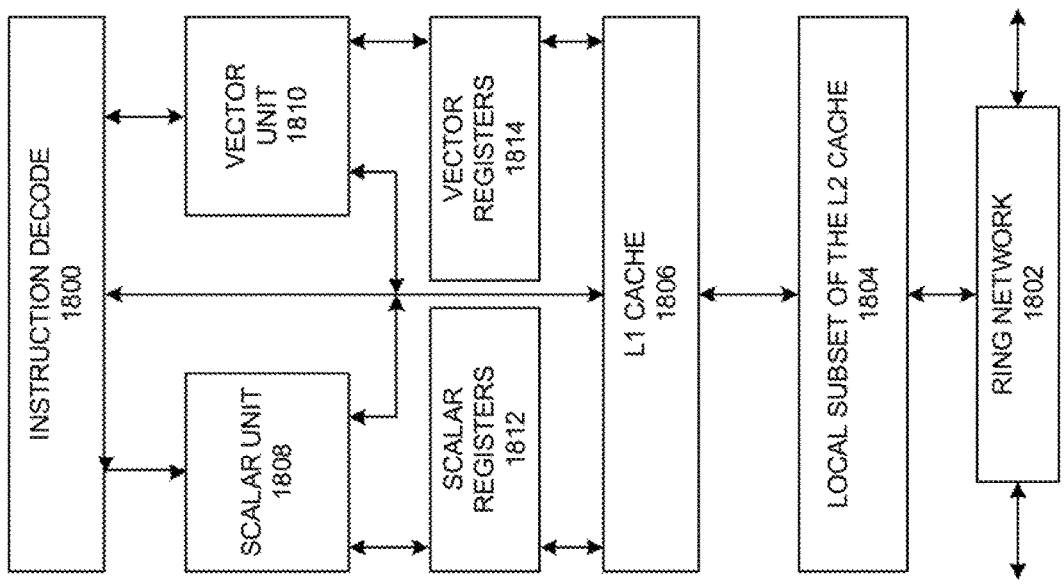

FIG. 18A is a block diagram of an embodiment of a single processor core, along with its connection to the on-die interconnect network, and with its local subset of the Level 2 (L2) cache.

FIG. 18B is a block diagram of an embodiment of an expanded view of part of the processor core of FIG. 18A.

Figure 19:
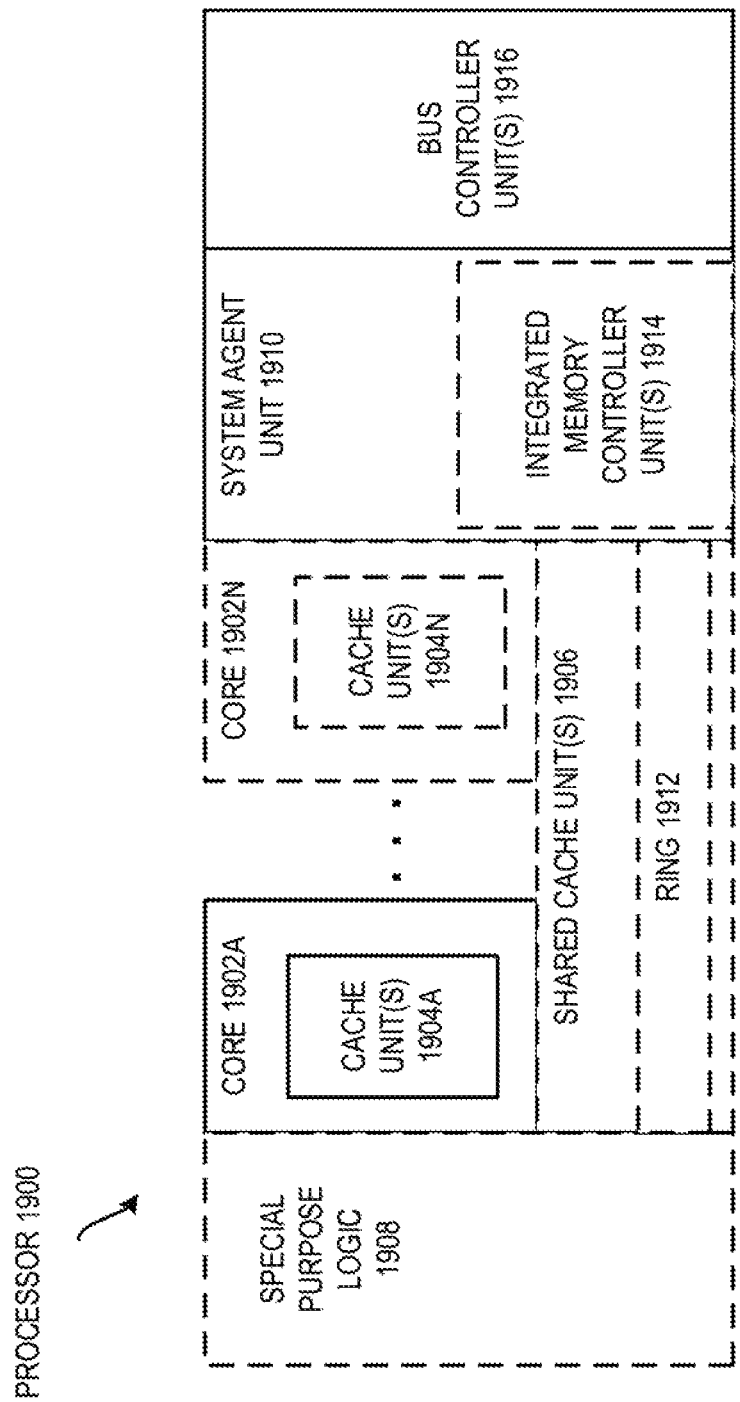

FIG. 19 is a block diagram of an embodiment of a processor that may have more than one core, may have an integrated memory controller, and may have integrated graphics.

Figure 20:
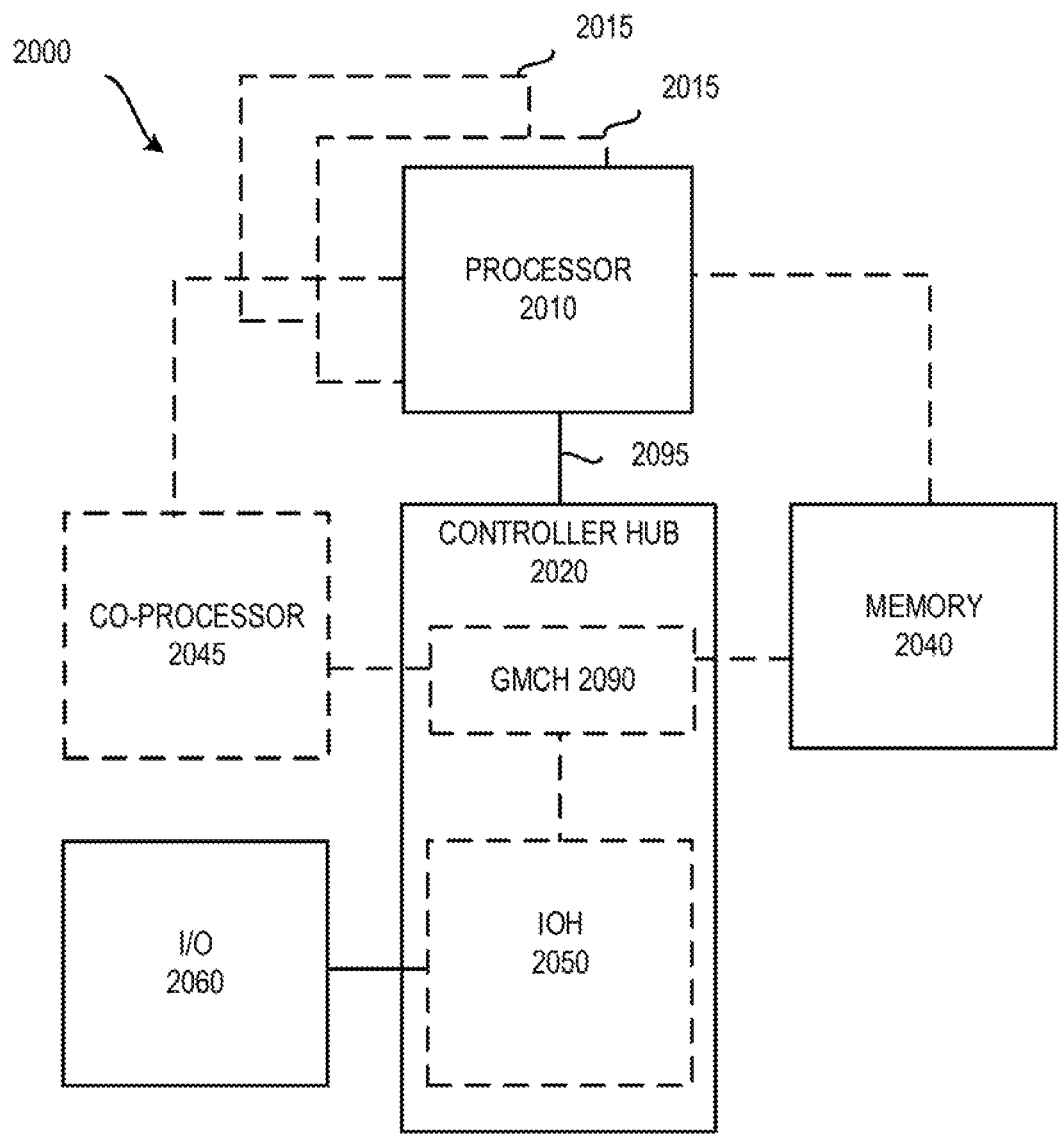

FIG. 20 is a block diagram of a first embodiment of a computer architecture.

Figure 21:
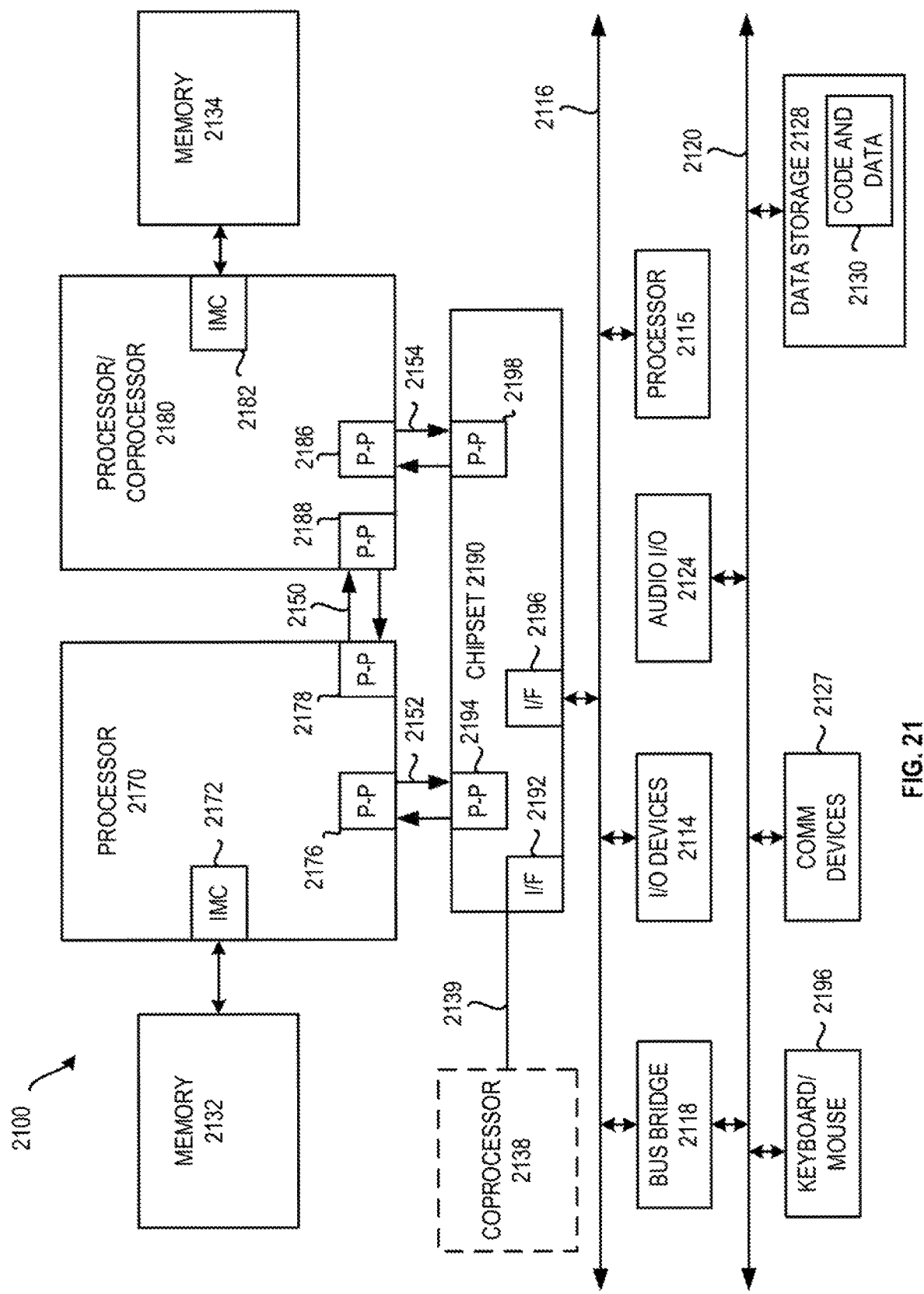

FIG. 21 is a block diagram of a second embodiment of a computer architecture.

Figure 22:
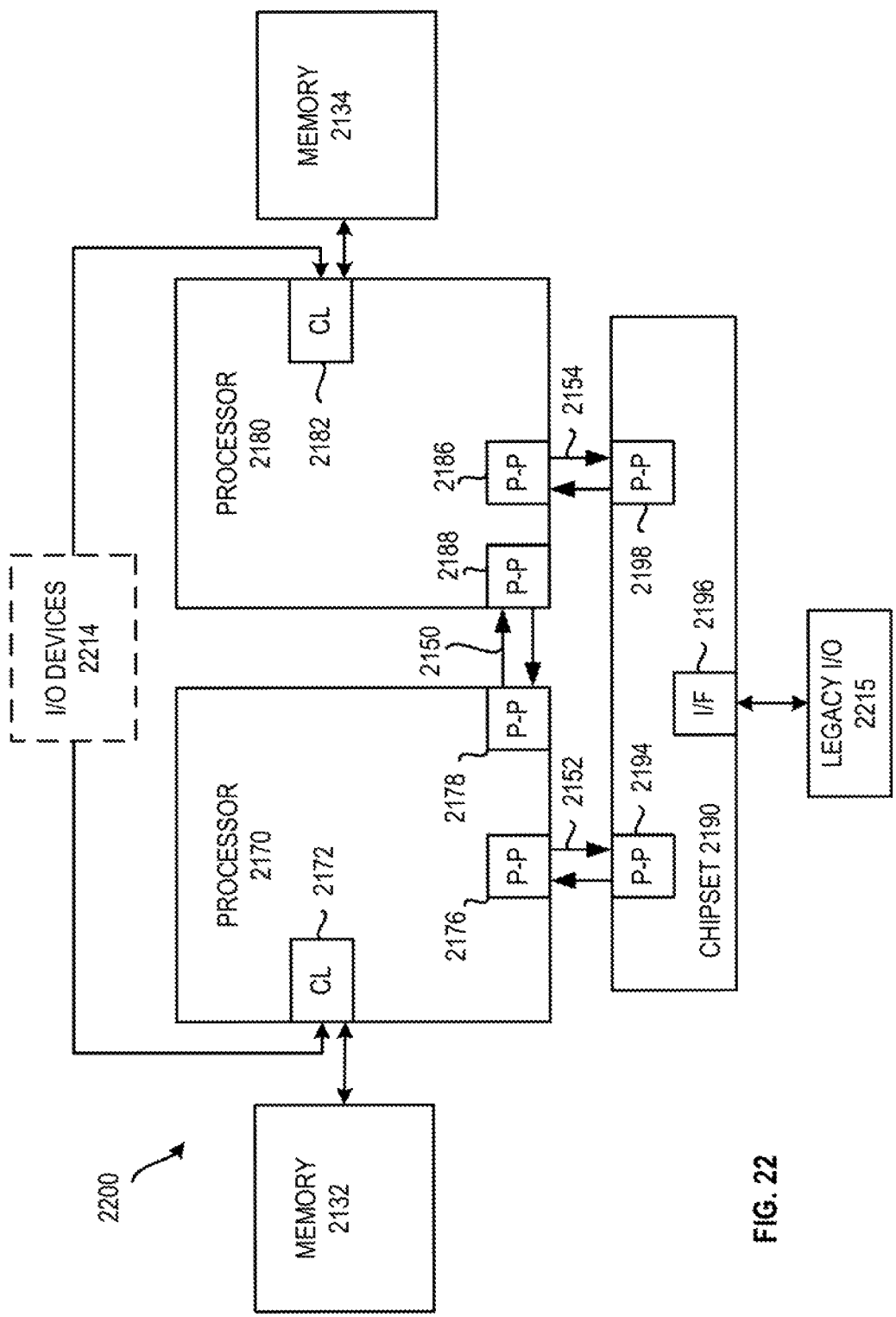

FIG. 22 is a block diagram of a third embodiment of a computer architecture.

Figure 23:
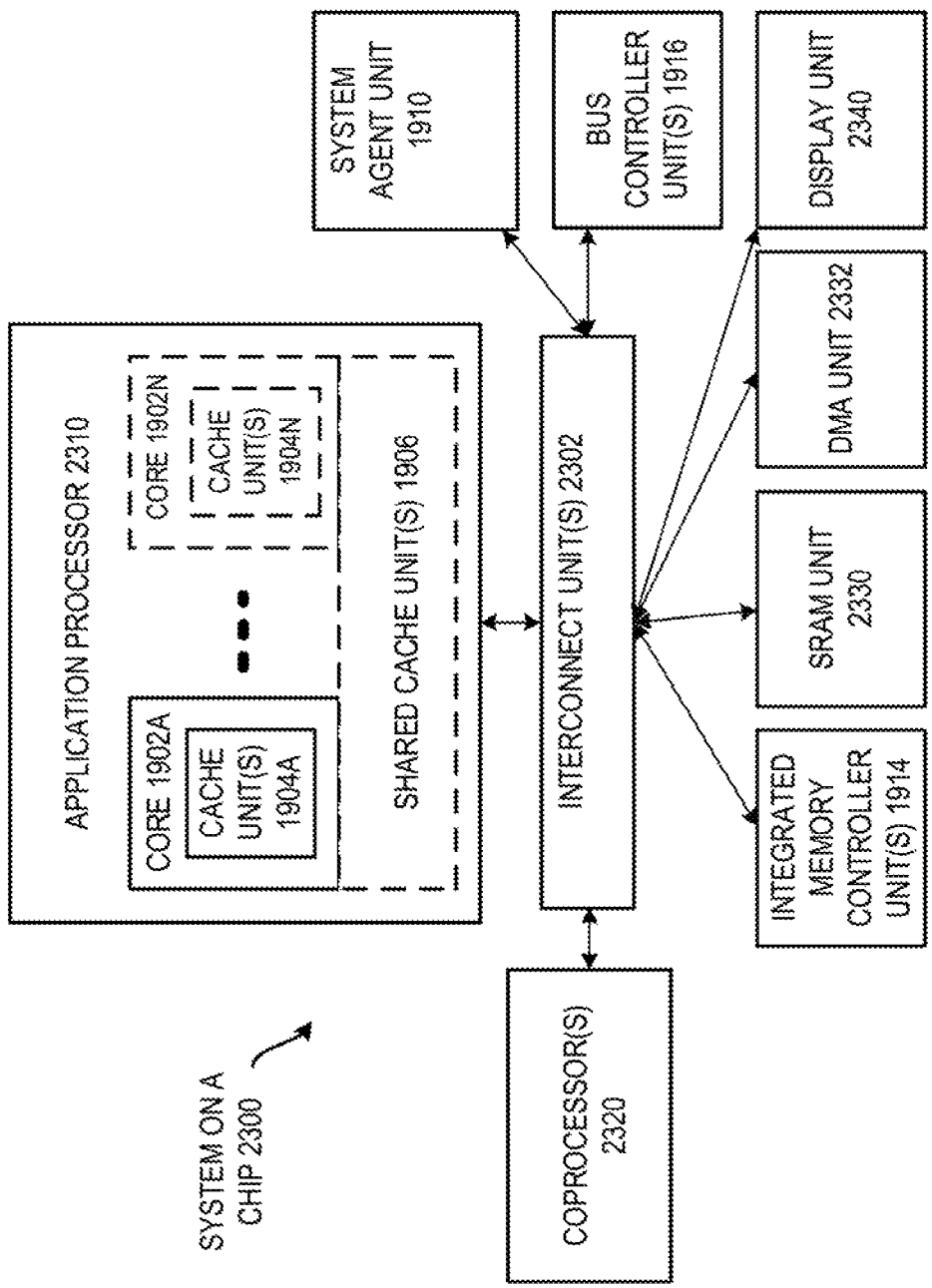

FIG. 23 is a block diagram of a fourth embodiment of a computer architecture.

Figure 24:
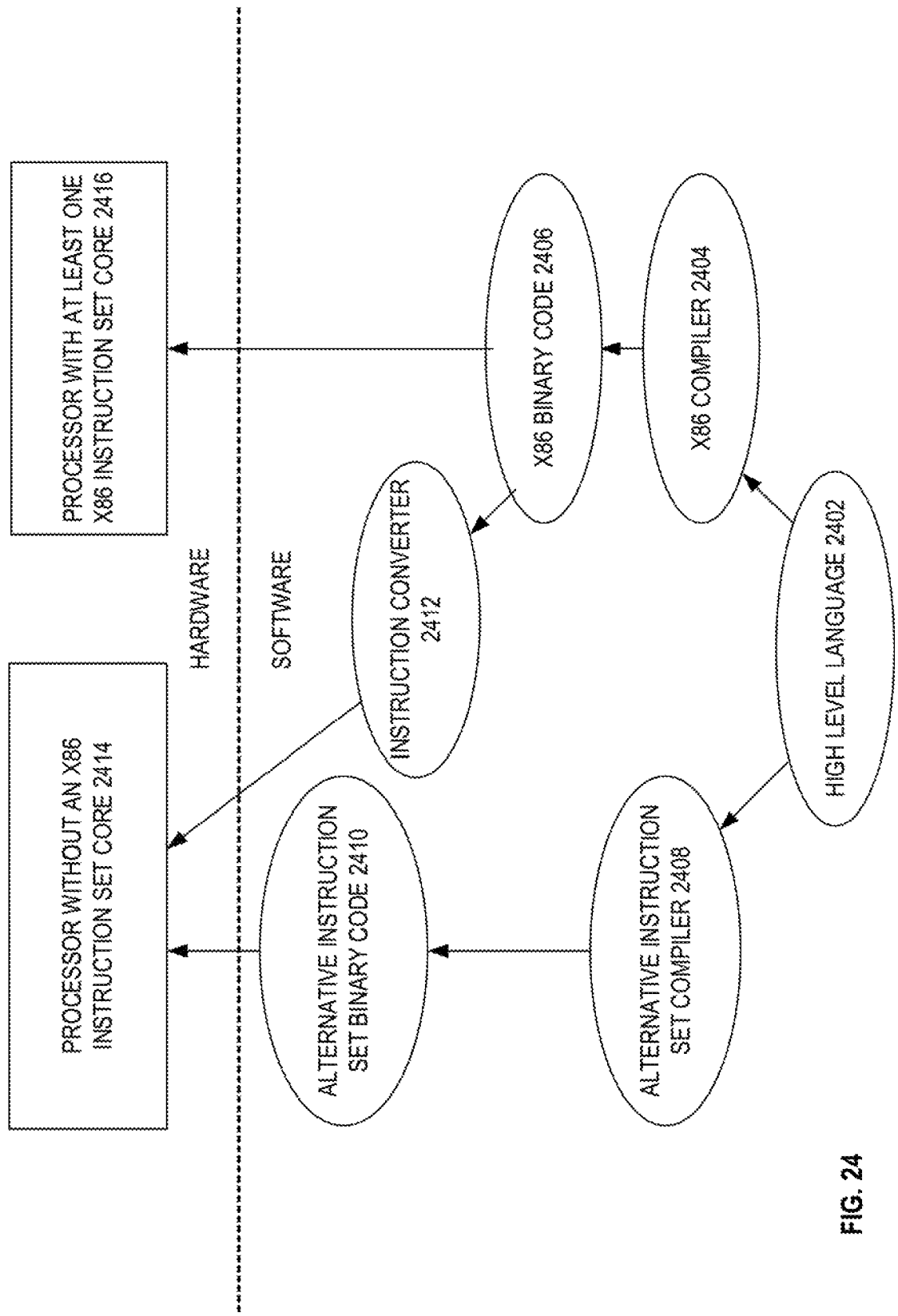

FIG. 24 is a block diagram of use of a software instruction converter to convert binary instructions in a source instruction set to binary instructions in a target instruction set, according to embodiments of the invention.

DETAILED DESCRIPTION OF EMBODIMENTS

Disclosed herein are bit shuffle instructions, processors to execute the instructions, methods performed by the processors when processing or executing the instructions, and systems incorporating one or more processors to process or execute the instructions. In the following description, numerous specific details are set forth (e.g., specific instruction operations, data formats, processor configurations, microarchitectural details, sequences of operations, etc.). However, embodiments may be practiced without these specific details. In other instances, well-known circuits, structures and techniques have not been shown in detail to avoid obscuring the understanding of the description.

Figure 1:
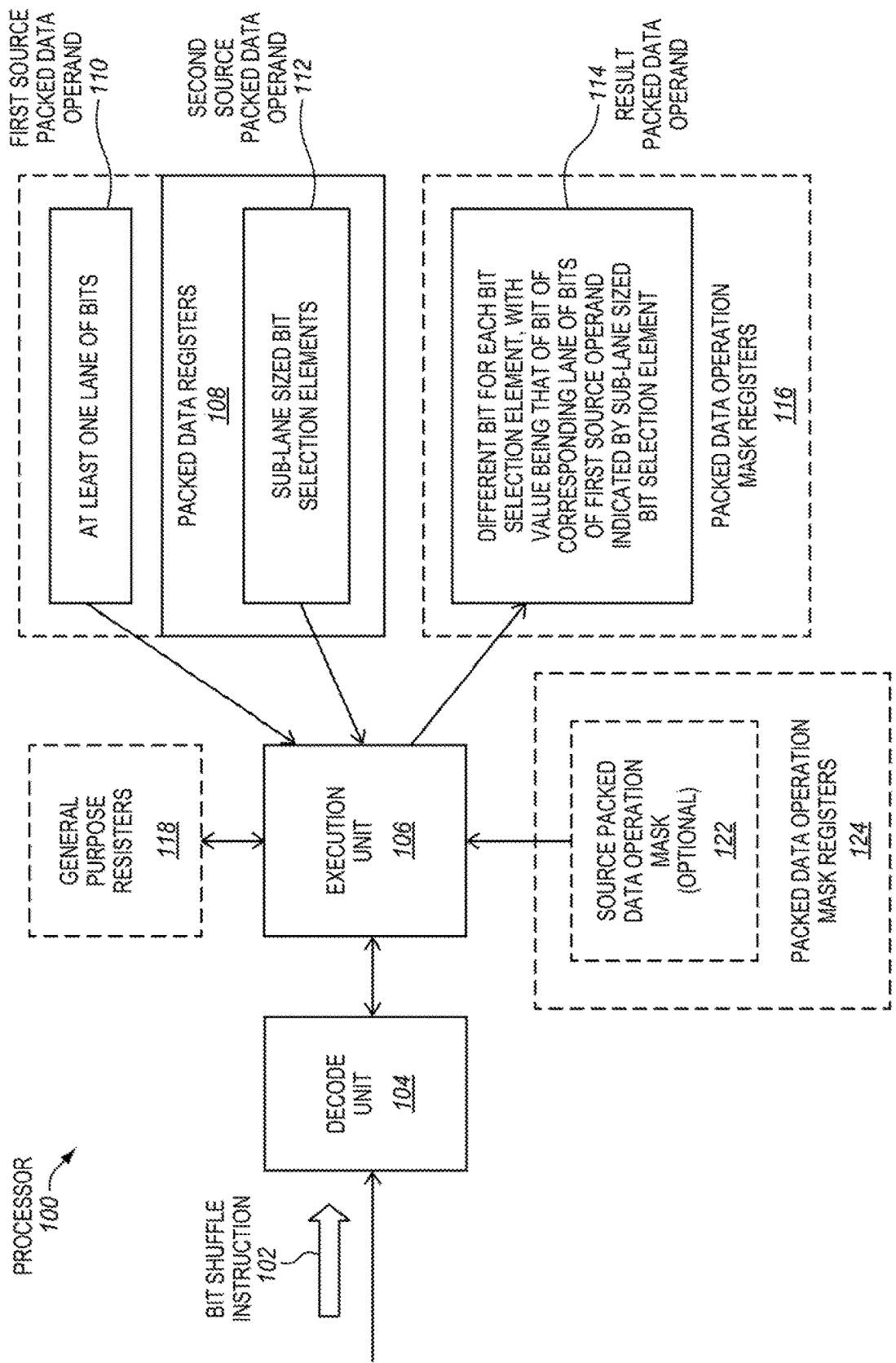
FIG. 1 is a block diagram of an embodiment of a processor that is operable to perform an embodiment of a bit shuffle instruction.

FIG. 1 is a block diagram of an embodiment of a processor 100 that is operable to perform an embodiment of a bit shuffle instruction 102. In some embodiments, the processor may be a general-purpose processor (e.g., a general-purpose microprocessor or central processing unit (CPU) of the type used in desktop, laptop, or other computers). Alternatively, the processor may be a special-purpose processor. Examples of suitable special-purpose processors include, but are not limited to, cryptographic processors, communications processors, network processors, co-processors, graphics processors, embedded processors, digital signal processors (DSPs), and controllers (e.g., microcontrollers). The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures).

During operation, the processor 100 may receive the bit shuffle instruction 102. For example, the instruction may be received from memory over an interconnect. The bit shuffle instruction may represent a macroinstruction, assembly language instruction, machine code instruction, or other instruction or control signal of an instruction set of the processor. The instruction set is part of the instruction set architecture (ISA) of the processor and includes the native instructions that the processor is operable to execute.

In some embodiments, the bit shuffle instruction may explicitly specify (e.g., through one or more source operand specification fields or a set of source operand specification bits), or otherwise indicate implicitly indicate), a first source operand 110 that is to have at least one lane of bits (e.g., a 16-bit, 32-bit, 64-bit, or 128-bit lane of bits). In some embodiments, each of the at least one lane of bits may be a different packed data element (e.g., a 16-bit, 32-bit, or 64-bit integer or other data element). In some embodiments, the instruction may explicitly specify, or otherwise indicate, a second source packed data operand that is to have a number of sub-lane sized bit selection elements. The sub-lane sized bit selection elements may each have less bits than each of the at least one lane of bits (e.g., each sub-lane sized bit selection element may have 8-bits, 6-bits, 5-bits, 4-bits, or 3-bits,). As will be described further below, each of the sub-lane sized bit selection elements is operative to specify or select an individual bit position in a corresponding lane. As one specific example, a 6-bit sized bit selection element may be operative to specify any one of sixty four different bit positions of a 64-bit lane (e.g., a 64-bit quadword integer). In one aspect, the 6-bit sized bit selection element may be included in an 8-bit byte but only six of the eight bits may be used for selection.

Referring again to FIG. 1, the processor includes a decode unit or decoder 104. The decode unit may receive and decode the bit shuffle instruction 102. The decode unit may output one or more relatively lower-level instructions or control signals (e.g., one or more microinstructions, micro-operations, micro-code entry points, decoded instructions or control signals, etc.), which reflect, represent, and/or are derived from the relatively higher-level bit shuffle instruction. In some embodiments, the decode unit may include one or more input structures (e.g., port(s), interconnect(s), an interface) to receive the bit shuffle instruction, an instruction recognition and decode logic coupled therewith to recognize and decode the bit shuffle instruction, and one or more output structures (e.g., port(s), interconnect(s), an interface) coupled therewith to output the lower-level instruction(s) or control signal(s). The decode unit may be implemented using various different mechanisms including, but not limited to, microcode read only memories (ROMs), look-up tables, hardware implementations, programmable logic arrays (PLAs), and other mechanisms used to implement decode units known in the art. In some embodiments, instead of the bit shuffle instruction being provided directly to the decode unit, an instruction emulator, translator, morpher, interpreter, or other instruction conversion module may optionally be used.

Referring again to FIG. 1, the processor 100 also includes a set of packed data registers 108. In some embodiments, the processor may also optionally include a set of packed data operation mask registers 116. In some embodiments, the processor may also optionally include a set of general-purpose registers 118. Each of these registers may represent an on-die storage location that is operable to store data. The packed data registers may be operable to store packed data, vector data, or Single instruction, multiple data (SIMD) data. The packed data operation mask registers, in some embodiments, may be operable to store results of bit shuffle instructions, and may also be operative to store packed data operation masks (e.g., predication masks). The packed data registers, packed data operation mask registers, and general-purpose registers may each represent architecturally-visible or architectural registers that are visible to software and/or a programmer and/or are the registers indicated by instructions of the instruction set of the processor to identify operands. These architectural registers are contrasted to other non-architectural registers in a given microarchitecture (e.g., temporary registers, reorder buffers, retirement registers, etc.). These registers may be implemented in different ways in different microarchitectures using well-known techniques and are not limited to any particular type of design. Examples of suitable types of registers include, but are not limited to, dedicated physical registers, dynamically allocated physical registers using register renaming, and combinations thereof.

In some embodiments, the second source packed data operand 112, which is to have the number of sub-lane sized bit selection elements, may optionally be stored in one of the packed data registers 108. Alternatively, the second source packed data operand may optionally be stored in a memory location, or other storage location. As shown, in some embodiments, the first source operand 110, which is to have the at least one lane of bits, may also optionally be stored in one of the packed data registers 108 (e.g., if the first source operand is a packed data operand). Alternatively, the first source operand 110 may optionally be stored in one of general-purpose registers 118 (e.g., if the first source operand has a single 16-bit, 32-bit, or 64-bit lane of bits). In still other embodiments, the first source operand 110 may optionally be stored in memory (e.g., if the first source operand is a packed data operand or if the first source operand has a single scalar lane of bits).

Referring again to FIG. 1, an execution unit 106 is coupled with the decode unit 104, the packed data registers 108, the general-purpose registers 118, and the optional packed data operation mask registers 116. The execution unit may receive the one or more decoded or otherwise converted instructions or control signals that represent and/or are derived from the bit shuffle instruction. The execution unit may also receive the first source operand 110, which is to have the at least one lane of bits, and the second source packed data operand 112, which is to have the number of sub-lane bit selection elements. The execution unit may be operative in response to and/or as a result of the bit shuffle instruction (e.g., in response to one or mare instructions or control signals decoded from the bit shuffle instruction) to store the result operand 114 in a destination storage location that is to be indicated by the bit shuffle instruction.

In some embodiments, the result operand 114 may include a different corresponding bit for each of the number of sub-lane sized bit selection elements of the second source packed data operand 112. In some embodiments, a value of each bit of the result operand 114, which corresponds to a sub-lane sized bit selection element, may be equal in bit value to that of a selected, specified, or otherwise indicated bit, within a corresponding lane of bits, of the at least one lane of bits of the first source operand 110. The selected or indicated bit may be selected or indicated by the corresponding sub-lane sized bit selection element. For example, each sub-lane sized bit selection element of the second source packed data operand 112 may select or indicate a position of a bit in a corresponding lane of the first source operand 110 whose value is to be included in bit of the result operand 114 that corresponds to the bit selection element of the second source packed data operand 112. For example, the sub-lane sized bit selection element may have a value (e.g., a value of 23) to specify or indicate a bit position e.g., the twenty-third bit position) within the corresponding lane of bits. In some embodiments, all sub-lane sized bit selection elements may correspond to the same single lane of the first source operand. In other embodiments, different lanes of sub-lane sized bit selection elements may each correspond to a lane in a corresponding relative position. In some embodiments, the result operant 114 may be any of those shown and described for FIGS. 3-8, although the scope of the invention is not so limited.

As shown, in the illustrated embodiment, the result operand 114 may optionally be stored in one of the packed data operation mask registers 116, although this is not required. In other embodiments, the result operand may instead be stored in one of the general-purpose registers 118. In still other embodiments, the result operand may be a result packed data operand, and may be stored in one of the packed data registers 108. Alternatively, memory or other storage locations may be used to store the result operand.

The execution unit and/or the processor may include specific or particular logic (e.g., transistors, integrated circuitry, or other hardware potentially combined with firmware (e.g., instructions stored in non-volatile memory) and/or software) that is operable to perform the bit shuffle instruction and/or store the result in response to and/or as a result of the bit shuffle instruction (e.g., in response to one or more instructions or control signals decoded from the bit shuffle instruction). By way of example, the execution unit may include a logical, unit, an arithmetic logic unit, or a digital circuit to perform logical or bit manipulation operations, or the like. In some embodiments, the execution unit may include one or more input structures (e.g., port(s), interconnect(s), an interface) to receive source operands, circuitry or logic coupled therewith to receive and process the source operands and generate the result operand, and one or more output structures (e.g., port(s), interconnect(s), an interface) coupled therewith to output the result operand. In one possible implementation, the circuitry or logic to process the source operands and generate the result operand may include a separate multiplexer or other selection logic for each lane that has lines or interconnects coupling all bits of the lane as inputs and a bit selection element as an input, and that is operable to select a single bit of the lane indicated by the bit selection element and an output coupling the selected single bit to a bit position in the result operand corresponding to the bit selection element.

Advantageously, the bit shuffle instruction may be used to accelerate and/or improve the performance of bit manipulation operations in processors. These bit manipulation operations are in widespread use in such applications as packet processing, cryptography, matrix transposition, and the like. Each bit selection element of the second source packed data operand 112, of which there may optionally be a fairly large number (e.g., at least sixteen, at least thirty-two, etc.) may allow a single individual bit to be selected and stored bitwise from the first operand to the result operand within the confines of the execution of a single instruction. This may allow the individual bits to be moved around or rearranged with great flexibility (e.g., allowing full shuffles in which every bit is potentially moved to a different location by the single instruction). In one specific example, each of 64-bits of the first source operand may be shuffled to a different bit position in the result operand using sixty-four different bit selection elements of the second source packed data operand within the confines of a single instruction. Moreover, the instruction may be operative to cause the processor to manipulate individual bits, rather than needing to manipulate or operate on the whole data element or lane for each bit value obtained. (e.g., there is no need to rotate or shift the whole data element or lane for each individual bit value obtained).

To avoid obscuring the description, a relatively simple processor 100 has been shown and described. However, the processor may optionally include other well-known processor components. Possible examples of such components include, but are not limited to, general-purpose registers, a status register (sometimes called a flags register), system control registers, an instruction fetch unit, prefetch buffers, one or more levels of cache (e.g., a level 1 (L1) instruction cache, an L1 data cache, and an L2 data/instruction cache), an instruction translation lookaside buffer (TLB), a data TLB, a branch prediction unit, out-of-order execution units (e.g., an instruction scheduling unit, a register rename and/or allocation unit, an instruction dispatch unit, a reorder buffer (ROB), a reservation station, a memory order buffer, a retirement unit, etc.), a bus interface unit, an address generation unit, a debug unit, a performance monitor unit, a power management unit, other components included in processors, and various combinations thereof. Such components may be coupled together in various different suitable combinations and/or configurations known in the arts. Embodiments are not limited to any known such combination or configuration. Moreover, embodiments may be included in processors have multiple cores at least one of which is operative to perform a bit shuffle instruction.

Figure 2:
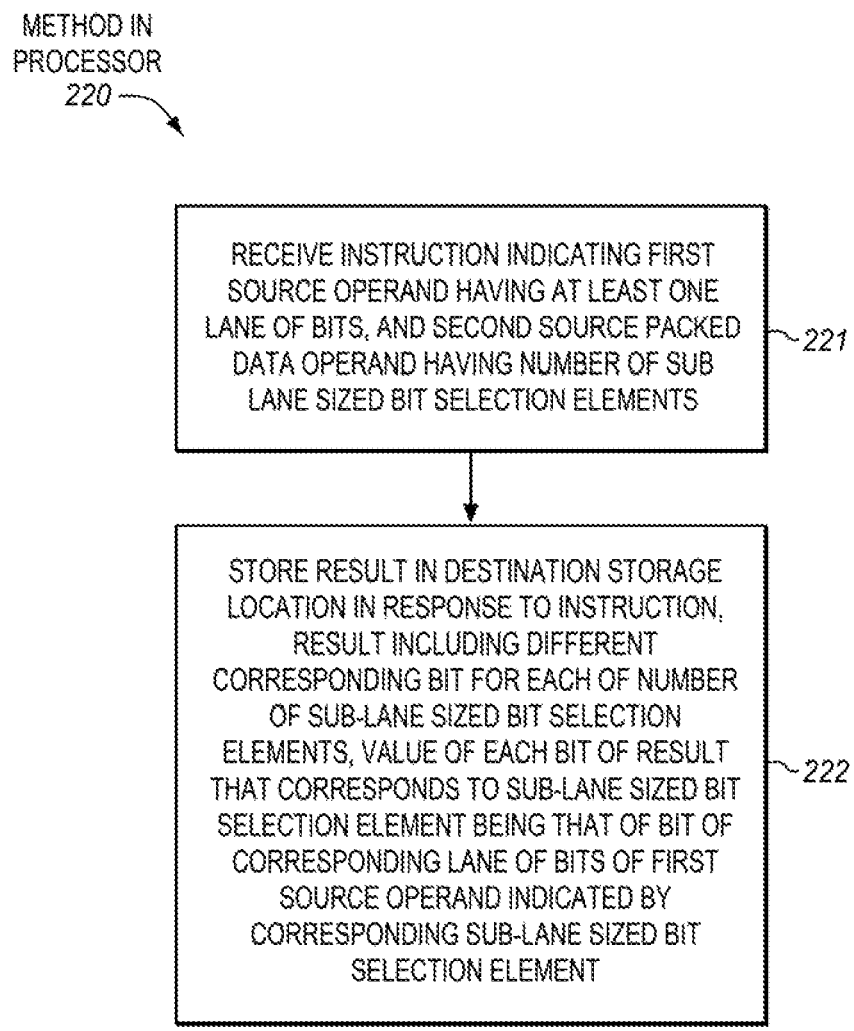
FIG. 2 is a block flow diagram of an embodiment of a method in a processor of performing an embodiment of a bit shuffle instruction.

FIG. 2 is a block flow diagram of an embodiment of a method 220 in a processor of performing an embodiment of a bit shuffle instruction. In some embodiments, the method 220 may be performed by and/or within the processor 100 of FIG. 1. The components, features, and specific optional details described herein for the processor 100 also optionally apply to the method 220. Alternatively, the method 220 may be performed by and/or within a similar or different processor or apparatus. Moreover, the processor 100 may perform methods the same as, similar to, or different than method 220.

The method includes receiving the bit shuffle instruction, at block 221. In various aspects, the instruction may be received at a processor or a portion thereof (e.g., an instruction fetch unit, a decode unit, a bus interface unit, etc.). In various aspects, the instruction may be received from an off-processor and/or off-die source (e.g., from memory, interconnect, etc.), or from an on-processor and/or on-die source (e.g., from an instruction cache, instruction queue, etc.). In some embodiments, the bit shuffle instruction may specify or otherwise indicate a first source operand having at least one lane of bits, or in some cases a plurality of lanes of bits. The instruction may also specify or otherwise indicate a second source packed data operand having a number of sub-lane sized bit selection elements.

A result operand may be generated and stored in a destination storage location indicated by the bit shuffle instruction in response to and/or as a result of the bit shuffle instruction (e.g., as a result of decoding the bit shuffle instruction), at block 222. In some embodiments, the result operand may include a different corresponding bit for each of the number of sub-lane sized bit selection elements. In some embodiments, a value of each bit of the result operand that corresponds to a sub-lane sized bit selection element, may be equal to that of a selected, specified, or otherwise indicated bit, of a corresponding lane of bits, of the at least one lane of bits of the first source operand. The selected or indicated bit may be selected or indicated by the corresponding sub-lane sized bit selection element.

In some embodiments, all sub-lane sized bit selection elements may correspond to the same single lane of bits of the first source operand. In other embodiments, multiple lanes of sub-lane sized bit selection elements may each correspond to a different corresponding lane of a set of lanes of the first source operand.

In some embodiments, the destination storage location may be a packed data operation mask register that may be used by other instructions of the instruction set to store packed data operation masks (e.g., predication masks). In other embodiments, the destination storage location may be a packed data register and the bits of the result operand may be included in different lanes corresponding to different lanes of the second source packed data operand.

The illustrated method involves architectural operations (e.g., those visible from a software perspective). In other embodiments, the method may optionally include one or more microarchitectural operations. By way of example, the instruction may be fetched, decoded, scheduled out-of-order, source operands may be accessed, an execution unit may perform microarchitectural operations to implement the instruction, etc. In some embodiments, the microarchitectural operations to implement the instruction may optionally include any of these described below in conjunction with FIGS. 3-8, although the scope of the invention is not so limited.

Figure 3:
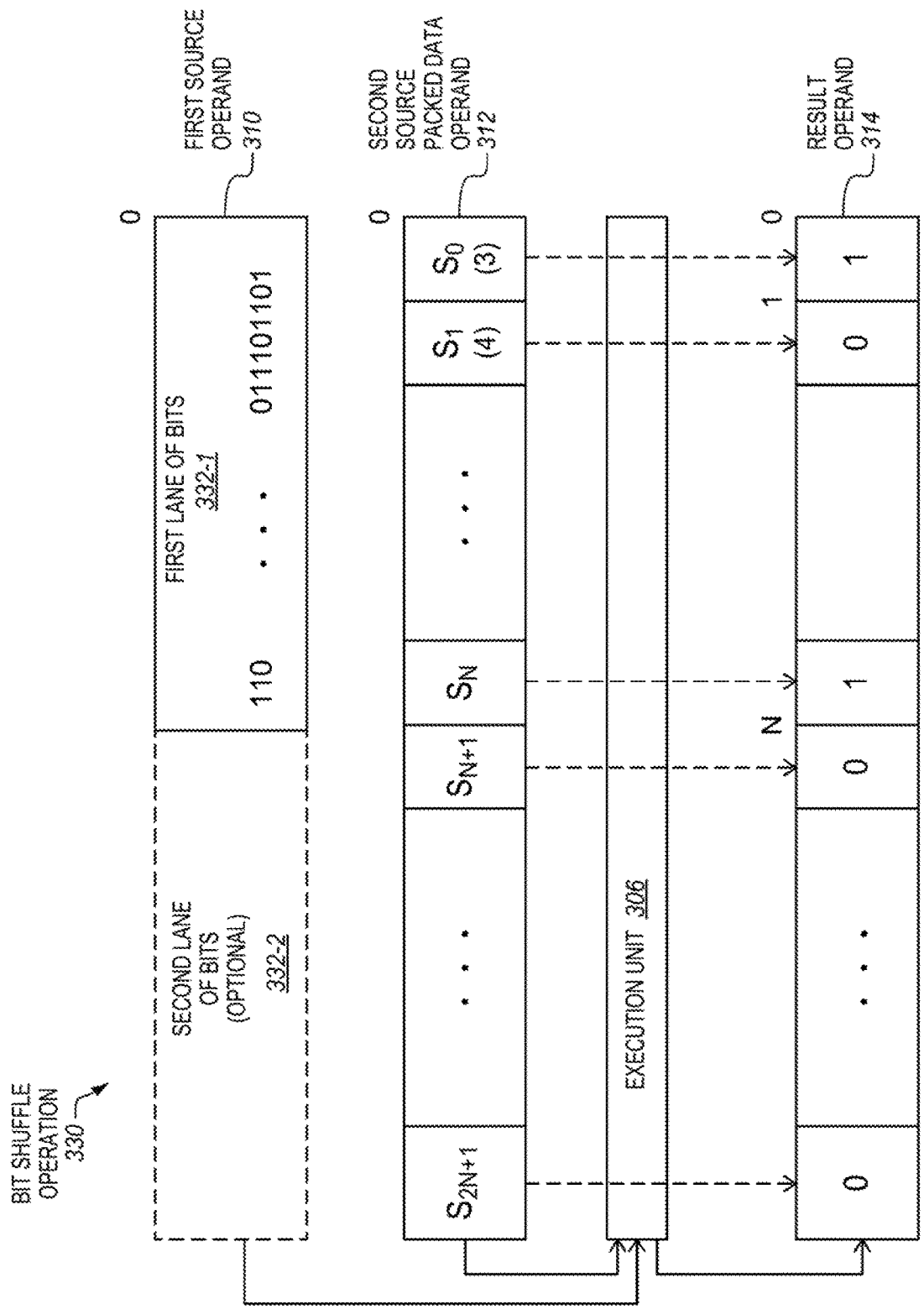
FIG. 3 is a block diagram of an embodiment of a bit shuffle operation.

FIG. 3 is a block diagram illustrating an embodiment of a bit shuffle operation 330 that may be performed in response to an embodiment of a bit shuffle instruction. The instruction may specify or otherwise indicate a first source operand 310, and may specify or otherwise indicate a second source packed data operand 312. In various embodiments, the width or size of the first source packed data operand may be 16-bits, 32-bits, 64-bits, 128-bits, 256-bits, 512-bits, or 1024-bits, although the scope of the invention is not so limited. The first source operand has at least one lane of bits. As shown in the illustration, in some embodiments, the first source operand may have a first lane of bits 332-1 and an optional second lane of bits 332-2. In various embodiments, each of these lanes of bits may have 16-bits, 32-bits, 64-bits, or 128-bits, although the scope of the invention is not so limited.

The second source packed data operand has a number of sub-lane sized bit selection elements $S_0$ to $S_{2N+1}$ (collectively S). The total number of these sub-lane sized bit selection elements may be any number desired for the particular implementation. In some embodiments, each sub-lane sized bit selection element may have 4-bits, 5-bits, 6-bits, 7-bits, or 8-bits, although the scope of the invention is not so limited. In some embodiments, each sub-lane sized bit selection element may be included in a different corresponding 8-bit byte of the second source packed data operand. For example, each sub-lane sized bit selection element may have 4-bits, 5-bits, 6-bits, or 7-bits and may be included in a different corresponding byte. Representatively, only the 4, 5, 6, or 7 least-significant bits (or alternatively the 4, 5, 6, or 7 most-significant bits) of each byte may be used for bit selection. For example, only the least-significant 6-bits of each corresponding 8-bit byte may be used for bit selection, while the remaining most significant 2-bits of each byte may optionally be ignored (or at least not used for bit selection). In such cases, the number of sub-lane sized bit selection elements may be equal to the size in bits of the second source packed data operand divided by 8-bits. Alternatively, two 4-bit nibble sized bit selection elements may optionally be included in each 8-bit byte. In various embodiments, the width or size of the second source packed data operand may be 64-bits, 128-bits, 256-bits, 512-bits, or 1024-bits, although the scope of the invention is not so limited. The 64-bit, 128-bit, 256-bit, 512-bit, and 1024-bit second source packed data operands may, respectively, include eight, sixteen, thirty two, sixty four, or one hundred twenty eight bytes. In some embodiments, there may be at least sixteen sub-lane sized bit selection elements in the second source packed data operand.

In embodiments where the instruction/operation uses only a single lane of bits of the first source operand 310, all of the number of sub-lane sized bit selection elements $S_0$ to $S_{2N+1}$) may correspond to the single lane of bits (e.g., the first lane 332-1). Alternatively, in other embodiments the instruction/operation may use multiple lanes of bits that are either part of the first source operand 310 or are derived from the first source operand (e.g., broadcast or otherwise replicated from the first source operand). For example, the instruction may indicate the first source operand having a single lane of bits that is to be broadcast or replicated into multiple lanes of bits that are to be used by the instruction/operation. In such embodiments where the instruction/operation uses multiple lanes of bits, the sub-lane sized bit selection elements may be logically grouped or apportioned into different subsets, with each subset corresponding to a different lane of bits. In such cases, each subset of bit selection elements may be used to select, specify, or otherwise identify bits of the first source operand within only the corresponding lane of bits. For example, the sub-lane sized bit selection elements $S_0$ to $S_N$ may correspond to, and may be used to identify bits within only the first lane of bits 332-1, while the sub-lane sized bit selection elements $S_{N+1}$ to $S_{2N+1}$ may correspond to, and may be used to identify bits within only the second lane of bits 332-2.

A result operand 314 may be generated (e.g., by an execution unit 306) and stored in a destination storage location in response to the bit shuffle instruction/operation. The destination storage location may be specified or otherwise indicated by the instruction. In some embodiments, the result operand may include a different corresponding bit for each of the number of sub-lane sized bit selection elements of the second source packed data operand. For example, bit[0] of the result operand may correspond to bit selection element $S_0$, bit[1] of the result operand may correspond to bit selection element $S_1$, and so on. In some embodiments, the result operand may also include additional bits (e.g., replicated copies of bits), as will be described further below. In some embodiments, a value of each bit of the result operand (at least those bits that corresponds to a sub-lane sized bit selection element) may be equal to that of a bit of a corresponding lane of bits, of the at least one lane of bits of the first source operand, which is specified, selected, or otherwise indicated by the corresponding sub-lane sized bit selection element. For example, each bit selection element may select a bit position in a corresponding lane of bits of the first source operand, and the value of the bit at that position may be stored to the appropriate corresponding bit position for that bit selection element in the result operand. For example, in the illustrated example embodiment, the bit selection element S0 may have a value of three (3) to identify bit[3] of the first lane of bits 332-1 having a value of binary one (1), bit selection element S1 may have a value of four (4) to identify bit[4] of the first lane of bits 332-1 having a value of binary zero (0) (noting that bit[0] is the first bit), and so on. In some embodiments, the destination storage location used to store the result operand may be a packed data operation mask register. In other embodiments, the destination storage location may be a general-purpose register. Alternatively, memory locations or other storage locations may optionally be used, if desired.

Figure 4:
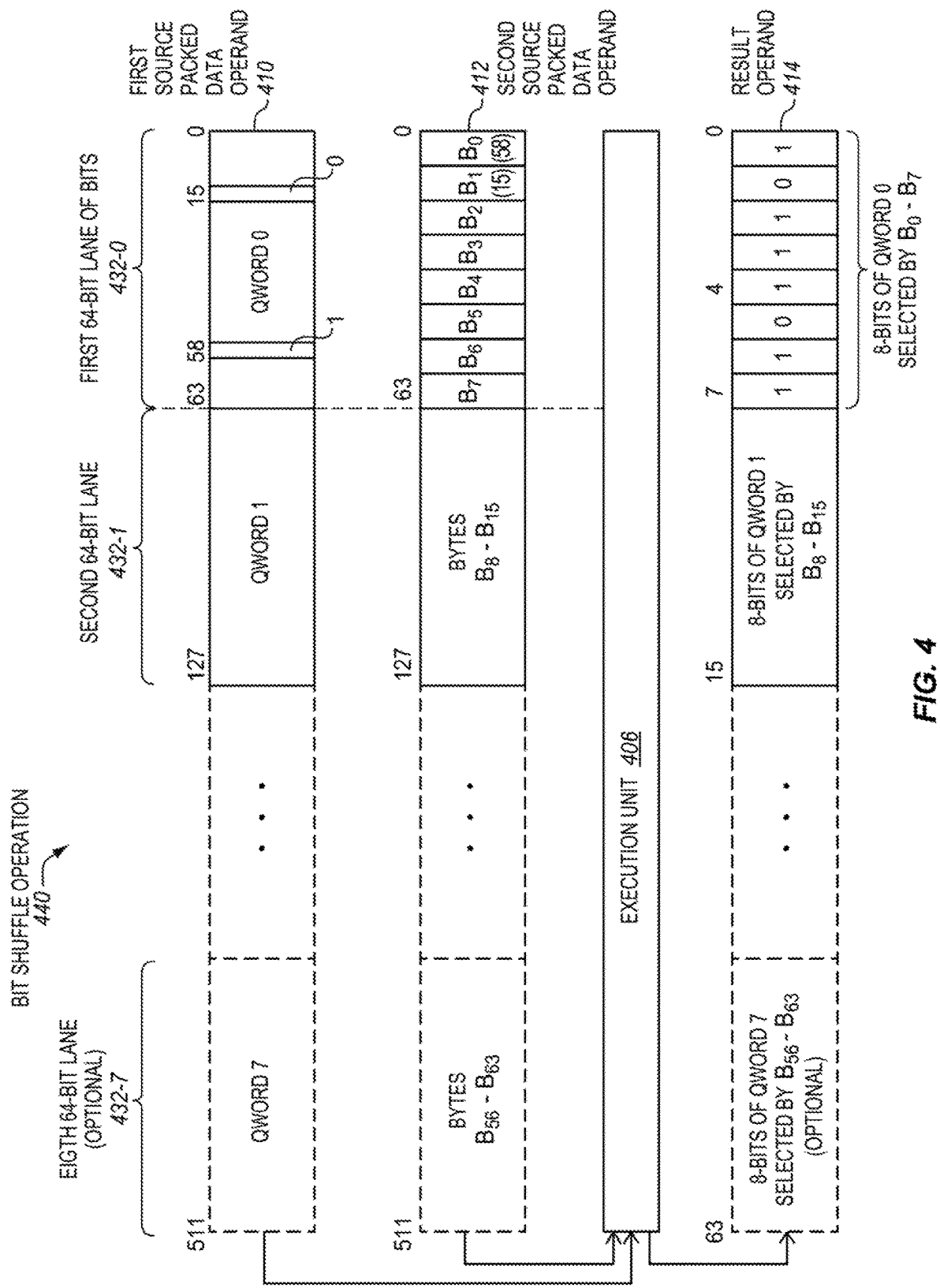
FIG. 4 is a block diagram of an embodiment of a bit shuffle operation to shuffle bits of 64-bit lanes of a first source packed data operand using 8-bit byte sized bit selection elements in a second source packed data operand to generate a scalar result operand.

FIG. 4 is a block diagram illustrating an embodiment of a bit shuffle operation 440 that may be performed to shuffle bits of 64-bit lanes (e.g., having quadword (QWORD) integers) of a first source packed data operand 410 using 8-bit byte sized bit selection elements in a second source packed data operand 412 to generate a scalar result operand 414. The operation may be performed in response to an embodiment of a bit shuffle instruction. The instruction may specify or otherwise indicate the first source packed data operand, and may specify or otherwise indicate the second source packed data operand.

In this embodiment, the first source packed data operand 410 has at least 128-bits, optionally up to 512-bits, and has multiple lanes of bits 432. Specifically, in the illustrated embodiment, the first source packed data operand has a first 64-bit lane of bits 432-0, a second 64-bit lane of bits 432-1, optionally up to an eighth 64-bit lane of bits 432-7. In one aspect, these at least two (or up to eight) 64-bit lanes may each be operable to hold a corresponding one of at least two (or up to eight) 64-bit quadword integers (e.g., QWORD0 to QWORD7).

In this embodiment, the second source packed data operand 412 has at least 28-bits, optionally up to 512-bits, and has a number of 8-bit byte sized bit selection elements (B). Specifically, in the illustrated embodiment, the second source packed data operand has at least sixteen 8-bit byte sized bit selection elements (B0 to B15) in the least significant 128-bits. Optionally, the second source packed data operand may have up to sixty-four 8-bit byte sized bit selection elements (B0 to B63) in an operand of size up to 512-bits. As previously mentioned, in some embodiments, not all of the 8-bits of a byte sized bit selection element may be used for bit selection. For example, in some embodiments, only a least significant (or alternatively most significant) 4, 5, 6, or 7-bits of each byte may be used for bit selection. One advantage to using 6-bits for bit selection, especially with 64-bit lanes and/or 64-bit quadword (QWORD) integers, is that the 6-bits are sufficient to uniquely identify any single one of the 64-bits of the lane and/or QWORD. For example, the least significant 6-bits of byte 130 may uniquely identify any one of the 64-bits in the first 64-bit lane 432-0 and/or QWORD0.

In the illustrated embodiment, the 8-bit byte sized bit selection elements are grouped or apportioned into a plurality of groups or subsets that each correspond to a different one of the lanes 432 and/or QWORDs. For example, a first subset of eight bit selection elements 130 to 137 correspond to the first 64-bit lane 432-0, a second subset of eight bit selection elements B8 to B15 correspond to the second 64-bit lane 432-1, up through an eighth subset of eight bit selection elements B56 to B63 corresponding to the eighth 64-bit lane 432-7. Each subset of bit selection elements may be used to select or identify bits within only a corresponding lane of bits and/or QWORD. For example, each of B0 to B7 may be used to identify a bit position within only the first 64-bit lane 432-0, each of B8 to 1315 may be used to identify a bit position within only the second 64-bit lane 432-1, and so on. Each subset of eight bit selection elements and/or each 64-bit lane of the second source packed data operand 412 is operative to select eight potentially/optionally different bit positions in a corresponding 64-bit lane of the first source packed data operand.

A result operand 414 may be generated (e.g., by an execution unit 406), and stored in a destination storage location, in response to the bit shuffle instruction/operation 440. In some embodiments, the result operand may include a different corresponding bit for each of the number of 8-bit byte sized bit selection elements of the second source packed data operand. For example, in the illustrated embodiment, the result operand is a 64-bit operand that includes a different bit for each of the sixty-four byte sized bit selection elements B0-B63. Representatively, the result bits and their corresponding bit selection elements may be in same relative positions within the operands. For example, bits [7:0] of the result operand may correspond respectively to bytes B7-B0, bits [15:8] of the result operand may correspond respectively to bytes B15-B8, bits [63:58] of the result operand may correspond respectively to bytes B63-B56, and so on. As shown, in some embodiments, the result bits corresponding to all of the bit selection elements for all of the lanes may be concatenated together and stored adjacent to one another in a contiguous set of bits in the result operand. In such embodiments, the result operand is not a packed data operand, but rather a scalar operand (e.g., a single scalar 64-bit QWORD integer). In some embodiments, a value of each bit of the result operand may be equal to that of a bit of a corresponding lane of bits of the first source packed data operand, which is specified, selected, or otherwise indicated by the corresponding 8-bit byte sized bit selection element. Each bit selection element of the second source packed data operand may identify a bit position in a corresponding lane of bits of the first source operand, and the value of the bit at that identified bit position may be stored in the bit position of the result operand that corresponds to (e.g., is in a same relative position as) the bit selection element. For example, B0 may have a value 58 to indicate bit[58] of the first lane 432-0 which has a value of binary one, and a value of binary one may be stored in bit[0] of the result operand since bit[0] corresponds to B0, B1 may have a value 15 to indicate bit[15] of the first lane 432-0 which has a value of binary zero, and a value of binary zero may be stored in bit[1] of the result operand, and so on.

As shown, in some embodiments, the second source packed data operand 412 may have a same number of bit selection elements (e.g., sixty four) as a number of bits in a lane of bits (e.g., a 64-bit lane of bits) of the first source operand. In one possible use of the instruction/operation, identical copies or replicas of the same value (e.g., the same 64-bit value) may optionally be stored in each of the lanes (e.g., eight 64-bit lanes) of the first source packed data operand. By way of example, there may be sixty-four bit selection elements such that each and every one of the bits of a single 64-bit value may be identified by a different corresponding one of the sixty-four bit selection elements. Advantageously, this may allow a full 64-bit bit shuffle or permute to be performed on the single 64-bit value within the confines of the execution of the single bit shuffle instruction. Conventionally, as discussed in the background section, many more instructions (e.g., shift or rotate instructions, logical AND or logical OR instructions, etc.) would generally be needed in order to perform such a full 64-bit bit shuffle. Moreover, to further facilitate such a possible use case, an alternate embodiment of the bit shuffle instruction is contemplated in which it optionally indicates a first source operand having a single scalar lane of bits (e.g., a single scalar 64-bit value), and the instruction may causes the processor to broadcast or otherwise replicate the single scalar lane of bits to create multiple (e.g., eight) copies of the lane of bits each in a different corresponding lane.

Other uses of the instruction/operation are also contemplated. For example, different values (e.g., different 64-bit quadword integers) may optionally be stored in the different lanes of the first source packed data operand. The instruction/operation may perform a partial bit shuffle on each of the different values (e.g., shuffle only 8-bits of each of the eight different 64-bit values) in parallel. Multiple (e.g., eight) instructions may be used to collectively perform a full bit shuffle (e.g. a full 64-bit bit shuffle) on the different values. The partial (e.g., 8-bit) bit shuffle results may then be merged or combined in order to form the full 64-bit bit shuffled result.

The result operand 414 may be stored in a destination storage location that is specified or otherwise indicated by the instruction. In some embodiments, the destination storage location may optionally be a packed data operation mask register. The packed data operation mask register may be dedicated primarily to storing packed data operation masks and/or for use in predication, rather than being more general-purpose like a general-purpose register (e.g., also used for address generation, etc.). A plurality of other instructions, of an instruction set of the processor, may specify the same packed data operation mask register as a predicate operand to predicate a corresponding packed data operation. These instructions may specify the packed data operation mask register in a different field or set of bits of the instruction than those used to specify general-purpose registers, packed data registers, and other non-packed data operation mask registers. Alternatively, in other embodiments, the destination storage location used for the result operand 414 may optionally be a general-purpose register. One possible advantage of using a packed data operation mask register over a general-purpose register is that in some processor microarchitectures the mask registers tend to be more closely located with other packed data resources (e.g., packed data registers, packed data execution units, etc.) than the general-purpose registers. In still other embodiments, memory locations or other storage locations may optionally be used, if desired.

It is to be appreciated that this is just one illustrative example of a suitable bit shuffle operation/instruction. Other embodiments may use other sized packed data operands. Examples of suitable packed data operand sizes include, but are not limited to, 128-bits, 256-bits, 512-bits, and 1024-bits. Moreover, in other embodiments, fewer two) or more lanes (e.g., six, eight) may optionally be used and/or other sized lanes besides 64-bit lanes may optionally be used, such as, for example, 16-bit lanes, 32-bit lanes, and other sized lanes. Also, different sized bit selection elements may optionally be used. Suitable sized bit selection elements include, for example, 8-bit, 7-bit, 6-bit, 5-bit, and 4-bit nibble sized bit selection elements. Still other variations and alternatives mentioned elsewhere herein are suitable and/or would be apparent to those skilled in the art having the benefit of the present disclosure.

Figure 5:
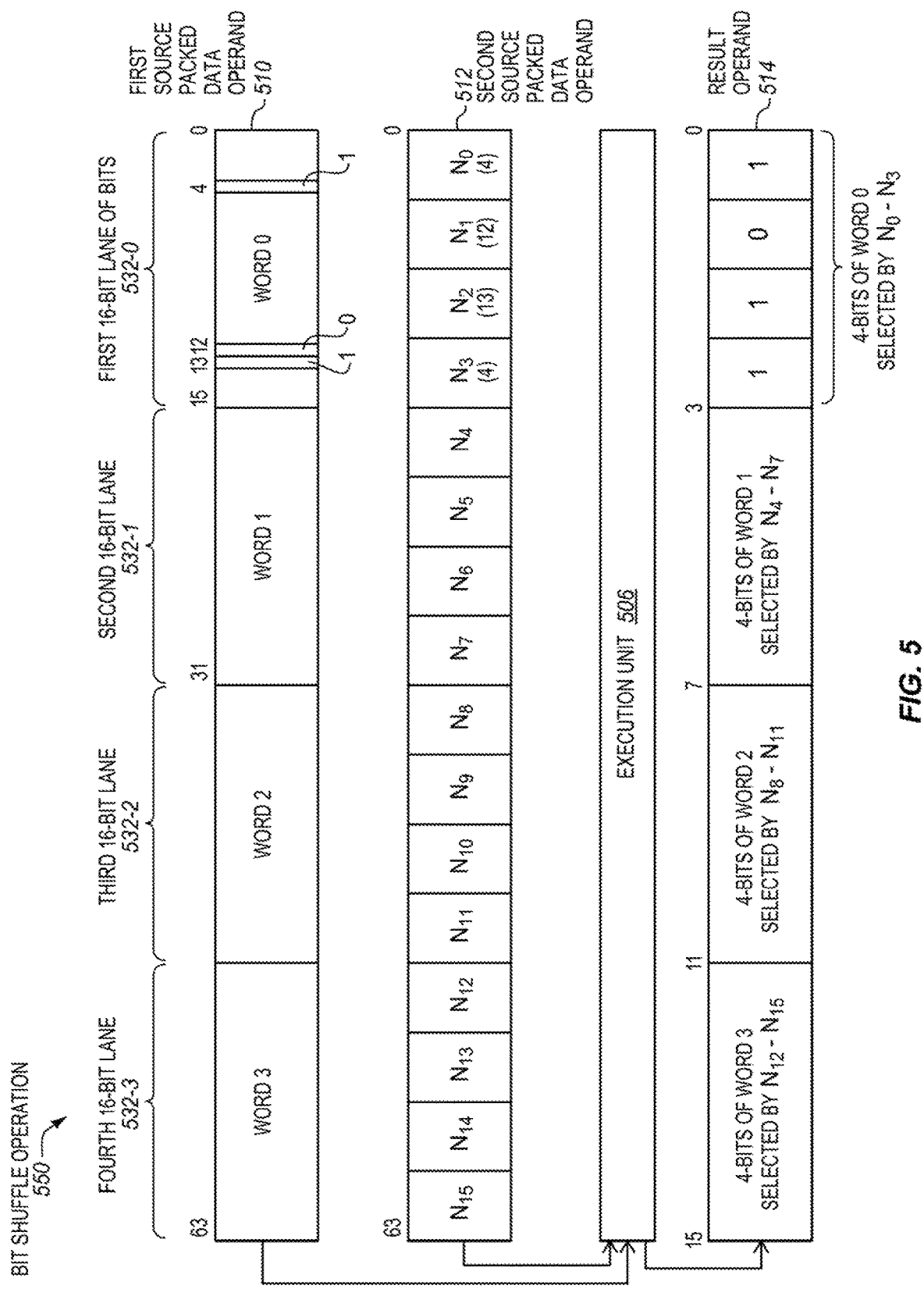
FIG. 5 is a block diagram of an embodiment of a bit shuffle operation to shuffle bits of 16-bit lanes of a first source packed data operand using 4-bit nibble sized bit selection elements in a second source packed data operand to generate a scalar result operand.

FIG. 5 is a block diagram of an embodiment of a bit shuffle operation 550 that may be performed to shuffle bits of 16-bit lanes (e.g., having 16-bit word integers) of a first source packed data operand 510 using 4-bit nibble sized bit selection elements in a second source packed data operand 512 to generate a scalar result operand 514. The operation may be performed in response to an embodiment of a bit shuffle instruction. The operation/instruction of FIG. 5 has certain similarities to the operation/instruction of FIG. 4. To avoid obscuring the description, the discussion below will primarily focus on the different and/or additional features of the operation/instruction of FIG. 5, without repeating all of the features that may be the same as or similar to those of the operation/instruction of FIG. 4. However, it is to be appreciated that the previously described features and details of the operation/instruction of FIG. 4 may also optionally apply to the operation/instruction of FIG. 5, unless stated or otherwise clearly apparent.

The instruction may specify or otherwise indicate the first source packed data operand 510 and the second source packed data operand 512. In this embodiment, the first source packed data operand is 64-bits wide and has four 16-bit lanes of bits. These four lanes include a first 16-bit lane 532-0 that may be used to store a first 16-bit word (WORD0), a second 16-bit lane 532-1 that may be used to store a second 16-bit word (WORD1), a third 16-bit lane 532-2 that may be used to store a third 16-bit word (WORD2), and a fourth 16-bit lane 523-3 that may be used to store a fourth 16-bit word (WORD3).

In this embodiment, the second source packed data operand 512 also has 64-bits. The second source packed data operand has sixteen 4-bit nibble sized bit selection elements N0-N15. A first subset or group of four 4-bit nibble bit selection elements N0 to N3 correspond to the first lane 532-0, a second subset of four 4-bit nibble bit selection elements N4 to N7 correspond to the second lane 532-1, a third subset of four 4-bit nibble bit selection elements N8 to N11 correspond to the third lane 532-2, and a fourth set of four 4-bit nibble bit selection elements N12 to N15 correspond to the fourth lane 532-3. Each subset of the 4-bit nibble bit selection elements may be used to select or identify bits from within only a corresponding 16-bit word and/or 16-bit lane. Each 4-bit nibble bit selection element may be able to uniquely identify any single bit in a corresponding 16-bit word and/or 16-bit lane.

A result operand 514 may be generated (e.g., by an execution unit 506) and stored in a destination storage location in response to the bit shuffle instruction/operation 550. The illustrated result operand has 16-bits. In some embodiments, the result operand may include a different corresponding bit for each of the sixteen 4-bit nibble bit selection elements. As shown in some embodiments, the bits corresponding to all sixteen of the 4-bit nibble bit selection elements for all the lanes may be concatenated together and stored adjacent to one another in a contiguous set of 16-bits in the result operand. In some embodiments, a value of each bit of the result operand may be equal to that of a bit of a corresponding lane of bits of the first source packed data operand, which is specified, selected, or otherwise indicated by the corresponding 4-bit nibble bit selection element. For example, N0 may have a value of 4 to indicate bit[4] of the first lane 532-0 which has a value of binary one, and a value of binary one may be stored in bit[0] of the result operand since it corresponds to N0, and so on. In some embodiments, the second source packed data operand may have the same number of bit selection elements (e.g., sixteen) as a number of bits in each lane (e.g., a 16-bit lane) of the first source operand. In some embodiments, the destination storage location used to store the result operand may optionally be a packed data operation mask register. Alternatively, the destination storage location may optionally be a general-purpose register, a memory location, or other storage location.

Figure 6:
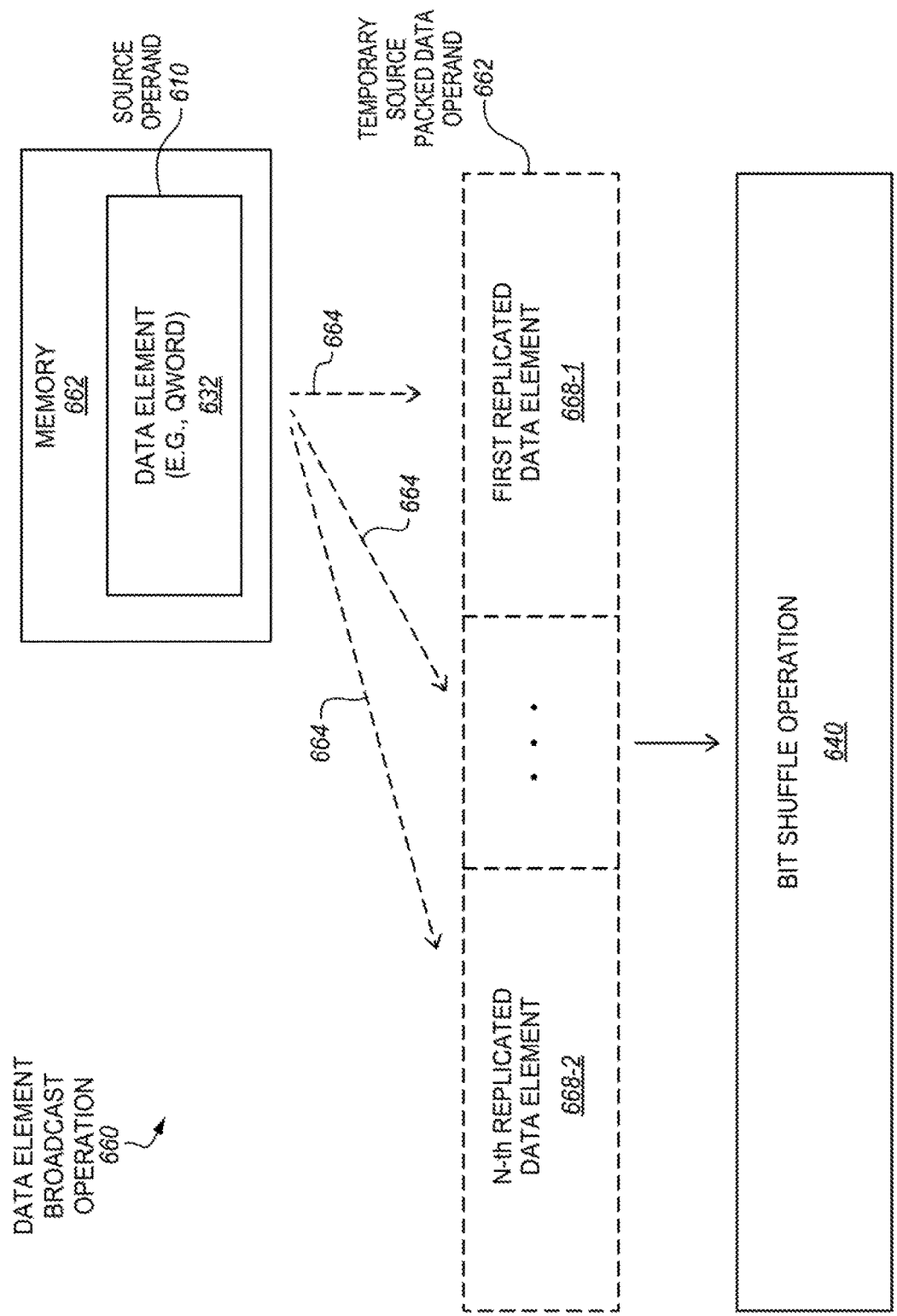
FIG. 6 is a block diagram of an embodiment of a data element broadcast operation that may optionally be combined with a bit shuffle operation.

FIG. 6 is a block diagram of an embodiment of a data element broadcast operation 660 that may optionally be combined with a bit shuffle operation 640. The operation may be performed in response to an embodiment of a bit shuffle with data element broadcast instruction. In some embodiments, the instruction may optionally have broadcast indication control (e.g., a set of one or more bits or a field) to indicate that data element broadcast is to be performed. In other embodiments, the data element broadcast operation may optionally be implicit to the instruction (e.g., implicit to an opcode). The instruction may indicate a source operand 610 having a single data element 632 (e.g., a 64-bit quadword, a 16-bit word, etc.) that is to be broadcast or replicated. The source operand may be a scalar operand having only a single data element, as opposed to a packed data operand having a plurality of data elements. In some embodiments, the single data element 632 may optionally be stored in a memory location 662 (e.g., in main memory), although this is not required. In such embodiments, the single data element may first be accessed from the memory location (e.g., through a load or other memory access operation decoded or otherwise derived from the bit shuffle with data element broadcast instruction).

The single data element may then be broadcast or replicated 664 multiple times to create multiple copies of the single data element. In the illustration, this includes creating a first replicated data element 668-1 optionally through an Nth replicated data element 668-N. The number of such replicas may be any of the previously described number of data elements. In some embodiments, a different replica or copy of the single data element 632 may be created for each lane and/or data element of another source packed data operand indicated by the instruction (e.g., the second source packed data operand having different subsets of bit selection elements for each lane and/or data element).

In the illustration, the multiple replicas or copies of the data element are shown together in a temporary source packed data operand 662. This temporary source packed data operand is shown in dashed lines to indicate that, in some embodiments, the replicas or copies of the single data element may be stored together in a temporary register or other non-architectural storage location, but in other embodiments the replicas or copies of the data element may not ever actually be stored together in a register or storage location but instead may merely be provided to the execution unit. The broadcast or replicated data elements 668-1 through 668-N and/or the temporary source packed data operand 662 may be provided to a bit shuffle operation 640. The bit shuffle operation 640 may represent any of the bit shuffle operations described elsewhere herein (e.g., one of the bit shuffle operations 330, 440, 550). The bit shuffle operation may be performed on the broadcast or replicated data elements substantially as has been described for the source packed data operands previously described.

Advantageously, incorporating the data element broadcast operation with the bit shuffle operation may help to increase the efficiency of various applications where it is desired to use the same single data element or value for each of multiple vector, packed data, or SIMD subsets of bit selection elements. As previously described, this may allow, in one aspect, using the different subsets of bit selection elements to select different sets of bits from the replicate copies of the data element or lane in order to perform a full bitwise shuffle of all of the bits of the data element or lane, although the scope of the invention is not so limited (e.g., an alternate use could be to select the same sets of bits for each of the different lanes or data elements of the result operand).

To further illustrate certain concepts, consider the following detailed example embodiments for a bit shuffle instruction to store a result operand that includes all bits selected by all bit selection elements concatenated together and which is stored in a packed data operation mask register. This instruction is named VPSHUFBITQMB and has as operands DEST, a SRC1, and a SRC2. In some embodiments, the instruction may allow SRC1 to be a packed data register, SRC2 to be either a packed data register or a memory location, and DEST to be a mask register. Alternatively, a general-purpose register could be used for DEST instead of a mask register. Table 1 lists opcodes, encodings, and operation descriptions for several different embodiments of this instruction.

TABLE 1

VPSHUFBITQMB - Shuffle Bits in Packed Quadword
Integers - Mask Register Destination

| Opcode/Instruction | Operation Description |
|---|---|
| EVEX.NDS.128.F3.0F38.W1 B9/r VPSHUFBITQMB k1, xmm2, xmm3/m128/m64bcst | Using unsigned 6-bit indices from first source, gather bit values from second source |
| EVEX.NDS.256.F3.0F38.W1 B9/r VPSHUFBITQMB k1, ymm2, ymm3/m256/m64bcst | Using unsigned 6-bit indices from first source, gather bit values from second source |

TABLE 1-continued

VPSHUFBITQMB - Shuffle Bits in Packed Quadword
Integers - Mask Register Destination

| Opcode/Instruction | Operation Description |
|---|---|
| EVEX.NDS.512.F3.0F38.W1 B9/r VPSHUFBITQMB k1, zmm2, zmm3/m512/m64bcst | Using unsigned 6-bit indices from first source, gather bit values from second source |

EVEX refers to an EVEX encoding as described elsewhere herein. Xmm, ymm, and zmm respectively represent 128-bit, 256-bit, and 512-bit packed data registers. The m128/m256/m512 refer respectively to 128-bit, 256-bit, and 512-bit memory locations. The m64bcst refers to a 64-bit memory location on which data element broadcast to multiple elements of a vector is to be performed. The k1 operand specifies a mask register (e.g., one of mask registers k0-k7) used as a destination storage location.

The VPSHUFBITQMB instruction may be used to rearrange or shuffle bits of packed quadword integers in a second source packed data operand (SRC2) based on bit selection controls in a first source packed data operand (SRC1), and store the shuffled bits in a destination (DEST). In one embodiment, the instruction may use unsigned 6-bit indices, each within a different corresponding byte of the first source operand (SRC1), to select and gather bit values from a corresponding quadword integer of the second source operand (SRC2). Each 6-bit index is operative to specify any one of sixty-four different bit locations in a single quadword. The value of the 6-bit index selects the bit value at the indexed bit location. The bit selection control data for each output bit is stored in 8-bit byte elements of the first source operand (SRC1), but only the least significant 6-bits of each byte are used for bit selection. Each 6-bit index is limited to bit selection within a corresponding quadword occupying the corresponding bit positions. For example, the least significant eight bytes of SRC1 select bits within the least significant quadword of SRC2, the most significant eight bytes of SRC1 select bits within the most significant quadword of SRC2, and so on.

An example of pseudocode for an embodiment of the VPSHUFBITQMB instruction is shown below. SRC2 represents a first source packed data operand, SRC3 represents a second source packed data operand, and DEST represents a destination. The k1 operand represents a packed data operation mask register to be used as a destination storage location. In the pseudocode, KL represents a mask length and/or the number of data element positions within a packed data operand, VL represents a length of the vectors or packed data operands, "i" represents a position counter to select a quadword or lane to be used for the iteration, and "j" represents a position counter to select a byte within the lane. EVEX.b==1 configures embedded broadcast when SRC3 *is memory*. The parameter "m" represents the bit position within the appropriate quadword of SRC3 indicated by the appropriate byte of SRC2. Other embodiments may implement the instructions using different sets of microarchitectural operations.

VPSHUFBITQMB DEST, SRC1, SRC2

```
(KL, VL) = (16, 128), (32, 256), (64, 512)
FOR i := 0 TO KL/8-1; Qword
    FOR j := 0 to 7 ; Byte
        IF EVEX.b AND SRC2 *is memory*
```

VPSHUFBITQMB DEST, SRC1, SRC2

```
            THEN
                Data := SRC2.qword[0];
            ELSE
                Data := SRC2.qword[i]
            m := SRC1.qword[i].byte[j] & 0x3F
            k1[i*8+j] := Data.bit[m]
    ENDFOR;
ENDFOR;
k1[MAX_KL-1:KL] := 0;
```

It is to be appreciated that these are just a few example embodiments of suitable instructions. Other embodiments may use either narrower (e.g., 64-bit) or wider (e.g., 1024-bit) or just differently sized packed data operands. Still other embodiments may use different sized lanes besides quadword-sized lanes (e.g., 16-bit or 32-bit lanes) and/or different sized indexes (e.g., 4-bit nibble indexes, 5-bit indexes, etc.). In alternate embodiments, other storage locations (e.g. memory locations) may be used for operands. Other embodiments may optionally omit masking/predication. Other embodiments may optionally omit data element broadcast.

Figure 7:
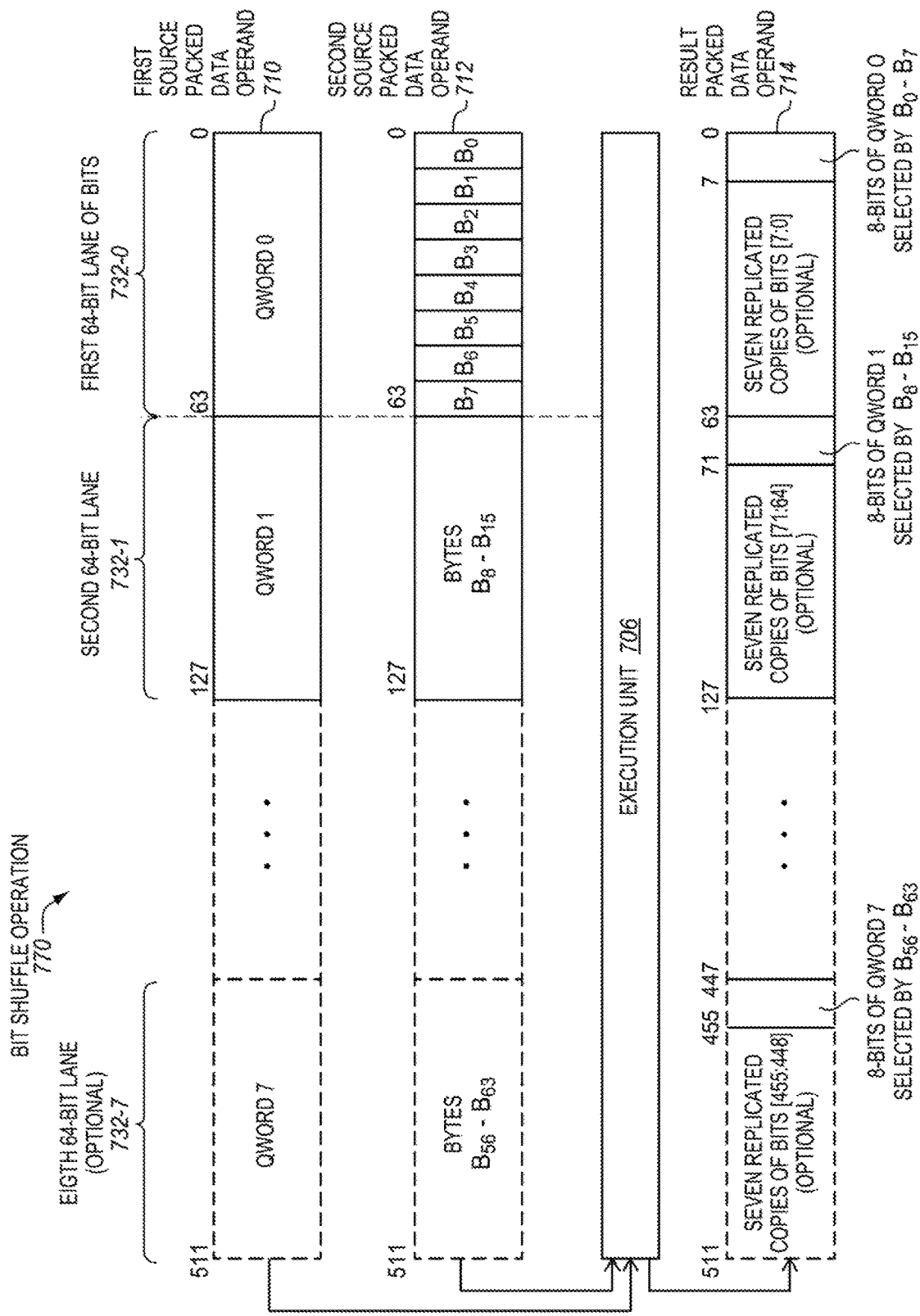
FIG. 7 is a block diagram of an embodiment of a bit shuffle operation to shuffle bits of 64-bit lanes of a first source packed data operand using 8-bit byte sized bit selection elements in a second source packed data operand to generate a result packed data operand.

FIG. 7 is a block diagram of an embodiment of a bit shuffle operation 770 that may be performed to shuffle bits of 64-bit lanes (e.g., having 64-bit quadword (QWORD) integers) of a first source packed data operand 710 using 8-bit byte sized bit selection elements in a second source packed data operand 712 to generate a result packed data operand 714. The operation may be performed in response to an embodiment of a bit shuffle instruction. The operation/instruction of FIG. 7 has certain similarities to the operation/instruction of FIG. 4 except that a packed data result operand 714 is generated instead of a scalar result operand 414. To avoid obscuring the description, the discussion below will primarily focus on the different and/or additional features of the operation/instruction of FIG. 7, without repeating all of the features that may be the same as or similar to those of the operation/instruction of FIG. 4. However, it is to be appreciated that the previously described features and details of the operation/instruction of FIG. 4 may also optionally apply to the operation/instruction of FIG. 5, unless stated or otherwise clearly apparent (e.g., unless they pertain to the result packed data operand 714 as opposed to the scalar result operand 414).

The instruction may specify or otherwise indicate the first source packed data operand 710. The first source packed data operand may have multiple 64-bit lanes of bits 732 and/or 64-bit quadword (QWORD) integers. The instruction may also specify or otherwise indicate the second source packed data operand 712. The second source packed data operand may have multiple corresponding subsets of 8-bit byte sized bit selection elements (B). The first and second packed data operands may be similar to, or the same as, those previously described for FIG. 4, and may have similar variations.

A result packed data operand 714 may be generated (e.g., by art execution unit 706), and stored in a destination storage location, response to the bit shuffle instruction/operation 770. In contrast to the unpacked result operand 414 of FIG. 4, the result operand 714 is a packed data operand. The result packed data operand may be stored in a packed data register (e.g., one of registers 108 or 1008), as a packed data operand in a memory location, or other storage location capable of storing packed data. The result packed data operand may have a plurality of lanes of bits that each correspond to a different lane of bits of the first source packed data operand 710 and/or each correspond to a different subset of the 8-bit byte sized bit selection elements of the second source packed data operand 712. For example, bits [63:0] of the result packed data operand may correspond to the first 64-bit lane 732-0, bits [127:64] of the result packed data operand may correspond to the second 64-bit lane 732-1, and so on. In the illustration, the lanes of bits of the result packed data operand have the same size as the lanes of bits of the first source packed data operand, although this is not required (e.g., they may instead be either larger (e.g., 128-bits) or smaller (e.g., 32-bits)).

In some embodiments, the bits selected by each subset of the 8-bit byte sized bit selection elements may be stored in a corresponding lane of bits of the result packed data operand. In some embodiments, the result bits, and their corresponding bit selection elements, may be in same relative positions in their lanes. For example, bits [7:0] of the result packed data operand may correspond respectively to bit selection elements B7-B0, bits [71:64] of the result packed data operand may correspond respectively to bytes B15-B8, and so on. In some embodiments, a value of each of bits [7:0] of the result packed data operand may be equal to a bit of the corresponding first lane 732-0 that is specified, selected, or otherwise indicated by the corresponding bit selection element of B7-B0 in the same relative position. For example, bits [7:0] of the result packed data operand may have 8-bits of QWORD0 selected by bit selection elements B7-B0, bits [71:64] of the result packed data operand may have 8-bits of QWORD1 selected by bit selection elements B15-B8, and bits [455:448] of the result packed data operand may have 8-bits of QWORD7 selected by bit selection elements B63-B56. Notice that only some of the bits in each lane of the result packed data operand are needed to store all of the bits selected by the subset of bit selection elements for the corresponding lane. In the illustrated example, there are eight bit selection elements for each lane, and so only 8-bits are needed in each lane of the result packed data operand to store all the bits selected for the corresponding lane. For example, result bits [7:0] are used for the first lane 732-0, result bits [71:64] are used for the second lane 732-1, and so on. In the illustrated embodiment, these result bits are optionally stored in the least significant or lowest order bits of the corresponding lane. Alternatively, the most significant bits, or some other subset of bits, may optionally be used.

As shown, in some embodiments, the second source packed data operand 712 may have a same number of bit selection elements (e.g., sixty four) as a number of bits in a lane of bits (e.g., a 64-bit lane of bits) of the first source operand. In one possible use of the instruction/operation, identical copies or replicas of the same value (e.g., the same 64-bit value) may optionally be stored in each of the lanes (e.g., eight 64-bit lanes) of the first source packed data operand. By way of example, since the single 64-bit value has 64-bits, and since there are sixty-four bit selection elements, each and every one of the bits of the single 64-bit value may be identified by a different corresponding one of the sixty-four bit selection elements. Advantageously, this may allow a full 64-bit bit shuffle or permute to be performed on the single 64-bit value within the confines of the execution of the single bit shuffle instruction. Conventionally, as discussed in the background section, many more instructions of an algorithm would generally be needed. In order to perform such a full 64-bit bit shuffle. Moreover, to further facilitate such a possible use case, an alternate embodiment of the bit shuffle instruction is contemplated in which it optionally indicates a first source operand having a single scalar lane of bits (e.g., a single scalar 64-bit value), and the instruction may causes the processor to broadcast or otherwise replicate the single scalar lane of bits to create multiple (e.g., eight) copies of the lane of bits each in a different corresponding lane.

Other uses of the instruction/operation are also contemplated. For example, different values (e.g., different 64-bit quadword integers) may optionally be stored in the different lanes of the first source packed data operand. The instruction/operation may perform a partial bit shuffle on each of the different values (e.g., shuffle only 8-bits of each of the eight different 64-bit values) in parallel. Multiple (e.g., eight) instructions may be used to collectively perform a full bit shuffle (e.g. a full 64-bit bit shuffle) on the different values. The partial (e.g., 8-bit) bit shuffle results may then be merged or combined in order to form the full 64-bit bit shuffled result.

Referring again to FIG. 7, in some embodiments, the remaining other bits in each lane of the result packed data operand (i.e., those which are not needed to store the bits selected by the bit selection elements) may optionally store one or more copies or replicas of the bits selected by the bit selection elements corresponding to the same lane. For example, result bits [63:8] may store seven replicated copies of result bits [7:0], result bits [127:72] may store seven replicated copies of result bits [71:63], result bits [511:456] may store seven replicated copies of result bits [448:455], and so on. To further illustrate, if result bits [7:0] have the values 11111100 then result bits [63:0] may have the values 11100 11111100 11111100 11100 1111100 11111100 11111100 11111100. The 8-bits selected for each lane may be replicated seven times and eight identical copies of the 8-bits may be stored in the corresponding lane. Possible advantages to storing such replicated sets of bits will be discussed further below (e.g., in conjunction with FIG. 8). However, storing such replicated sets of bits is optional and not required. In other embodiments, various other predetermined values may optionally be stored in the remaining bits in each lane of the result packed data operand (i.e., those not needed to store the selected bits). Examples of such predetermined values include, but are not limited to, all zeroes, all ones, and merged bit values from corresponding bit positions in the first source packed data operand.

It is to be appreciated that this is just one illustrative example of a suitable bit shuffle operation/instruction. Other embodiments may use other sized packed data operands. Examples of suitable packed data operand sizes include, but are not limited to, 128-bits, 256-bits, 512-bits, and 1024-bits. The first, second, and result packed data operands may have, but are not required to have, the same sized packed data operands. Moreover, in other embodiments, fewer lanes (e.g., two) or more lanes (e.g., six, eight, etc.) may optionally be used. Further, other sized lanes besides 64-bit lanes may optionally be used, such as, for example, 16-bit lanes, 32-bit lanes, or other sized lanes desired for the particular implementation. Also, different sized bit selection elements may optionally be used. Suitable sized bit selection elements include, for example, 8-bit, 7-bit, 6-bit, 5-bit, and 4-bit nibble sized bit selection elements. Still other variations and alternatives mentioned elsewhere herein are suitable and/or would be apparent to those skilled in the art having the benefit of the present disclosure.

Figure 8:
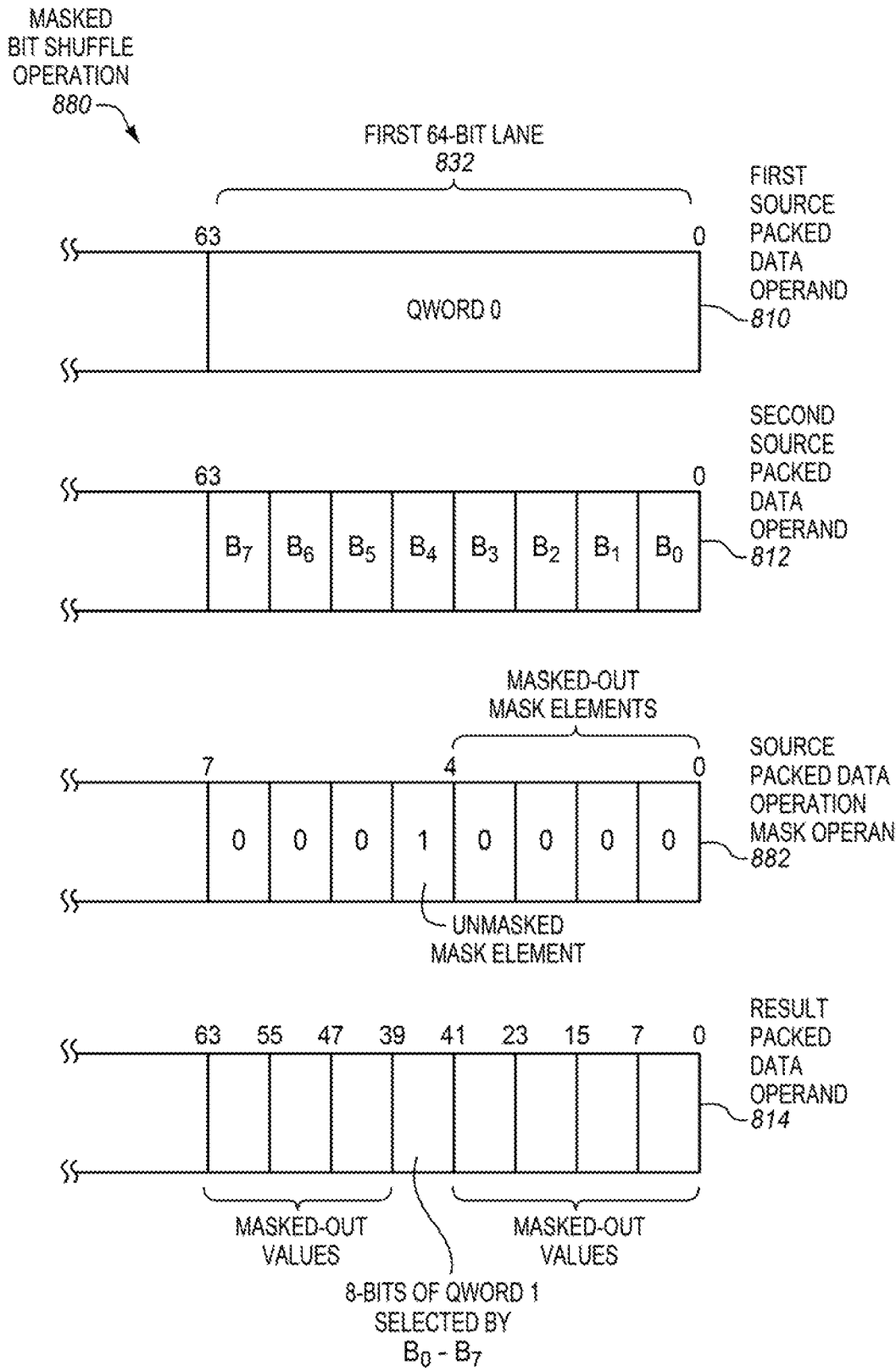
FIG. 8 is a block diagram of an embodiment of a masked bit shuffle operation bits of a 64-bit lane of a first source packed data operand using 8-bit byte sized bit selection elements in a second source packed data operand subject to mask elements in a source packed data operation mask operand to generate a result packed data operand.

FIG. 8 is a block diagram of an embodiment of a masked bit shuffle operation 880 to shuffle bits of a 64-bit lane of a first source packed data operand 810 using 8-bit byte sized bit selection elements in a second source packed data operand 812 subject to a source packed data operation mask operand 882 to generate a result packed data operand 814. The masked operation may be performed in response to an embodiment of a masked bit shuffle instruction. The masked operation of FIG. 8 has certain similarities to the unmasked operations of FIGS. 4 and 7. To avoid obscuring the description, the different and/or additional characteristics for the masked operation of FIG. 8 will primarily be described, without repeating all the optionally similar or common characteristics and details relative to the unmasked operations of FIGS. 4 and 7. However, it is to be appreciated that the previously described characteristics and details of the unmasked operations of FIGS. 4 and 7 may also optionally apply to the masked operation of FIG. 8, unless stated otherwise or otherwise clearly apparent.

The masked instruction may specify or otherwise indicate a first source packed data operand 810, and a second source packed data operand 812. Each of these operands may be similar to, or the same as, the corresponding operands of FIGS. 4 and/or 7, and may have the same variations and alternatives. The first source packed data operand has a first 64-bit lane of bits 832. The second source packed data operand has a group or subset of eight 8-bit byte sized bit election elements B0 to B7 corresponding to the first lane of bits.

The masked bit shuffle instruction additionally specifies explicitly specifies) or otherwise indicates (e.g., implicitly indicates) a source packed data operation mask operand 882. The packed data operation mask operand may also be referred to herein simply as an operation mask operand, predicate mask operand, predicate operand, mask operand, or simply as a mask. The mask may include multiple mask elements, predicate elements, or conditional control elements. As shown, in some embodiments, each mask element may be a single mask bit. Alternatively, two or more bits may optionally be used for each mask element. Each of the mask elements may be used to predicate, conditionally control, or mask whether or not a corresponding result is to be stored in a corresponding location. In one aspect, each of the mask elements may correspond to a different one of a plurality of sub-lane sized portions of a corresponding lane of the result packed data operand in a same relative position within the operands. In some embodiments, each of the corresponding sub-lane sized portions of the result packed data operand may have a width in bits sufficient to hold all bits selected by a subset of bit selection elements for the corresponding lane (e.g., may be sufficient to hold all the bits selected by B0-B7). In the illustrated embodiment, bit[0] of the mask may correspond with bits [7:0] of the result packed data operand, bit[1] of the mask may correspond with bits [15:8] of the result packed data operand, and so on.

A value of each mask bit may control whether or not the corresponding result is to be stored in the corresponding sub-lane sized portion of the result packed data operand. Each mask bit may either have a first value to allow the result to be stored, or may have a second different value to not allow the result to be stored. According to one possible convention, which is shown in the illustration, a mask bit cleared to binary zero (i.e., 0) may represent a masked-out mask bit for which the result is not to be stored, whereas a mask bit set to binary one (i.e., 1) may represent an unmasked mask bit for which the result is to be stored. The opposite convention is also possible. Moreover, any mask values desired for the particular implementation may be used by convention to designate storing or not storing the result. In the illustrated embodiment, bit[4] of the mask is set to binary one (i.e., 1) and therefore unmasked, whereas all of bits [3:0] and [7:5] are cleared to zero (i.e., 0) and therefore masked-out.

The result packed data operand 814 may be generated (e.g., by an execution unit) and stored in a destination storage location in response to the masked bit shuffle instruction. In various embodiments, the destination storage location may be a packed data register, a memory location, or other storage location. For this example, only bits [39:32] of the result packed data operand, which correspond to unmasked bit[4] of the mask, may store a result. In some embodiments, the result whose storage is predicated by the mask elements may be the set of bits of the corresponding lane of the first source packed data operand (e.g., 64-bit lane 832) selected by the corresponding subset of bit selection elements of the second source packed data operand (e.g., B0-B7). For example, only bits [39:32] of the result packed data operand may store 8-bits of QWORD0 selected by B0-B7. In contrast, bits [31:0] and bits [63:40] of the result packed data operand, which correspond to masked-out bits [3:0] and [7:5] of the mask, may not store this result. Rather, these bits may store masked-out values. Various fixed or predetermined values may be used for the masked-out values. In some, embodiments, zeroing masking may optionally be used. In zeroing masking, the masked-out bits of the result packed data operand may be zeroed-out (e.g., be forced to have a value of zero). In other embodiments, merging masking may be used. In merging masking, the masked-out bits of the result packed data operand may have a value of a corresponding bit of a source packed data operand (e.g., the first source packed data operand). For example, corresponding bits of the first source packed data operand in the same bit positions may be stored in the same bit positions in the result packed data operand. One possible advantage of merging masking is that it may be used to combine or assimilate new results with results from prior instances of the instruction. In some embodiments, if the memory operand correspond to the element selects, the mask may also optionally be used for memory fault suppression by avoiding touching elements in memory that are masked off so that associated memory faults are not signaled, although this is not required.

The previously described masking may incorporate both the replication described for FIG. 7 as well as predication or masking. In this example, only a single mask element is unmasked, although if more than one mask element were unmasked then replicate copies of the selected bits may be stored in each corresponding sub-lane sized portions of the result packed data operand. One possible advantage of such replication and/or masking is that one of these sets of bits in a desired or efficient position may be selected for further processing. In other words, the replication and masking may be used to place the selected set of bits in a desired position within the corresponding lane of the result packed data operand. This may be used in different ways in different embodiments. As one specific example, multiple different masked bit shuffle instructions may each be used to shuffle different subsets or portions of the bits of a value. For example, eight instances of the masked bit shuffle instruction may each be used to shuffle a different set of 8-bits of a 64-bit value. One possible use of the replication and masking is to effectively move the set of bits selected by the instruction to an appropriate position in the lane so that they can be more readily or efficiently merged or combined with the bits selected by the other instructions. For example, the replication and masking may be used to put one set of 8-bits in bits [7:0] of the lane of the result packed data operand, another set of 8-bits in bits [15:8] of the lane of the result packed data operand, yet another set of 8-bits in bits [23:16] of the lane of the result packed data operand, and so on. This may help to increase the speed and/or efficiency of merging these different sets of selected bits to form a full 64-bit bit shuffle result. Other uses will be apparent to those skilled in the art and having the benefit of the present disclosure. In other embodiments, instead of masking, an immediate (e.g., an 8-bit immediate imm8) of the instruction may be used to specify or indicate a position in which to keep a replicated set of bits, whereas all other positions in the lane may have predetermined values (e.g., zeroes, merged values, etc.). For example, the immediate may specify a value of three to have the replicated set of bits stored in the third least significant set of replicated bits, will all other bits in the lane being zeroes.

To further illustrate certain concepts, consider the following detailed example embodiments for a bit shuffle instruction to store a result packed data operand. This instruction is named VPSHUFBITQB and has as operands a DEST, MSK, SRC1, and SRC2. In some embodiments, the instruction may allow SRC1 to be a packed data register, SRC2 to be either a packed data register or a memory location, DEST to be a packed data register, and MSK to be a source packed data operation mask register. Table 2 lists opcodes, encodings, and operation descriptions for several different embodiments of this instruction.

TABLE 2

VPSHUFBITQB - Shuffle Bits in Packed Quadword Integers - Packed Register Destination

| Opcode/Instruction | Operation Description |
|---|---|
| VPSHUFBITQB xmm1, {k1} {z}, xmm2, xmm3/m128/m64bcst | Using unsigned 6 bit indices from first source, gather bit values from second source |
| VPSHUFBITQB ymm1, {k1} {z}, ymm2, ymm3/m256/m64bcst | Using unsigned 6 bit indices from first source, gather bit values from second source |
| VPSHUFBITQB zmm1, {k1} {z}, zmm2, zmm3/m512/m64bcst | Using unsigned 6 bit indices from first source, gather bit values from second source |

Xmm, ymm, and zmm respectively represent 128-bit, 256-bit, and 512-bit packed data registers. The m128/m256/m512 refer respectively to 128-bit, 256-bit, and 512-bit memory locations. The m64bcst refers to a 64-bit memory location on which optional data element broadcast to multiple elements of a vector is to be performed. The {k1} operand specifies a source mask register (e.g., one of mask registers k0-k7) used as a source predicate mask.

The VPSHUFBITQB instruction may be similar to the above-described VPSHUFBITQMB instruction with a few exceptions noted below. One difference is that DEST may be a packed data register (e.g., xmm1, ymm1, or zmm1) instead of a mask register. Another difference is that the instruction may have an optional source predicate mask operand (e.g., {MSK}, {k1}), although this is not required. As before, SRC1 may be a packed data register, and SRC2 may be either a packed data register or a memory location.

An example of pseudocode for an embodiment of the VPSHUFBITQB instruction is shown below. SRC1 represents a first source packed data operand, SRC2 represents a second source packed data operand, and DEST represents a destination. The k1 operand represents a source packed data operation mask register used for predication. In the pseudocode, KL represents a mask length and/or the number of data element positions within a packed data operand, VL represents a length of the vectors or packed data operands, "i" represents a position counter to select a quadword or lane to be used for the iteration, and "j" represents a position counter to select a byte within the lane. EVEX.b==1 configures embedded broadcast when SRC2 *is memory*. The parameter "M" represents the bit position within the appropriate quadword of SRC2 indicated by the appropriate byte of SRC1. Other embodiments may implement the instructions using different sets of microarchitectural operations. In this pseudocode, either zeroing style masking "zeroing*" or merging style masking "*remains unchanged*" may be used. Replication of the 8-bits selected throughout all corresponding 64-bits of the result may optionally be used.

| VPSHUFBITQB DEST, SRC1, SRC2 |
|---|
| (KL, VL) = (16, 128), (32, 256), (64, 512)<br>FOR i ← 0 TO KL/8 − 1 ; Qword<br>    BYTE_TEMP ← 0<br>    FOR j ← 0 TO 7 ; Byte<br>        IF EVEX.b AND SRC2 *is memory*<br>        THEN<br>            DATA[63:0] ← SRC2.qword[0];<br>        ELSE<br>            DATA[63:0] ← SRC2.qword[i];<br>        ENDIF<br>        M ← SRC1.qword[i].byte[j] & 0x3F;<br>        BIT ← DATA[M]<br>        BYTE_TEMP[j] ← BIT<br>    ENDFOR;<br>    FOR j ← 0 TO 7<br>        IF K1[i*8+j]<br>        THEN<br>            DEST.qword[i].byte[j] ← BYTE_TEMP;<br>        ELSIF *zeroing*<br>            DEST.qword[i].byte[j] ← 0;<br>        ELSE<br>            DEST.qword[i].byte[j] *remains unchanged *<br>        ENDIF;<br>    ENDFOR;<br>ENDFOR;<br>DEST[MAX_VL-1:VL] ← 0; |

It is to be appreciated that these are just a few example embodiments of suitable instructions. Other embodiments may use either narrower (e.g., 64-bit) or wider 1024-bit) or just differently sized packed data operands. Still other embodiments may use different sized lanes besides quadword-sized lanes (e.g., 16-bit or 32-bit lanes) and/or different sized indexes (e.g., 4-bit nibble indexes, 5-bit indexes, etc.). In alternate embodiments, other storage locations (e.g. memory locations) may be used for operands. Other embodiments may optionally omit masking/predication. Other embodiments may optionally omit data element broadcast.

FIG. 9 is a block diagram of an embodiment of a bit shuffle instruction 902. The instruction includes an operation code or opcode 984. The opcode may represent a plurality of bits or one or more fields that are operable to identify the instruction and/or the operation to be performed (e.g., a bit shuffle operation).

The instruction also includes a first source operand specifier 985 to explicitly specify a register, memory location, or other storage location used to store a first source operand, a second source operand specifier 986 to explicitly specify a register or other storage location used to store a second source operand, and a destination operand specifier 987 to explicitly specify a register or other storage location where a result operand is to be stored. By way of example, each of these specifiers may include a set of bits or one or more fields to explicitly specify an address of a register, memory location, or other storage location. Alternatively, one or more implicit storage locations (e.g., implicit to an opcode of the instruction) may optionally be used for one or more of these operands. For example, it may be implicit to an opcode of the instruction to use a given fixed register for an operand. As another example, it may be implicit to reuse a register initially for a source operand and then for the result operand (e.g., an implicit source/destination register).

In some embodiments, the instruction may include an optional packed data operation mask specifier 988 to explicitly specify a packed data operation mask or storage location (e.g., a mask register). Alternatively, the packed data operation mask may be implicitly indicated. In some embodiments, the instruction format may also include an optional type of masking operation specifier 989 to specify a type of masking operation. By way of example, the type of masking operation specifier may include a single bit to specify whether merging-masking or zeroing-masking is to be performed. Masking is optional not required.

In some embodiments, in which the instruction is to use data element broadcast, the instruction may optionally include a data element broadcast control 990. The data element broadcast control may include one or more bits or fields to indicate that data element broadcast is to be performed to broadcast a single source data element accessed from a storage location (e.g., a memory location) to a plurality of source data elements (e.g., in a temporary register) that are to be used by the bit shuffle operation. Alternatively, data element broadcast may be implicit to the instruction (e.g., implicit to the opcode) instead of being explicitly specified. As mentioned above, data element broadcast is optional and not required.

This is just one example of a suitable bit shuffle instruction. Alternate embodiments may include a subset of the illustrated fields/specifiers, may add additional fields/specifiers, may overlap certain fields/specifiers, etc. In addition, the illustrated order and arrangement of the fields/specifiers is not required. The fields/specifiers may be, rearranged variously. In addition, fields/specifiers need not include contiguous sequences of bits, but rather may include non-contiguous or separated bits. In some embodiments, the instruction format may have a VEX or EVEX encoding or instruction format, although the scope of the invention is not so limited.

Figure 10:
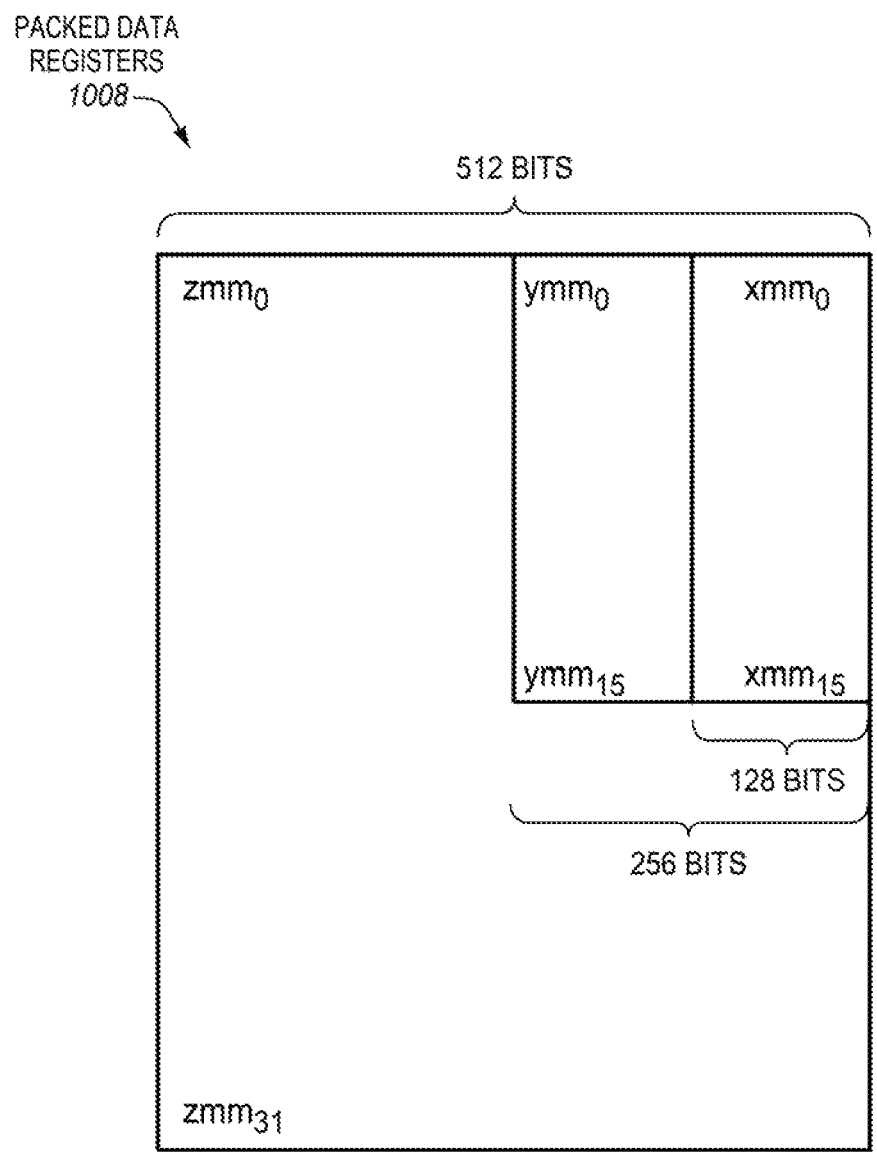
FIG. 10 is a block diagram of an embodiment of a suitable set of packed data registers.

FIG. 10 is a block diagram of an example embodiment of a suitable set of packed data registers 1008. The packed data registers include thirty-two 512-bit packed data registers labeled ZMM0 through ZMM31. In the illustrated embodiment, the lower order 256-bits of the lower sixteen registers, namely ZMM0-ZMM15, are aliased or overlaid on respective 256-bit packed data registers labeled YMM0-YMM15, although this is not required. Likewise, in the illustrated embodiment, the lower order 128-bits of the registers YMM0-YMM15 are aliased or overlaid on respective 128-bit packed data registers labeled XMM0-XMM15, although this also is not required. The 512-bit registers ZMM0 through ZMM31 are operable to hold 512-bit packed data, 256-bit packed data, or 128-bit packed data. The 256-bit registers YMM0-YMM15 are operable to hold 256-bit packed data or 128-bit packed data. The 128-bit registers XMM0-XMM15 are operable to hold 128-bit packed data. In some embodiments, each of the registers may be used to store either packed floating-point data or packed integer data. Different data element sizes are supported including at least 8-bit byte data, 16-bit word data, 32-bit doubleword, 32-bit single-precision floating point data, 64-bit quadword, and 64-bit double-precision floating point data. In alternate embodiments, different numbers of registers and/or different sizes of registers may be used. In still other embodiments, registers may or may not use aliasing of larger registers on smaller registers and/or may or may not be used to store floating point data.

Figure 11:
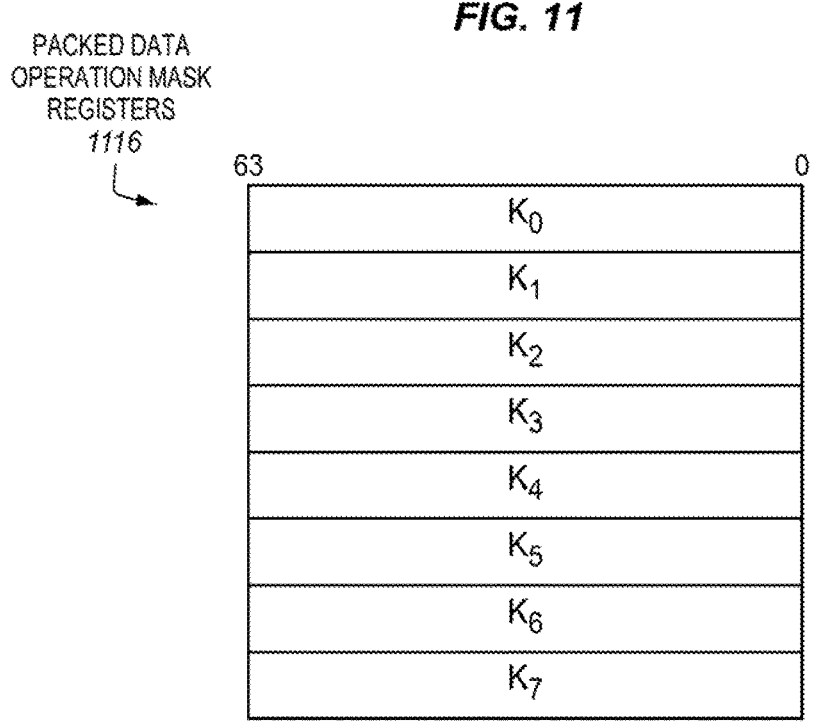
FIG. 11 is a block diagram of an embodiment of a suitable set of packed data operation mask registers.

FIG. 11 is a block diagram of an example embodiment of a suitable set of packed data operation mask registers 1116. In the illustrated embodiment, the set includes eight registers labeled k0 through k7. Alternate embodiments may include either fewer than eight registers (e.g., two, four, six, etc.), or more than eight registers (e.g., sixteen, thirty-two, etc.). Each of these registers may be used to store a packed data operation mask. In the illustrated embodiment, each of the registers is 64-bits. In alternate embodiments, the widths of the registers may be either wider than 64-bits (e.g., 80-bits, 128-bits, etc.), or narrower than 64-bits (e.g., 8-bits, 16-bits, 32-bits, etc.). The registers may be implemented in different ways using well known techniques and are not limited to any known particular type of circuit. Examples of suitable registers include, but are not limited to, dedicated physical registers, dynamically allocated physical registers using register renaming, and combinations thereof.

In some embodiments, the packed data operation mask registers 1016 may be a separate, dedicated set of architectural registers. In some embodiments, the instructions may encode or specify the packed data operation mask registers in different bits or one or more different fields of an instruction format than those used to encode or specify other types of registers (e.g., packed data registers). By way of example, an instruction may use three bits (e.g., a 3-bit field) to encode or specify any one of the eight packed data operation mask registers k0 through k7. In one particular implementation, only packed data operation mask registers k1 through k7 (but not k0) may be addressed as a predicate operand to predicate a masked packed data operation. The register k0 may be used as a regular source or destination, but may not be encoded as a predicate operand (e.g., if k0 is specified it has a "no mask" encoding), although this is not required.

Figure 12:
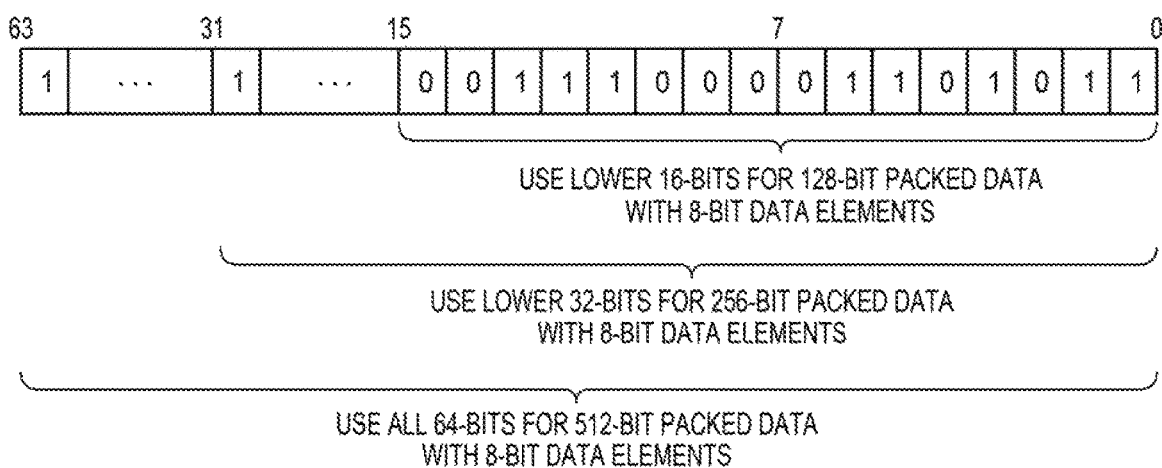
FIG. 12 is a block diagram of a packed data operation mask register and shows that the number of mask bits may depend on the packed data and data elements sizes.

FIG. 12 illustrates a packed data operation mask register 1216 one of the mask registers 1016) and the number of mask bits used for different sized packed data operands. In one aspect, these bits may be used for predication. In another aspect, these bits may be used to store result bits. The illustrated examples consider 8-bit data elements (e.g., 8-bit byte sized bit selection elements). As shown, the sixteen least significant bits may be used for 128-bit packed data with 8-bit data elements, the thirty-two least significant bits may be used for 256-bit packed data with 8-bit data elements, or all sixty-four bits may be used for 512-bit packed data with 8-bit data elements. Twice as many mask bits may be used if 4-bit nibble bit selection elements are used and two nibbles are contained in a given byte of the packed data operand.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2011; and see Intel® Advanced Vector Extensions Programming Reference, June 2011).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 128 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 13A illustrates an exemplary AVX instruction format including a VEX prefix 1302, real opcode field 1330, Mod R/M byte 1340, SIB byte 1350, displacement field 1362, and IMM8 1372. FIG. 13B illustrates which fields from FIG. 13A make up a full opcode field 1374 and a base operation field 1342. FIG. 13C illustrates which fields from FIG. 13A make up a register index field 1344.

VEX Prefix (Bytes 0-2) 1302 is encoded in a three-byte form. The first byte, is the Format Field 1340 (VEX Byte 0, bits [7:0], which contains an explicit C4 byte value (the unique value used for distinguishing the C4 instruction format). The second-third bytes (VEX Bytes 1-2) include a number of bit fields providing specific capability. Specifically, REX field 1305 (VEX Byte 1, bits [7-5]) consists of a VEX.R bit field (VEX Byte 1, bit [7]—R), VEX.X bit field (VEX byte 1, bit [6]—X), and VEX.B bit field (VEX byte 1, bit[5]—B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 1315 (VEX byte 1, bits [4:0]—mmmmm) includes content to encode an implied leading opcode byte. W Field 1364 (VEX byte 2, bit [7]—W)—is represented by the notation VEX.W, and provides different functions depending on the instruction. The role of VEX.vvvv 1320 (VEX Byte 2, bits [6:3]-vvvv) may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1111b. If VEX.L 1368 Size field (VEX byte 2, bit [2]-L)=0, it indicates 128 bit vector; if VEX.L=1, it indicates 256 bit vector. Prefix encoding field 1325 (VEX byte 2, bits [1:0]-pp) provides additional bits for the base operation field.

Real Opcode Field 1330 (Byte 3) is also known as the opcode byte. Part of the opcode is specified in this field.

MOD R/M Field 1340 (Byte 4) includes MOD field 1342 (bits [7-6]), Reg field 1344 (bits [5-3]), and R/M field 1346 (bits [2-0]). The role of Reg field 1344 may include the following: encoding either the destination register operand or a source register operand (the rrr of Rrrr), or be treated as an opcode extension and not used to encode any instruction operand. The role of R/M field 1346 may include the following: encoding the instruction operand that references a memory address, or encoding either the destination register operand or a source register operand.

Scale, Index, Base (SIB) The content of Scale field 1350 (Byte 5) includes SS1352 (bits [7-6]), which is used for memory address generation. The contents of SIB.xxx 1354 (bits [5-3]) and SIB.bbb 1356 (bits [2-0]) have been previously referred to with regard to the register indexes Xxxx and Bbbb.

The Displacement Field 1362 and the immediate field (IMM8) 1372 contain address data.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

FIGS. 14A-14B are block diagrams illustrating a generic vector friendly instruction format and instruction templates thereof according to embodiments of the invention. FIG. 14A is a block diagram illustrating a generic vector friendly instruction format and class A instruction templates thereof according to embodiments of the invention; while FIG. 14B is a block diagram illustrating the generic vector friendly instruction format and class B instruction templates thereof according to embodiments of the invention. Specifically, a generic vector friendly instruction format 1400 for which are defined class A and class B instruction templates, both of which include no memory access 1405 instruction templates and memory access 1420 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 14A include: 1) within the no memory access 1405 instruction templates there is shown a no memory access, full round control type operation 1410 instruction template and a no memory access, data transform type operation 1415 instruction template; and 2) within the memory access 1420 instruction templates there is shown a memory access, temporal 1425 instruction template and a memory access, non-temporal 1430 instruction template. The class B instruction templates in FIG. 14B include: 1) within the no memory access 1405 instruction templates there is shown a no memory access, write mask control, partial round control type operation 1412 instruction template and a no memory access, write mask control, vsize type operation 1417 instruction template; and 2) within the memory access 1420 instruction templates there is shown a memory access, write mask control 1427 instruction template.

The generic vector friendly instruction format 1400 includes the following fields listed below in the order illustrated in FIGS. 14A-14B.

Format field 1440—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1442—its content distinguishes different base operations.

Register index field 1444—its content, directly or through address generation, specifies the locations of the source and destination operands, be they in registers or in memory. These include a sufficient number of bits to select N registers from a PxQ (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1446—its content distinguishes occurrences of instructions in the generic vector instruction format that specify memory access from those that do not; that is, between no memory access 1405 instruction templates and memory access 1420 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1450—its content distinguishes which one of a variety of different operations to be performed in addition to the base operation. This field is context specific. In one embodiment of the invention, this field is divided into a class field 1468, an alpha field 1452, and a beta field 1454. The augmentation operation field 1450 allows common groups of operations to be performed in a single instruction rather than 2, 3, or 4 instructions.

Scale field 1460—its content allows for the scaling of the index field's content for memory address generation (e.g., for address generation that uses $2^{scale}*index+base$).

Displacement Field 1462A—its content is used as part of memory address generation (e.g., for address generation that uses $2^{scale}*index+base+displacement$).

Displacement Factor Field 1462B (note that the juxtaposition of displacement field 1462A directly over displacement factor field 1462B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1474 (described later herein) and the data manipulation field 1454C. The displacement field 1462A and the displacement factor field 1462B are optional in the sense that they are not used for the no memory access 1405 instruction templates and/or different embodiments may implement only one or none of the two.

Data element width field 1464 its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1470—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1470 allows for partial vector operations, including loads, stores, arithmetic, logical, etc. While embodiments of the invention are described in which the write mask field's 1470 content selects one of a number of write mask registers that contains the write mask to be used (and thus the write mask field's 1470 content indirectly identifies that masking to be performed), alternative embodiments instead or additional allow the mask write field's 1470 content to directly specify the masking to be performed.

Immediate field 1472—its content allows for the specification of immediate. This field is optional in the sense that is it not present in an implementation of the generic vector friendly format that does not support immediate and it is not present in instructions that do not use an immediate.

Class field 1468—its content distinguishes between different classes of instructions. With reference to FIGS. 14A-

B, the contents of this field select between class A and class B instructions. In FIGS. 14A-B, rounded corner squares are used to indicate a specific value is present in a field (e.g., class A 1468A and class B 1468B for the class field 1468 respectively in FIGS. 14A-B).

Instruction Templates of Class A

In the case of the non-memory access 1405 instruction templates of class A, the alpha field 1452 is interpreted as an RS field 1452A, whose content distinguishes which one of the different augmentation operation types are to be performed (e.g., round 1452A.1 and data transform 1452A.2 are respectively specified for the no memory access, round type operation 1410 and the no memory access, data transform type operation 1415 instruction templates), while the beta field 1454 distinguishes which of the operations of the specified type is to be performed. In the no memory access 1405 instruction templates, the scale field 1460, the displacement field 1462A, and the displacement scale filed 1462B are not present.

No-Memory Access Instruction Templates=Full Round Control Type Operation

In the no memory access full round control type operation 1410 instruction template, the beta field 1454 is interpreted, as a round control field 1454A, whose content(s) provide static rounding. While in the described embodiments of the invention the round control field 1454A includes a suppress all floating point exceptions (SAE) field 1456 and a round operation control field 1458, alternative embodiments may support may encode both these concepts into the same field or only have one or the other of these concepts/fields (e.g., may have only the round operation control field 1458).

SAE field 1456—its content distinguishes whether or not to disable the exception event reporting; when the SAE field's 1456 content indicates suppression is enabled, a given instruction does not report any kind of floating-point exception flag and does not raise any floating point exception handler.

Round operation control field 1458—its content distinguishes which one of a group of rounding operations to perform (e.g., Round-up, Round-down, Round-towards-zero and Round-to-nearest). Thus, the round operation control field 1458 allows for the changing of the rounding mode on a per instruction basis. In one embodiment of the invention where a processor includes a control register for specifying rounding modes, the round operation control field's 1450 content overrides that register value.

No Memory Access Instruction Templates—Data Transform Type Operation

In the no memory access data transform type operation 1415 instruction template, the beta field 1454 is interpreted as a data transform field 1454B, whose content distinguishes which one of a number of data transforms is to be performed (e.g., no data transform, swizzle, broadcast).

In the case of a memory access 1420 instruction template of class A, the alpha field 1452 is interpreted as an eviction hint field 1452B, whose content distinguishes which one of the eviction hints is to be used (in FIG. 14A, temporal 1452B.1 and non-temporal 1452B.2 are respectively specified for the memory access, temporal 1425 instruction template and the memory access, non-temporal 1430 instruction template), while the beta field 1454 is interpreted as a data manipulation field 1454C, whose content distinguishes which one of a number of data manipulation operations (also known as primitives) is to be performed (e.g., no manipulation; broadcast; up conversion of a source; and down conversion of a destination). The memory access 1420 instruction templates include the scale field 1460, and optionally the displacement field 1462A or the displacement scale field 1462B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit caching. This is, however, a hint, and different processors may implement it in different ways, including ignoring the hint entirely.

Memory Access Instruction Templates Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1452 is interpreted as a write mask control (Z) field 1452C, whose content distinguishes whether the write masking controlled by the write mask field 1470 should be a merging or a zeroing.

In the case of the non-memory access 1405 instruction templates of class B, part of the beta field 1454 is interpreted as an RL field 1457A, whose content distinguishes which one of the different augmentation operation types are to be performed (e.g., round 1457A.1 and vector length (VSIZE) 1457A.2 are respectively specified for the no memory access, write mask control, partial round control type operation 1412 instruction template and the no memory access, write mask control, VSIZE type operation 1417 instruction template), while the rest of the beta field 1454 distinguishes which of the operations of the specified type is to be performed. In the no memory access 1405 instruction templates, the scale field 1460, the displacement field 1462A, and the displacement scale filed 1462B are not present.

In the no memory access, write mask control, partial round control type operation 1410 instruction template, the rest of the beta field 1454 is interpreted as a round operation field 1459A and exception event reporting is disabled (a given instruction does not report any kind of floating-point exception flag and does not raise any floating point exception handler).

Round operation control field 1459A—just as round operation control field 1458, its content distinguishes which one of a group of rounding operations to perform (e.g., Round-up, Round-down, Round-towards-zero and Round-to-nearest). Thus, the round operation control field 1459A allows for the changing of the rounding mode on a per instruction basis. In one embodiment of the invention where a processor includes a control register for specifying rounding modes, the round operation control field's 1450 content overrides that register value.

In the no memory access, write mask control, VSIZE type operation 1417 instruction template, the rest of the beta field 1454 is interpreted as a vector length field 1459B, whose content distinguishes which one of a number of data vector lengths is to be performed on (e.g., 128, 256, or 512 byte).

In the case of a memory access 1420 instruction template of class B, part of the beta field 1454 is interpreted as a broadcast field 1457B, whose content distinguishes whether or not the broadcast type data manipulation operation is to be performed, while the rest of the beta field 1454 is interpreted the vector length field 1459B. The memory access 1420 instruction templates include the scale field 1460, and optionally the displacement field 1462A or the displacement scale field 1462B.

With regard to the generic vector friendly instruction format 1400, a full opcode field 1474 is shown including the format field 1440, the base operation field 1442, and the data element width field 1464. While one embodiment is shown where the full opcode field 1474 includes all of these fields, the full opcode field 1474 includes less than all of these fields in embodiments that do not support all of them. The full opcode field 1474 provides the operation code (opcode).

The augmentation operation field 1450, the data element width field 1464, and the write mask field 1470 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 15 is a block diagram illustrating an exemplary specific vector friendly instruction format according to embodiments of the invention. FIG. 15 shows a specific vector friendly instruction format 1500 that is specific in the sense that it specifies the location, size, interpretation, and order of the fields, as well as values for some of those fields. The specific vector friendly instruction format 1500 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 14 into which the fields from FIG. 15 map are illustrated.

It should be understood that, although embodiments of the invention are described with reference to the specific vector friendly instruction format 1500 in the context of the generic vector friendly instruction format 1400 for illustrative purposes, the invention is not limited to the specific vector friendly instruction format 1500 except where claimed. For example, the generic vector friendly instruction format 1400 contemplates a variety of possible sizes for the various fields, while the specific vector friendly instruction format 1500 is shown as having fields of specific sizes. By way of specific example, while the data element width field 1464 is illustrated as a one bit field in the specific vector friendly instruction format 1500, the invention is not so limited (that is, the generic vector friendly instruction format 1400 contemplates other sizes of the data element width field 1464).

The generic vector friendly instruction format 1400 includes the following fields listed below in the order illustrated in FIG. 15A.

EVEX Prefix (Bytes 0-3) 1502—is encoded in a four-byte form.

Format Field 1440 (EVEX Byte 0, bits [7:0])—the first byte (EVEX Byte 0) is the format field 1440 and it contains 0x62 (the unique value used for distinguishing the vector friendly instruction format in one embodiment of the invention).

The second-fourth bytes (EVEX Bytes 1-3) include a number of bit fields providing specific capability.

REX field 1505 (EVEX Byte 1, bits [7-5])—consists of a EVEX.R bit field (EVEX Byte 1, bit [7]—R), EVEX.X bit field (EVEX byte 1, bit [6]—X), and 1457 BEX byte 1, bit[5]—B). The EVEX.R EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1410—this is the first part of the REX' field 1410 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1515 (EVEX byte 1, bits [3:0] mmmm)—its content encodes an implied leading opcode byte (0F, 0F 38, or 0F 3).

Data element width field 1464 (EVEX byte 2, bit [7]—W)—is represented by the notation EVEX.W. EVEX.W is used to define the granularity (size) of the datatype (either 32-bit data elements or 64-bit data elements).

EVEX.vvvv 1520 (EVEX Byte 2, bits [6:3]-vvvv)—the role of EVEX.vvvv may include the following: 1) EVEX.v- vvv encodes the first source register operand, specified in inverted (is complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 1520 encodes the 4 low-order bits of the first source register specifier stored in inverted (1s complement) form. Depending on the instruction, an extra different EVEX bit field is used to extend the specifier size to 32 registers.

EVEX.U 1468 Class field (EVEX byte 2, bit [2]-U)—If EVEX.U=0, it indicates class A or EVEX.U0; if EVEX.U=1, it indicates class B or EVEX.U1.

Prefix encoding field 1525 (EVEX byte 2, bits [1:0]-pp)— provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1452 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 1454 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1410—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1470 (EVEX byte 3, bits [2:0]-kkk)—its content specifies the index of a register in the write mask registers as previously described. In one embodiment of the invention, the specific value EVEX.kkk=000 has a special behavior implying write mask is used for the particular instruction (this may be implemented in a variety of ways including the use of a write mask hardwired to all ones or hardware that bypasses the masking hardware).

Real Opcode Field 1530 (Byte 4) is also known as the opcode byte. Part of the opcode is specified in this field.

MOD R/M Field 1540 (Byte 5) includes MOD field 1542, Reg field 1544, and R/M 1546. As previously described, the MOD field's 1542 content distinguishes between memory access and non-memory access operations. The role of Reg field 1544 can be summarized to two situations: encoding either the destination register operand or a source register operand, or be treated as an opcode extension and not used to encode any instruction operand. The role of R/M field 1546 may include the following; encoding the instruction operand that references a memory address, or encoding either the destination register operand or a source register operand.

Scale, Index, Base (SIB) Byte (Byte 6)—As previously described, the scale field's 1450 content is used for memory address generation. SIB.xxx 1554 and SIB.bbb 1556—the contents of these fields have been previously referred to with regard to the register indexes Xxxx and Bbbb.

Displacement field 1462A (Bytes 7-10)—when MOD field 1542 contains 10, bytes 7-10 are the displacement field 1462A, and it works the same as the legacy 32-bit displacement (disp32) and works at byte granularity.

Displacement factor field 1462B (Byte 7) when MOD field 1542 contains 01, byte 7 is the displacement factor field 1462B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1462B is a reinterpretation of disp8; when using displacement factor field 1462B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1462B substitutes the legacy x86 instruction set 8-bit displacement. Thus, the displacement factor field 1462B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1472 operates as previously described.

Full Opcode Field

FIG. 15B is a block diagram illustrating the fields of the specific vector friendly instruction format 1500 that make up the full opcode field 1474 according to one embodiment of the invention. Specifically, the full opcode field 1474 includes the format field 1440, the base operation field 1442, and the data element width (W) field 1464. The base operation field 1442 includes the prefix encoding field 1525, the opcode map field 1515, and the real opcode field 1530.

Register Index Field

FIG. 15C is a block diagram illustrating the fields of the specific vector friendly instruction format 1500 that make up the register index field 1444 according to one embodiment of the invention. Specifically, the register index field 1444 includes the REX field 1505, the REX' field 1510, the MODR/M.reg field 1544, the MODR/M.r/m field 1546, the VVVV field 1520, xxx field 1554, and the bbb field 1556.

Augmentation Operation Field

Figure 15D:
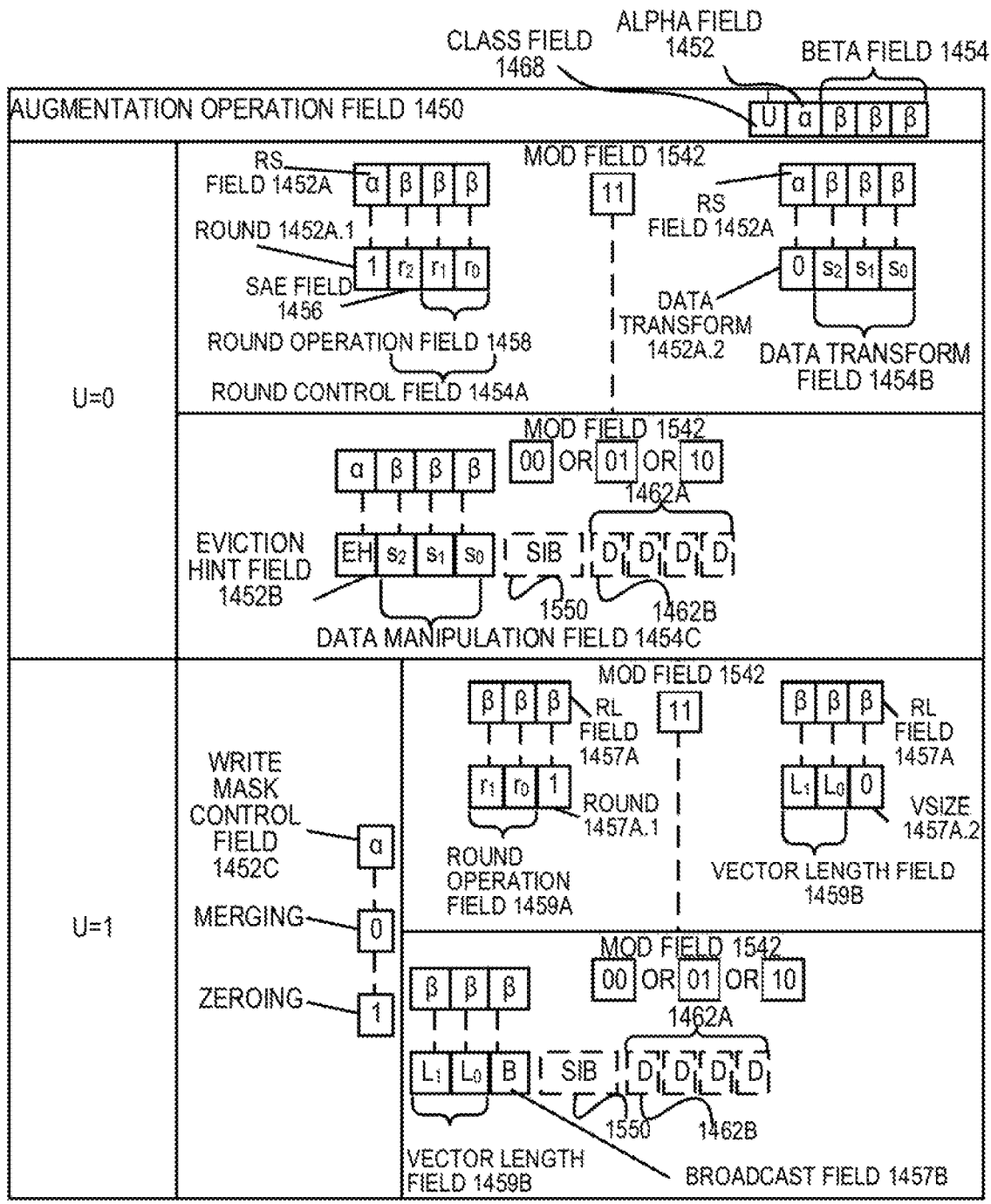

FIG. 15D is a block diagram illustrating the fields of the specific vector friendly instruction format 1500 that make up the augmentation operation field 1450 according to one embodiment of the invention. When the class (U) field 1468 contains 0, it signifies EN/EXAM (class A 1468A); when it contains 1, it signifies EVEX.U1 (class B 1468B). When U=0 and the MOD field 1542 contains 11 (signifying a no memory access operation), the alpha field 1452 (EVEX byte 3, bit [7]—EH) is interpreted as the rs field 1452A. When the rs field 1452A contains a 1 (round 1452A.1), the beta field 1454 (EVEX byte 3, bits [6:4]—SSS) is interpreted as the round control field 1454A. The round control field 1454A includes a one bit SAE field 1456 and a two bit round operation field 1458. When the rs field 1452A contains a 0 (data transform 1452A.2), the beta field 1454 (EVEX byte 3, bits [6:4]—SSS) is interpreted as a three bit data transform field 1454B. When U=0 and the MOD field 1542 contains 00, 01, or 10 (signifying a memory access operation), the alpha field 1452 (EVEX byte 3, bit [7]—EH) is interpreted as the eviction hint (EH) field 1452B and the beta field 1454 (EVEX byte 3, bits [6:4]—SSS) is interpreted as a three bit data manipulation field 1454C.

When U=1, the alpha field 1452 (EVEX byte 3, bit [7]—EH) is interpreted as the write mask control (Z) field 14520. When U=1 and the MOD field 1542 contains 11 (signifying a no memory access operation), part of the beta field 1454 (EVEX byte 3, bit [4]—$S_0$) is interpreted as the RL field 1457A; when it contains a 1 (round 1457A.1) the rest of the beta field 1454 (EVEX byte 3, bit [6-5]-$S_{2-1}$) is interpreted as the round operation field 1459A, while when the RL field 1457A contains a 0 (VSIZE 1457.A2) the rest of the beta field 1454 (EVEX byte 3, bit [6-5]—$S_{2-1}$) is interpreted as the vector length field 1459B (EVEX byte 3, bit [6-5]—$L_{1-0}$). When U=1 and the MOD field 1542 contains 00, 01, or 10 (signifying a memory access operation), the beta field 1454 (EVEX byte 3, bits [6:4]—SSS) is interpreted as the vector length field 1459B (EVEX byte 3, bit [6-5]—$L_{1-0}$) and the broadcast field 1457B (EVEX byte 3, bit [4]—B).

Exemplary Register Architecture

FIG. 16 is a block diagram of a register architecture 1600 according one embodiment of the invention. In the embodiment illustrated, there are 32 vector registers 1610 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1500 operates on these overlaid register file as illustrated in the below tables.

| Adjustable Vector Length | Class | Operations | Registers |
|---|---|---|---|
| Instruction Templates that do not include the vector length field 1459B | A (FIG. 14A; U = 0) | 1410, 1415, 1425, 1430 | zmm registers (the vector length is 64 byte) |
| | B (FIG. 14B; U = 1) | 1412 | zmm registers (the vector length is 64 byte) |
| Instruction templates that do include the vector length field 1459B | B (FIG. 14B; U = 1) | 1417, 1427 | zmm, ymm, or xmm registers (the vector length is 64 byte, 32 byte, or 16 byte) depending on the vector length field 1459B |

In other words, the vector length field 1459B selects between a maximum length and one or more other shorter lengths, where each such shorter length is half the length of the preceding length; and instructions templates without the vector length field 1459B operate on the maximum vector length. Further, in one embodiment, the class B instruction templates of the specific vector friendly instruction format 1500 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1615—in the embodiment illustrated, there are 8 write mask registers (k0 through k7), each 64 bits in size. In an alternate embodiment, the write mask registers 1615 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1625—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1645, on which is aliased the MMX packed integer flat register file 1650—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-Of-Order Core Block Diagram

FIG. 17A is a block diagram illustrating both an exemplary in-order pipeline and an exemplary register renaming, out-of-order issue/execution pipeline according to embodiments of the invention. FIG. 17B is a block diagram illustrating both an exemplary embodiment of an in-order architecture core and an exemplary register renaming, out-of-order issue/execution architecture core to be included in a processor according to embodiments of the invention. The solid lined boxes in FIGS. 17A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 17A, a processor pipeline 1700 includes a fetch stage 1702, a length decode stage 1704, a decode stage 1706, an allocation stage 1708, a renaming stage 1710, a scheduling (also known as a dispatch or issue) stage 1712, a register read/memory read stage 1714, an execute stage 1716, a write back/memory write stage 1718, an exception handling stage 1722, and a commit stage 1724.

FIG. 17B shows processor core 1790 including a front end unit 1730 coupled to an execution engine unit 1750, and both are coupled to a memory unit 1770. The core 1790 may be a reduced instruction set computing (RISC) core, a complex instruction set computing (CISC) core, a very long instruction word (VLIW) core, or a hybrid or alternative core type. As yet another option, the core 1790 may be a special-purpose core, such as, for example, a network or communication core, compression engine, coprocessor core, general purpose computing graphics processing unit (GPGPU) core, graphics core, or the like.

The front end unit 1730 includes a branch prediction unit 1732 coupled to an instruction cache unit 1734, which is coupled to an instruction translation lookaside buffer (TLB) 1736, which is coupled to an instruction fetch unit 1738, which is coupled to a decode unit 1740. The decode unit 1740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1790 includes a microcode ROM or other medium that stores microcode for certain macroinstructions (e.g., in decode unit 1740 or otherwise within the front end unit 1730). The decode unit 1740 is coupled to a rename/allocator unit 1752 in the execution engine unit 1750.

The execution engine unit 1750 includes the rename/allocator unit 1752 coupled to a retirement unit 1754 and a set of one or more scheduler unit(s) 1756. The scheduler unit(s) 1756 represents any number of different schedulers, including reservations stations, central instruction window, etc. The scheduler unit(s) 1756 is coupled to the physical register file(s) unit(s) 1758. Each of the physical register file(s) units 1758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1758 comprises a vector registers unit, a write mask registers unit, and a scalar registers unit. These register units may provide architectural vector registers, vector mask registers, and general purpose registers. The physical register file(s) unit(s) 1758 is overlapped by the retirement unit 1754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1754 and the physical register file(s) unit(s) 1758 are coupled to the execution cluster(s) 1760. The execution cluster(s) 1760 includes a set of one or more execution units 1762 and a set of one or more memory access units 1764. The execution units 1762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1756, physical register file(s) unit(s) 1758, and execution cluster(s) 1760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1764). It should also be understood that where separate pipelines are used, one or more of these pipelines may be out-of-order issue/execution and the rest in-order.

The set of memory access units 1764 is coupled to the memory unit 1770, which includes a data TLB unit 1772 coupled to a data cache unit 1774 coupled to a level 2 (L2) cache unit 1776. In one exemplary embodiment, the memory access units 1764 may include a load unit, a store address unit, and a store data unit, each of which is coupled to the data TLB unit 1772 in the memory unit 1770. The instruction cache unit 1734 is further coupled to a level 2 (L2) cache unit 1776 in the memory unit 1770. The L2 cache unit 1776 is coupled to one or more other levels of cache and eventually to a main memory.

By way of example, the exemplary register renaming, out-of-order issue/execution core architecture may implement the pipeline 1700 as follows: 1) the instruction fetch 1738 performs the fetch and length decoding stages 1702 and 1704; 2) the decode unit 1740 performs the decode stage 1706; 3) the rename/allocator unit 1752 performs the allocation stage 1708 and renaming stage 1710; 4) the scheduler unit(s) 1756 performs the schedule stage 1712; 5) the physical register file(s) unit(s) 1758 and the memory unit 1770 perform the register read/memory read stage 1714; the execution cluster 1760 perform the execute stage 1716; 6) the memory unit 1770 and the physical register file(s) unit(s) 1758 perform the write back/memory write stage 1718; 7) various units may be involved in the exception handling stage 1722; and 8) the retirement unit 1754 and the physical register file(s) unit(s) 1758 perform the commit stage 1724.

The core 1790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1790 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1734/1774 and a shared L2 cache unit 1776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

FIGS. 18A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 18A is a block diagram of a single processor core, along with its connection to the on-die interconnect network 1802 and with its local subset of the Level 2 (L2) cache 1804, according to embodiments of the invention. In one embodiment, an instruction decoder 1800 supports the x86 instruction set with a packed data instruction set extension. An L1 cache 1806 allows low-latency accesses to cache memory into the scalar and vector units. While in one embodiment (to simplify the design), a scalar unit 1808 and a vector unit 1810 use separate register sets (respectively, scalar registers 1812 and vector registers 1814) and data transferred between them is written to memory and then read back in from a level 1 (L1) cache 1806, alternative embodiments of the invention may use a different approach (e.g., use a single register set or include a communication path that allow data to be transferred between the two register files without being written and read back).

The local subset of the L2 cache 1804 is part of a global L2 cache that is divided into separate local subsets, one per processor core. Each processor core has a direct access path to its own local subset of the L2 cache 1804. Data read by a processor core is stored in its L2 cache subset 1804 and can be accessed quickly, in parallel with other processor cores accessing their own local L2 cache subsets. Data written by a processor core is stored in its own L2 cache subset 1804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 18B is an expanded view of part of the processor core in FIG. 18A according to embodiments of the invention. FIG. 18B includes an L1 data cache 1806A part of the L1 cache 1804, as well as more detail regarding the vector unit 1810 and the vector registers 1814. Specifically, the vector unit 1810 is a 16-wide vector processing unit (VPU) (see the 16-wide ALU 1828), which executes one or more of integer, single-precision float, and double-precision float instructions. The VPU supports swizzling the register inputs with swizzle unit 1820, numeric conversion with numeric convert units 1822A-B, and replication with replication unit 1824 on the memory input. Write mask registers 1826 allow predicating resulting vector writes.

Processor with Integrated Memory Controller and Graphics

FIG. 19 is a block diagram of a processor 1900 that may have more than one core, may have an integrated memory controller, and may have integrated graphics according to embodiments of the invention. The solid lined boxes in FIG. 19 illustrate a processor 1900 with a single core 1902A, a system agent 1910, a set of one or more bus controller units 1916, while the optional addition of the dashed lined boxes illustrates an alternative processor 1900 with multiple cores 1902A-N, a set of one or more integrated memory controller unit(s) 1914 in the system agent unit 1910, and special purpose logic 1908.

Thus, different implementations of the processor 1900 may include: 1) a CPU with the special purpose logic 1908 being integrated graphics and/or scientific (throughput) logic (which may include one or more cores), and the cores 1902A-N being one or more general purpose cores (e.g., general purpose in-order cores, general purpose out-of-order cores, a combination of the two); 2) a coprocessor with the cores 1902A-N being a large number of special purpose cores intended primarily for graphics and/or scientific (throughput); and 3) a coprocessor with the cores 1902A-N being a large number of general purpose in-order cores. Thus, the processor 1900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1906, and external memory (not shown) coupled to the set of integrated memory controller units 1914. The set of shared cache units 1906 may include one or more mid-level caches, such as level 2 (L2), level 3 (L3), level 4 (L4), or other levels of cache, a last level cache (LLC), and/or combinations thereof. While in one embodiment a ring based interconnect unit 1912 interconnects the integrated graphics logic 1908, the set of shared cache units 1906, and the system agent unit 1910/integrated memory controller unit(s) 1914, alternative embodiments may use any number of well-known techniques for interconnecting such units. In one embodiment, coherency is maintained between one or more cache units 1906 and cores 1902A-N.

In some embodiments, one or more of the core 1902A-N are capable of multi-threading. The system agent 1910 includes those components coordinating and operating cores 1902A-N. The system agent unit 1910 may include for example a power control unit (PCU) and a display unit. The PCU may be or include logic and components needed for regulating the power state of the cores 1902A-N and the integrated graphics logic 1908. The display unit is for driving one or more externally connected displays.

The cores 1902A-N may be homogenous or heterogeneous in terms of architecture instruction set; that is, two or more of the cores 1902A-N may be capable of execution the same instruction set, while others may be capable of executing only a subset of that instruction set or a different instruction set.

Exemplary Computer Architectures

FIGS. 20-23 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 20, shown s a block diagram of a system 2000 in accordance with one embodiment of the present invention. The system 2000 may include one or more processors 2010, 2015, which are coupled to a controller hub 2020. In one embodiment the controller hub 2020 includes a graphics memory controller hub (GMCH) 2090 and an Input/Output Hub (IOH) 2050 (which may be on separate chips); the GMCH 2090 includes memory and graphics controllers to which are coupled memory 2040 and a coprocessor 2045; the IOH 2050 is couples input/output (I/O) devices 2060 to the GMCH 2090. Alternatively, one or both of the memory and graphics controllers are integrated within the processor (as described herein), the memory 2040 and the coprocessor 2045 are coupled directly to the processor 2010, and the controller hub 2020 in a single chip with the IOH 2050.

The optional nature of additional processors 2015 is denoted in FIG. 20 with broken lines. Each processor 2010, 2015 may include one or more of the processing cores described herein and may be some version of the processor 1900.

The memory 2040 may be, for example, dynamic random access memory (DRAM), phase change memory (PCM), or a combination of the two. For at least one embodiment, the controller hub 2020 communicates with the processor(s) 2010, 2015 via a multi-drop bus, such as a frontside bus (FSB), point-to-point interface such as QuickPath Interconnect (QPI), or similar connection 2095.

In one embodiment, the coprocessor 2045 is a special-purpose processor, such as, for example, a high-throughput MIC processor, a network or communication processor, compression engine, graphics processor, GPGPU, embedded processor, or the like. In one embodiment, controller hub 2020 may include an integrated graphics accelerator.

There can be a variety of differences between the physical resources 2010, 2015 in terms of a spectrum of metrics of merit including architectural, microarchitectural, thermal, power consumption characteristics, and the like.

In one embodiment, the processor 2010 executes instructions that control data processing operations of a general type. Embedded within the instructions may be coprocessor instructions. The processor 2010 recognizes these coprocessor instructions as being of a type that should be executed by the attached coprocessor 2045. Accordingly, the processor 2010 issues these coprocessor instructions (or control signals representing coprocessor instructions) on a coprocessor bus or other interconnect, to coprocessor 2045. Coprocessor(s) 2045 accept and execute the received coprocessor instructions.

Referring now to FIG. 21, shown is a block diagram of a first more specific exemplary system 2100 in accordance with an embodiment of the present invention. As shown in FIG. 21, multiprocessor system 2100 is a point-to-point interconnect system, and includes a first processor 2170 and a second processor 2180 coupled via a point-to-point interconnect 2150. Each of processors 2170 and 2180 may be some version of the processor 1900. In one embodiment of the invention, processors 2170 and 2180 are respectively processors 2010 and 2015, while coprocessor 2138 is coprocessor 2045. In another embodiment, processors 2170 and 2180 are respectively processor 2010 coprocessor 2045.

Processors 2170 and 2180 are shown including integrated memory controller (IMC) units 2172 and 2182, respectively. Processor 2170 also includes as part of its bus controller units point-to-point (P-P) interfaces 2176 and 2178; similarly, second processor 2180 includes P-P interfaces 2186 and 2188. Processors 2170, 2180 may exchange information via a point-to-point (P-P) interface 2150 using P-P interface circuits 2178, 2188. As shown in FIG. 21, IMCs 2172 and 2182 couple the processors to respective memories, namely a memory 2132 and a memory 2134, which may be portions of main memory locally attached to the respective processors.

Processors 2170, 2180 may each exchange information with a chipset 2190 via individual P-P interfaces 2152, 2154 using point to point interface circuits 2176, 2194, 2186, 2198. Chipset 2190 may optionally exchange information with the coprocessor 2138 via a high-performance interface 2139. In one embodiment, the coprocessor 2138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2190 may be coupled to a first bus 2116 via an interface 2196. In one embodiment, first bus 2116 may be a Peripheral Component Interconnect (PCI) bus, or a bus such as a PCI Express bus or another third generation I/O interconnect bus, although the scope of the present invention is not so limited.

As shown in FIG. 21, various I/O devices 2114 may be coupled to first bus 2116, along with a bus bridge 2118 which couples first bus 2116 to a second bus 2120. In one embodiment, one or more additional processor(s) 2115, such as coprocessors, high-throughput MIC processors, GPGPUs, accelerators (such as, e.g., graphics accelerators or digital signal processing (DSP) units), field programmable gate arrays, or any other processor, are coupled to first bus 2116. In one embodiment, second bus 2120 may be a low pin count (LPC) bus. Various devices may be coupled to a second bus 2120 including, for example, a keyboard and/or mouse 2122, communication devices 2127 and a storage unit 2128 such as a disk drive or other mass storage device which may include instructions/code and data 2130, in one embodiment. Further, an audio I/O 2124 may be coupled to the second bus 2120. Note that other architectures are possible. For example, instead of the point-to-point architecture of FIG. 21, a system may implement a multi-drop bus or other such architecture.

Referring now to FIG. 22, shown is a block diagram of a second more specific exemplary system 2200 in accordance with an embodiment of the present invention. Like elements in FIGS. 21 and 22 bear like reference numerals, and certain aspects of FIG. 21 have been omitted from FIG. 22 in order to avoid obscuring other aspects of FIG. 22.

FIG. 22 illustrates that the processors 2170, 2180 may include integrated memory and I/O control logic ("CL") 2172 and 2182, respectively. Thus, the CL 2172, 2182 include integrated memory controller units and include I/O control logic. FIG. 22 illustrates that not only are the memories 2132, 2134 coupled to the CL 2172, 2182, but also that I/O devices 2214 are also coupled to the control logic 2172, 2182. Legacy I/O devices 2215 are coupled to the chipset 2190.

Referring now to FIG. 23, shown is a block diagram of a SoC 2300 in accordance with an embodiment of the present invention. Similar elements in FIG. 19 bear like reference numerals. Also, dashed lined boxes are optional features on more advanced SoCs. In FIG. 23, an interconnect unit(s) 2302 is coupled to: an application processor 2310 which includes a set of one or more cores 202A-N and shared cache unit(s) 1906; a system agent unit 1910; a bus controller unit(s) 1916; an integrated memory controller unit(s) 1914; a set or one or more coprocessors 2320 which may include integrated graphics logic, an image processor, an audio processor, and a video processor; an static random access memory (SRAM) unit 2330; a direct memory access (DMA) unit 2332; and a display unit 2340 for coupling to one or more external displays. In one embodiment, the coprocessor(s) 2320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2130 illustrated in FIG. 21, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cares" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 24 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 24 shows a program in a high level language 2402 may be compiled using an x86 compiler 2404 to generate x86 binary code 2406 that may be natively executed by a processor with at least one x86 instruction set core 2416. The processor with at least one x86 instruction set core 2416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2404 represents a compiler that is operable to generate x86 binary code 2406 (e.g., object code) that can, with or without additional linkage processing, be executed on the processor with at least one x86 instruction set core 2416. Similarly, FIG. 24 shows the program in the high level language 2402 may be compiled using an alternative instruction set compiler 2408 to generate alternative instruction set binary code 2410 that may be natively executed by a processor without at least one x86 instruction set core 2414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2412 is used to convert the x86 binary code 2406 into code that may be natively executed by the processor without an x86 instruction set core 2414. This converted code is not likely to be the same as the alternative instruction set binary code 2410 because an instruction converter capable of this is difficult to make; however, the converted code will accomplish the general operation and be made up of instructions from the alternative instruction set. Thus, the instruction converter 2412 represents software, firmware, hardware, or a combination thereof that, through emulation, simulation or any other process, allows a processor or other electronic device that does not have an x86 instruction set processor or core to execute the x86 binary code 2406.

Components, features, and details described for any of FIGS. 3-12 may also optionally apply to any of FIGS. 1-2. Moreover, components, features, and details described for any of the apparatus may also optionally apply to any of the methods, which in embodiments may be performed by and/or with such apparatus. Any of the processors described herein may be included in any of the computer systems disclosed herein. In some embodiments, the instructions may have features or details of the instruction formats disclosed herein, although this is not required.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operable to cause the machine to perform and/or result in the machine performing one or operations, methods, or techniques disclosed herein.

In some embodiments, the machine-readable medium may include a non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie, in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor that includes a plurality of packed data registers, and a decode unit to decode an instruction. The instruction is to indicate a first source operand that is to have at least one lane of bits. The instruction is also to indicate a second source packed data operand that is to have a number of sub-lane sized bit selection elements. The processor also includes an execution unit coupled with the packed data registers and the decode unit. The execution unit, in response to the instruction, is to store a result operand in a destination storage location that is to be indicated by the instruction. The result operand is to include, a different corresponding bit for each of the number of sub-lane sized bit selection elements. A value of each bit of the result operand corresponding to a sub-lane sized bit selection element is to be that of a bit of a corresponding lane of bits, of the at least one lane of bits of the first source operand, which is indicated by the corresponding sub-lane sized bit selection element.

Example 2 includes the processor of Example 1, in which the number of sub-lane sized bit selection elements include a plurality of subsets that each correspond to a different one of a plurality of lanes of bits. Also, the execution unit, in response to the instruction, is to use each subset of the sub-lane sized bit selection elements to select bits from within only a corresponding lane of bits.

Example 3 includes the processor of Example 2, in which the execution unit, in response to the instruction, is to store the result operand in a packed data register having the plurality of lanes of bits.

Example 4 includes the processor of Example 3, in which the execution unit, in response to the instruction, is to store the bits selected by each subset of the sub-lane sized bit selection elements in a corresponding lane of bits of the packed data register.

Example 5 includes the processor of Example 4, in which the execution unit, in response to the instruction, is to store at least one replica of the bits selected by each subset of the sub-lane sized bit selection elements in the corresponding lane of bits of the packed data register.

Example 6 includes the processor of Example 5, in which the decode unit is to decode the instruction that is to indicate a source predicate mask operand. Also, the execution unit, in response to the instruction, is also optionally to use the source predicate mask operand to predicate storage of the bits selected by each subset of the sub-lane sized bit selection elements and replicas thereof in the corresponding lane of bits of the packed data register.

Example 7 includes the processor of Example 1, in which each sub-lane sized bit selection element corresponds to a bit of the result operand in a same relative position. Also, optionally in which the second source packed data operand has at least sixteen sub-lane sized bit selection elements.

Example 8 includes the processor of Example 1, in which the execution unit, in response to the instruction, is to store the result operand in the destination storage location which is a packed data operation mask register.

Example 9 includes the processor of Example 1, in which the execution unit, in response to the instruction, is to store the result operand in the destination storage location which is a general-purpose register.

Example 10 includes the processor of Example 1, in which the decode unit is to decode the instruction that is to indicate the first source operand that is to have a single lane of bits, in which all of the number of sub-lane sized bit selection elements are to correspond to the single lane of bits. Also, optionally in which the execution unit, in response to the instruction, is to store a bit of the single lane of bits to the result operand for each of the number of sub-lane sized bit selection elements.

Example 11 includes the processor of any one of Examples 1 to 9, in which the decode unit is to decode the instruction that is to indicate the first source operand is to have a plurality of lanes of bits.

Example 12 includes the processor of any one of Examples 1 to 9, in which the decode unit is to decode the instruction that is to indicate the first source operand that is to have a single lane of bits, and in which the processor, in response to the instruction, is to replicate the single lane of bits of the first source operand a plurality of times to create a plurality of lanes of bits.

Example 13 includes the processor of any one of Examples 1 to 9, in which the decode unit is to decode the instruction that is to indicate the first source operand that is to have at least one 64-bit lane of bits, and is to indicate the second source packed data operand that is to have the number of at least 6-bit sized bit selection elements.

Example 14 includes the processor of Example 13, in which each at least 6-bit bit selection element is in a different corresponding 8-bit byte of the second source packed data operand. Also, optionally in which the second source packed data operand has at least sixteen bit selection elements.

Example 15 includes the processor of any one of Examples 1 to 9, in which the decode unit is to decode the instruction that is to indicate the second source packed data operand that is to have a same number of sub-lane sized bit selection elements as a number of bits in each of the at least one lane of bits of the first source operand.

Example 16 is a method in a processor that includes receiving an instruction indicating a first source operand having at least one lane of bits. The instruction also indicates a second source packed data operand having a number of sub-lane sized bit selection elements method also includes storing a result operand in a destination storage location indicated by the instruction in response to the instruction. The result operand includes a different corresponding bit for each of the number of sub-lane sized bit selection elements. A value of each bit of the result operand that corresponds to a sub-lane sized bit selection element being that of a bit of a corresponding lane of bits, of the at least one lane of bits of the first source operand, indicated, by the corresponding sub-lane sized bit selection element.

Example 17 includes the method of Example 16, in which storing includes storing the result operand in the destination storage location which is a predicate mask register. Also, optionally in which each bit of the result operand corresponds to a sub-lane sized bit selection element in a same relative position.

Example 18 includes the method of Example 16, in which receiving includes receiving the instruction indicating the second source packed data operand having the number of sub-lane sized bit selection elements including a plurality of subsets that each correspond to a different one of a plurality of lanes of bits. The method also optionally includes using each subset of the sub-lane sized bit selection elements to select bits from within only a corresponding lane of bits.

Example 19 includes the method of Example 18, in which storing includes storing the result operand in a packed data register having a plurality of lanes of bits, and in which a lane of bits of the result operand includes the bits selected by the corresponding subset of the sub-lane sized bit selection elements as well as a plurality of replicas of the bits selected by the corresponding subset.

Example 20 includes the method of Example 16, in which receiving includes receiving the instruction indicating the first source operand having a plurality of 64-bit lanes of bits, and indicating the second source packed data operand having the number of at least 6-bit bit selection elements arranged as a plurality of sets each corresponding to a different one of the 64-bit lanes of bits.

Example 21 includes the method of Example 16, in which receiving includes receiving the instruction that indicates the first source operand that has a single lane of bits. Also, the method may optionally include, in response to the instruction, replicating the single lane of bits of the first source operand a plurality of times to create a plurality of lanes of bits.

Example 22 is a system to process instructions including an interconnect, and a processor coupled with the interconnect. The processor is to receive an instruction that is to indicate a first source operand that is to have at least one lane of bits, and to indicate a second source packed data operand that is to have a number of sub-lane sized bit selection elements. The instruction is also to indicate a destination storage location. The processor, in response to the instruction, is to store a result operand in the destination storage location. The result operand is to include a different corresponding bit for each of the number of sub-lane sized bit selection elements. A value of each bit of the result operand corresponding to a sub-lane sized bit selection element to be that of a bit of a corresponding lane of bits, of the at least one lane of bits of the first source operand, which is indicated by the corresponding sub-lane sized bit selection element. The system also includes a dynamic random access memory (DRAM) coupled with the interconnect.

Example 23 includes the system of Example 22, in which the number of sub-lane sized bit selection elements include a plurality of subsets that each correspond to a different one of a plurality of lanes of bits. Also, optionally in which the processor, in response to the instruction, is to use each subset of the sub-lane sized bit selection elements to select bits from within only a corresponding lane of bits.

Example 24 is an article of manufacture including a non-transitory machine-readable storage medium. The non-transitory machine-readable storage medium stores an instruction. The instruction is to indicate a first source operand having at least one lane of bits, and to indicate a second source packed data operand having a number of sub-lane sized bit selection elements. The instruction if executed by a machine is to cause the machine to perform operations including storing a result operand in a destination storage location indicated by the instruction. The result operand is to include a different corresponding bit for each of the number of sub-lane sized bit selection elements. A value of each bit of the result operand that corresponds to a sub-lane sized bit selection element is to be that of a bit of a corresponding lane of bits, of the at least one lane of bits of the first source operand, indicated by the corresponding sub-lane sized bit selection element.

Example 25 includes the article of manufacture of Example 24, in which the instruction if executed by the machine, is to cause the machine to store the result operand in a predicate mask register.

Example 26 is a processor or other apparatus that is operative to perform the method of any one of Examples 16 to 21.

Example 27 is a processor or other apparatus that includes means for performing the method of any one of Examples 16 to 21.

Example 28 is a processor or other apparatus that includes modules to perform the method of any one of Examples 16 to 21.

Example 29 is a processor that des any combination of modules and/or units and/or logic and/or circuitry and/or means for performing the method of any one of Examples 16 to 21.

Example 30 is an article of manufacture that includes an optionally non-transitory machine-readable medium, which optionally stores or otherwise provides an instruction, which if and/or when executed by a processor, computer system, electronic device, or other machine, is operative to cause the machine to perform the method of any one of Examples 16 to 21.

Example 31 is a computer system, other electronic device, or other apparatus including a bus or other interconnect, the processor of any one of Examples 1 to 15 coupled with the interconnect, and at least one component coupled with the interconnect that is selected from a dynamic random access memory (DRAM), a network interface, a graphics chip, a wireless communications chip, a Global System for Mobile Communications (GSM) antenna, a phase change memory, and a video camera.

Example 32 is a processor or other apparatus substantially as described herein.

Example 33 is a processor or other apparatus that is operative to perform any method substantially as described herein.

Example 34 is a processor or other apparatus that is operative to perform any bit shuffle instruction substantially as described herein.

Example 35 is a processor or other apparatus including a decode unit to decode instructions of a first instruction set. The decode unit is to receive one or more instructions of the first instruction set that emulate a first instruction. The first instruction may be any bit shuffle instruction substantially as disclosed herein, and is to be of a second different instruction set. The processor or other apparatus also includes one or more execution units coupled with the decode unit to execute the one or more instructions of the first instruction set. The one or more execution units, in response to the one or more instructions of the first instruction set, are to store a result in a destination. The result may include any result of a bit shuffle instruction substantially as disclosed herein for the first instruction.

Example 36 is a computer system or other electronic device that includes a processor having a decode unit to decode instructions of a first instruction set. The processor also has one or more execution units. The electronic device also includes a storage device coupled with the processor. The storage device is to store a first instruction, which may be any bit shuffle instruction substantially as disclosed herein, and which is to be of a second different instruction set. The storage device is also to store instructions to convert the first instruction into one or more instructions of the first instruction set. The one or more instructions of the first instruction set, when performed by the processor, are to cause the processor to store a result in a destination. The result may include any result of a bit shuffle instruction substantially as disclosed herein for the first instruction.

What is claimed is:

1. A processor comprising:
a plurality of packed data registers;
a decode unit to decode an instruction, the instruction to indicate a first source operand that is to have at least one lane of bits, and the instruction to indicate a packed data register that is to store a second source packed data operand that is to have a number of sub-lane sized bit selection elements; and an execution unit coupled with the packed data registers and the decode unit, the execution unit, in response to the instruction, to store a result operand in a destination storage location that is to be indicated by the instruction, the result operand to include, a different corresponding single bit for each of the number of sub-lane sized bit selection elements, a value of each single bit of the result operand corresponding to a sub-lane sized bit selection element to be that of a single bit of a corresponding lane of bits, of the at least one lane of bits of the first source operand, which is indicated by the corresponding sub-lane sized bit selection element, wherein the result operand is to include a plurality of the single bits for each of the at least one lane of bits, and wherein the plurality of the single bits for each of the at least one lane of bits are to be stored in adjacent bit positions.

2. The processor of claim 1, wherein the number of sub-lane sized bit selection elements include a plurality of subsets that each correspond to a different one of a plurality of lanes of bits, and wherein the execution unit, in response to the instruction, is to use each subset of the sub-lane sized bit selection elements to select bits from within only a corresponding lane of bits.

3. The processor of claim 2, wherein the execution unit, in response to the instruction, is to store the result operand in a packed data register having the plurality of lanes of bits.

4. The processor of claim 3, wherein the execution unit, in response to the instruction, is to store the bits selected by each subset of the sub-lane sized bit selection elements in a corresponding lane of bits of the packed data register.

5. The processor of claim 4, wherein the execution unit, in response to the instruction, is to store at least one replica of the bits selected by each subset of the sub-lane sized bit selection elements in the corresponding lane of bits of the packed data register.

6. The processor of claim 5, wherein the decode unit is to decode the instruction that is to indicate a source predicate mask operand, and wherein the execution unit, in response to the instruction, is to use the source predicate mask operand to predicate storage of the bits selected by each subset of the sub-lane sized bit selection elements and replicas thereof in the corresponding lane of bits of the packed data register.

7. The processor of claim 1, wherein each sub-lane sized bit selection element corresponds to a single bit of the result operand in a same relative position, and wherein the second source packed data operand has at least sixteen sub-lane sized bit selection elements.

8. The processor of claim 1, wherein the execution unit, in response to the instruction, is to store the result operand in the destination storage location which is a packed data operation mask register.

9. The processor of claim 1, wherein the execution unit, in response to the instruction, is to store the result operand in the destination storage location which is a general-purpose register.

10. The processor of claim 1, wherein the decode unit is to decode the instruction that is to indicate the first source operand that is to have a single lane of bits, wherein all of the number of sub-lane sized bit selection elements are to correspond to the single lane of bits, and wherein the execution unit, in response to the instruction, is to store a single bit of the single lane of bits to the result operand for each of the number of sub-lane sized bit selection elements.

11. The processor of claim 1, wherein the decode unit is to decode the instruction that is to indicate the first source operand is to have a plurality of lanes of bits.

12. The processor of claim 1, wherein the decode unit is to decode the instruction that is to indicate the first source operand that is to have a single lane of bits, and wherein the processor, in response to the instruction, is to replicate the single lane of bits of the first source operand a plurality of times to create a plurality of lanes of bits.

13. The processor of claim 1, wherein the decode unit is to decode the instruction that is to indicate the first source operand that is to have at least one 64-bit lane of bits, and is to indicate the second source packed data operand that is to have the number of at least 6-bit sized bit selection elements.

14. The processor of claim 13, wherein each at least 6-bit bit selection element is in a different corresponding 8-bit byte of the second source packed data operand, and wherein the second source packed data operand has at least sixteen bit selection elements.

15. A processor comprising:
a plurality of packed data registers;
a decode unit to decode an instruction, the instruction to indicate a first source operand that is to have at least one lane of bits, and the instruction to indicate a packed data register that is to store a second source packed data operand that is to have a same number of sub-lane sized bit selection elements as a number of bits in each of the at least one lane of bits of the first source operand; and
an execution unit coupled with the packed data registers and the decode unit, the execution unit, in response to the instruction, to store a result operand in a destination storage location that is to be indicated by the instruction, the result operand to include, a different corresponding single bit for each of the number of sub-lane sized bit selection elements, a value of each single bit of the result operand corresponding to a sub-lane sized bit selection element to be that of a single bit of a corresponding lane of bits, of the at least one lane of bits of the first source operand, which is indicated by the corresponding sub-lane sized bit selection element.

16. A method in a processor comprising:
receiving an instruction, the instruction indicating a first source operand having at least one lane of bits, and the instruction having a field specifying a packed data register storing a second source packed data operand having a number of sub-lane sized bit selection elements; and
storing a result operand in a destination storage location indicated by the instruction in response to the instruction, the result operand including a different corresponding single bit for each of the number of sub-lane sized bit selection elements, a value of each single bit of the result operand that corresponds to a sub-lane sized bit selection element being that of a single bit of a corresponding lane of bits, of the at least one lane of bits of the first source operand, indicated by the corresponding sub-lane sized bit selection element, wherein the result operand includes a plurality of the single bits for each of the at least one lane of bits, and wherein the plurality of the single bits for each of the at least one lane of bits are stored in adjacent bit positions.

17. The method of claim 16, wherein storing comprises storing the result operand in the destination storage location which is a predicate mask register, and wherein each single bit of the result operand corresponds to a sub-lane sized bit selection element in a same relative position.

18. The method of claim 16, wherein receiving comprises receiving the instruction indicating the second source packed data operand having the number of sub-lane sized bit selection elements including a plurality of subsets that each correspond to a different one of a plurality of lanes of bits, and further comprising using each subset of the sub-lane sized bit selection elements to select bits from within only a corresponding lane of bits.

19. The method of claim 18, wherein storing comprises storing the result operand in a packed data register having a plurality of lanes of bits, and wherein a lane of bits of the result operand includes the bits selected by the corresponding subset of the sub-lane sized bit selection elements as well as a plurality of replicas of the bits selected by the corresponding subset.

20. The method of claim 16, wherein receiving comprises receiving the instruction indicating the first source operand having a plurality of 64-bit lanes of bits, and indicating the second source packed data operand having the number of at least 6-bit bit selection elements arranged as a plurality of sets each corresponding to a different one of the 64-bit lanes of bits.

21. The method of claim 16, wherein receiving comprises receiving the instruction that indicates the first source operand that has a single lane of bits, and further comprising, in response to the instruction, replicating the single lane of bits of the first source operand a plurality of times to create a plurality of lanes of bits.

22. A system to process instructions comprising:
an interconnect;
a processor coupled with the interconnect, the processor to receive an instruction that is to indicate a first source operand that is to have at least one lane of bits, to indicate a packed data register that is to store a second source packed data operand that is to have a number of sub-lane sized bit selection elements, and to indicate a destination storage location, the processor, in response to the instruction, to store a result operand in the destination storage location, the result operand to include a different corresponding single bit for each of the number of sub-lane sized bit selection elements, a value of each single bit of the result operand corresponding to a sub-lane sized bit selection element to be that of a single bit of a corresponding lane of bits, of the at least one lane of bits of the first source operand, which is indicated by the corresponding sub-lane sized bit selection element, wherein the result operand is to include a plurality of the single bits for each of the at least one lane of bits, and wherein the plurality of the single bits for each of the at least one lane of bits are to be stored in adjacent bit positions; and
a dynamic random access memory (DRAM) coupled with the interconnect.

23. The system of claim 22, wherein the number of sub-lane sized bit selection elements include a plurality of subsets that each correspond to a different one of a plurality of lanes of bits, and wherein the processor, in response to the instruction, is to use each subset of the sub-lane sized bit selection elements to select bits from within only a corresponding lane of bits.

* * * * *